United States Patent [19]
Nair et al.

[11] Patent Number: 5,438,186
[45] Date of Patent: Aug. 1, 1995

[54] MULTI-READER TRANSACTION TERMINAL

[75] Inventors: Parameswaran B. Nair, Acworth; John C. Evans, Atlanta; James F. Price, Alpharetta; Kumar S. Choudhuri, Kennesaw; James T. Stills, Atlanta; Victor V. Goulding, Lawrenceville, all of Ga.

[73] Assignee: MicroBilt Corporation, Atlanta, Ga.

[21] Appl. No.: 261,745

[22] Filed: Jun. 17, 1994

Related U.S. Application Data

[63] Continuation of Ser. No. 968,967, Oct. 30, 1992, abandoned.

[51] Int. Cl.⁶ ............................................. G06K 7/08
[52] U.S. Cl. ................................. 235/449; 235/379; 235/380; 235/475; 235/440
[58] Field of Search ............... 235/449, 379, 380, 440, 235/475, 483; 364/401, 408, 405, 406

[56] References Cited

U.S. PATENT DOCUMENTS

| | | | |
|---|---|---|---|
| 3,612,832 | 10/1971 | Goldstein et al. | 235/485 |
| 3,629,834 | 12/1971 | Randall et al. | 235/382 |
| 3,704,360 | 11/1972 | McFadden | 235/480 |
| 3,714,398 | 1/1973 | Brock | 235/448 |
| 3,760,162 | 9/1973 | Holter | 382/65 |
| 3,774,015 | 11/1973 | Lockard | 235/448 |
| 3,814,905 | 6/1974 | Lawrence et al. | 235/448 |
| 3,825,727 | 7/1974 | Sarcia | 235/448 |
| 3,854,661 | 12/1974 | Weber et al. | 235/448 |
| 3,859,509 | 1/1975 | Dillingham et al. | 235/433 |
| 3,900,717 | 8/1975 | Wu | 235/448 |
| 3,939,327 | 2/1976 | Humphrey | 382/65 |
| 3,940,795 | 2/1976 | Lemelson | 360/88 |
| 4,476,507 | 10/1984 | Koike et al. | 360/2 |
| 4,616,128 | 10/1986 | Case | 360/2 |
| 4,628,195 | 12/1986 | Baus | 235/440 |
| 4,684,794 | 8/1987 | Holland-Letz | 360/2 |
| 4,839,508 | 6/1989 | Frolov | 235/480 |
| 4,845,770 | 7/1989 | Koshida | 382/65 |
| 4,874,934 | 10/1989 | Nakahara et al. | 235/492 |
| 4,879,607 | 11/1989 | Redemacher | 360/2 |
| 4,950,875 | 8/1990 | Koshida et al. | 235/448 |
| 5,010,238 | 4/1991 | Kadono et al. | 235/379 |
| 5,023,782 | 6/1991 | Lutz et al. | |
| 5,054,092 | 10/1991 | LaCaze | |
| 5,151,582 | 9/1992 | Fujioka | 235/440 |
| 5,179,375 | 1/1993 | Dick et al. | |
| 5,195,133 | 3/1993 | Kapp et al. | 235/379 |
| 5,264,688 | 11/1993 | Matsuno et al. | |

FOREIGN PATENT DOCUMENTS 338568 4/1989 European Pat. Off. .

OTHER PUBLICATIONS

"MICR & Magnetic Stripe Reader", Mag-Tek, Inc., 1991.

*Primary Examiner*—Donald E. McElheny, Jr.
*Attorney, Agent, or Firm*—Jones & Askew

[57] ABSTRACT

A multi-reader terminal including a magnetic stripe reader, an embossed character reader, and a magnetic ink character recognition (MICR) check reader, in an integrated stand-alone unit. The terminal is operative for gathering credit card or check information required for customer transactions at the point of sale. The terminal provides a single card passageway for receiving a credit card having a magnetic stripe and embossed characters. The magnetic stripe reader and embossed character reader read the credit card as it travels in the passageway. The embossed character reader may be selectively retracted from the card passageway. The terminal includes a plurality of serial communications ports that allow the terminal to be connected in series between a host computer and an electronic cash register. The serial ports allow connection of a signature capture pad, a personal identification number (PIN) pad, and other serial devices. The terminal is operative to intercept and respond to serial data, or to reroute serial data between any of the serial ports. The terminal is especially suitable for use in a system wherein chargeback protection is to be afforded to certain transactions in the event that information from the embossing, magnetic stripe, or MICR reader are combined with other transaction information and forwarded electronically to a transaction processor or guarantor.

67 Claims, 22 Drawing Sheets

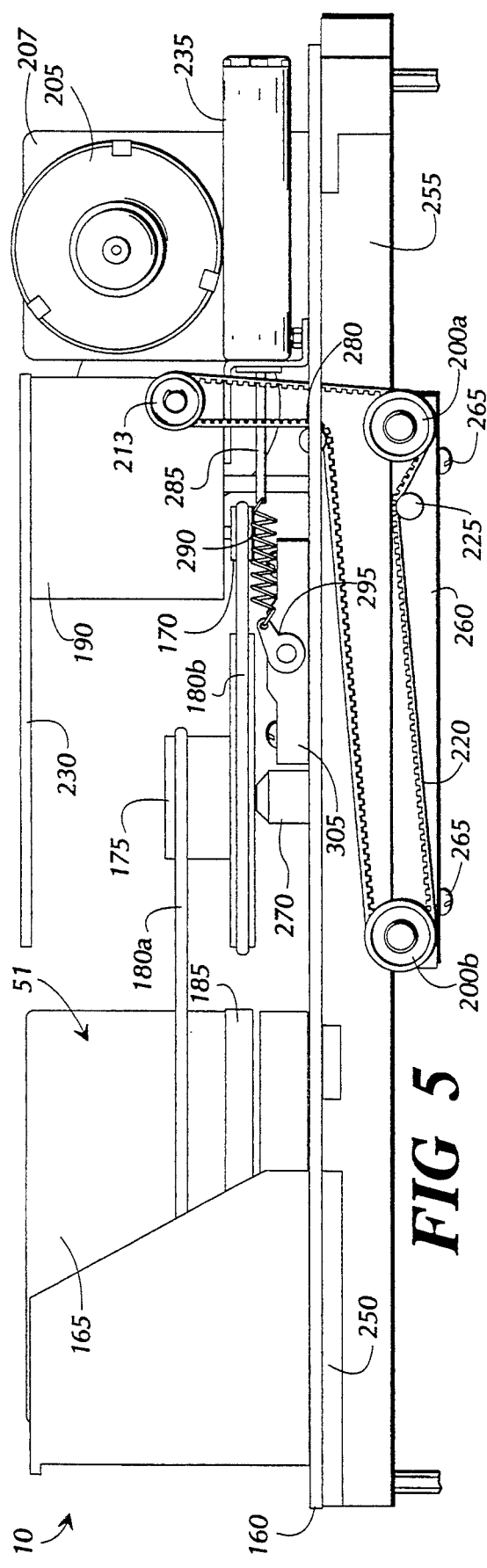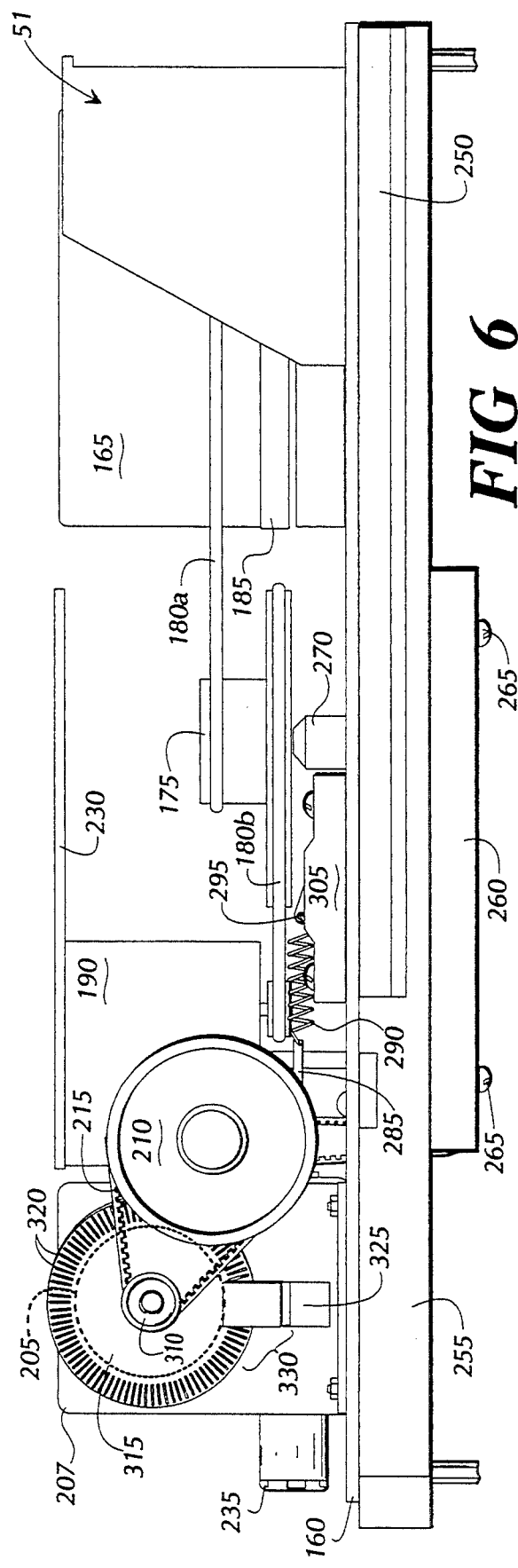

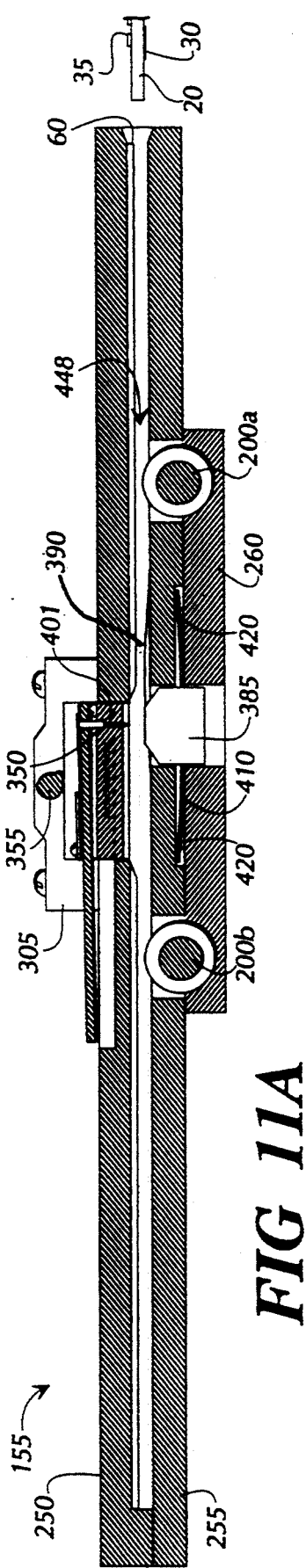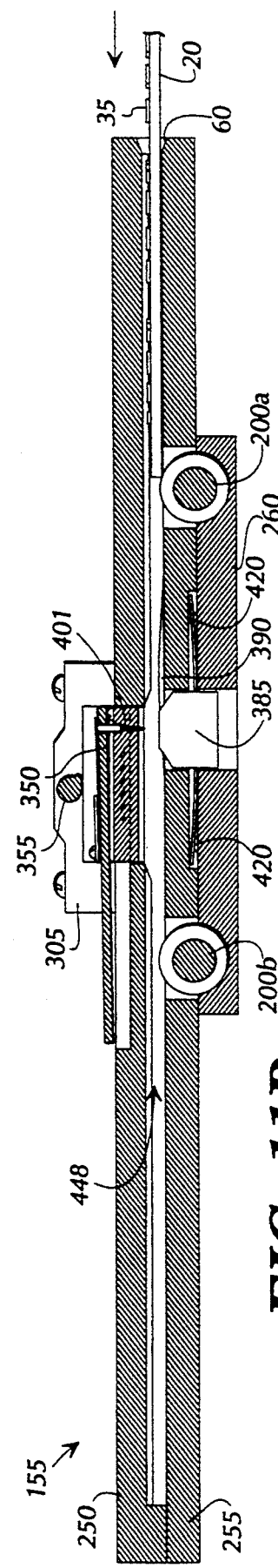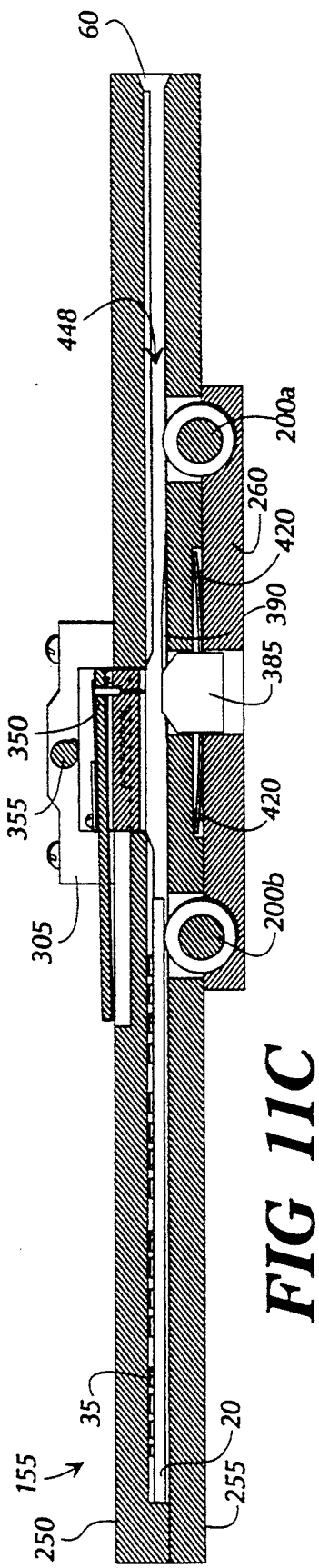

MULTI-READER TRANSACTION TERMINAL

CROSS REFERENCE TO RELATED APPLICATION

This application is a continuation of application Ser. No. 07/968,967, filed Oct. 30, 1992, entitled "Multi-Reader Transaction Terminal", abandoned.

TECHNICAL FIELD

The present invention relates generally to financial transaction terminals, and more particularly relates to a transaction terminal that reads account data from a credit card using a magnetic stripe reader and an embossed character reader, and also reads account data from a bank check using a magnetic ink character recognition (MICR) reader.

BACKGROUND OF THE INVENTION

American consumers have long been able to pay for many goods and services with non-cash forms of payment such as checks, credit cards, and debit cards. In recent years, consumers have increasingly relied on these non-cash forms of payment to pay for their purchases. For example, American consumers used credit cards to spend in excess of $250 billion during 1991. During the same period, merchants accepted checks totaling many other billions.

In many cases, merchants prefer to be paid in cash since non-cash alternatives carry some risk of non-payment. This risk includes losses resulting from errors and from fraudulently tendered checks and credit cards. Non-cash forms of payment, particularly credit cards, also cause the merchant to incur additional expenses in the form of processing and/or handling fees.

Many merchants have found that the additional sales generated by their acceptance of checks and credit cards outweigh the associated risks and expenses. Consequently, the financial industry has concentrated on systems and methods for reducing the risk of loss in spite of the ever increasing volume of non-cash transactions. Generally, a merchant's risk of loss is reduced by automatically acquiring transaction data and by pre-authorizing or verifying each transaction prior to its completion. The automatic acquisition of transaction data also reduces the amount of time necessary to complete a transaction.

The automatic collection of transaction data reduces the risk of loss by reducing the likelihood of errors in the recording of the account number and in other transaction data. Checks and credit cards both include elements that facilitate the automatic collection of account data. Checks have account information printed along their bottom edge. This data is printed with magnetic ink that is read by magnetic ink character recognition ("MICR") machines operated by banks and other check transaction processors. Credit cards typically provide account data in two forms: characters embossed on the face of the card that indicate the name of the cardholder, the account number, and an expiration date; and a magnetic stripe on the back of the card that contains the account number, expiration date and other information.

Pre-authorization or verification of each transaction usually reduces a merchant's risk of loss by passing it to a third party or transaction guarantor. Third party transaction guarantors contract with the merchant to provide credit card or check authorization services. These transaction guarantors, sometimes associated with financial transaction processors, operate computer systems and communication networks for acquiring proposed transaction data from merchants, looking up credit card and checking account numbers in databases, and providing authorizations or warnings to the merchants.

In these transaction guarantor systems, a merchant provides proposed transaction data to the transaction guarantor prior to the completion of the transaction. The transaction guarantor then verifies the purchaser's availability of bank funds or credit. If the transaction guarantor is satisfied that the merchant's customer has sufficient funds or available credit, the transaction guarantor will authorize the transaction, and will absorb the loss in the event the payment is uncollectible. Systems used by transaction guarantors to gather and verify transaction data are sometimes called "chargeback protection" systems because they enable the transaction guarantor to prevent the transaction from being "charged back" to the merchant by a credit card issuer in the event that the transaction was not properly authorized by the card issuer. One example of such a chargeback protection system is described in copending U.S. patent application Ser. No. 07/819,327, filed Jan. 10, 1992, U.S. Pat. No. 5,334,823, entitled "Systems and Methods for Operating Data Card Terminals for Transaction Chargeback Protection", the disclosure of which is incorporated herein by reference and made a part hereof. (The foregoing application will hereinafter be referred to as the "Chargeback Protection Application".)

In cases where a transaction guarantor provides authorization services and absorbs the risk of loss, the transaction guarantor typically charges the merchant a fee for these services. This fee is sometimes reduced if the merchant utilizes special data collection terminals that automatically collect the account data from a credit card. One example of a data collection terminal used in such transaction authorization systems is described in copending U.S. patent application Ser. No. 07/820,401, filed Jan. 10, 1992, entitled "Data Card Terminal With Embossed Character Reader and Signature Capture", assigned to the same assignee as the present invention, the disclosure of which is incorporated herein by reference and made a part hereof. (The foregoing application will hereinafter be referred to as the "Data Card Terminal Application".)

As previously mentioned, check processors generally utilize magnetic ink character recognition ("MICR") readers to facilitate check transaction processing. Bank-operated MICR readers are often large and handle large volumes of checks at high speed. Smaller versions of MICR readers, useful in point of sale or "POS" terminals or cash registers, are also known in the art. An exemplary point of sale sized MICR reader is available from Mag-Tek, Inc. of Carson, Calif. MICR readers expedite check-based transactions by automatically reading the account number from the magnetic ink on the check. This allows information to be provided to a check verification service quicker and more accurately than when the account number is read manually by the merchant.

Merchants that accept credit cards on a regular basis often employ electronic terminals that are able to read the account data from the card's magnetic stripe. With these magnetic stripe or "card swipe" terminals, a merchant swipes the credit card through a slot, and the terminal automatically reads and decodes the account number and expiration date from the card's magnetic stripe. The terminal then prompts the merchant to enter the purchase amount. Once the data is acquired, the terminal automatically places a call to a host computer, transmits the transaction data to the host computer via modem, and displays the authorization code received from the host computer. Examples of such terminals are found in copending U.S. application Ser. No. 07/790,658, filed Nov. 8, 1991, entitled "Card Transaction Terminal", and in the referenced Data Card Terminal Application, both assigned to the same assignee of the present application. U.S. Pat. No. 4,788,420 to Chang et al. also describes a magnetic stripe card swipe terminal.

Industry data indicates that a credit card's magnetic stripe is unreadable in approximately eight (8%) percent of credit card transactions. This situation occurs when the magnetic stripe has been damaged or intentionally destroyed. In cases where the magnetic stripe is unreadable, the merchant must read the account number and expiration date from the embossed characters on the card and enter the account number via the terminal's keypad. As a result, the advantages of automated data entry are lost (e.g., the risk of error is increased). Moreover, some transaction guarantors will not provide chargeback protection for transactions where the account number cannot be read from the credit card, since an unreadable magnetic stripe can be an indication of fraud or tampering.

In cases where the magnetic stripe is damaged but the card is otherwise valid and unaltered, it would be desirable to automatically read and decode the account number from the credit card's embossed characters. If the embossed account number can be read automatically, the chances of error are reduced. One example of an embossed character reader suitable for use in credit card transaction terminals is disclosed in copending U.S. patent application Ser. No. 07/910,410, filed Oct. 30, 1992, abandoned, entitled "Embossed Card Reader", and assigned to the same assignee as the present application, the disclosure of which is incorporated herein by reference and made a part hereof. (The foregoing application will hereinafter be referred to as the "Embossed Character Reader Application".)

Many merchants have significant investments in POS terminals or electronic cash registers. Sometimes, these POS terminals are connected to a merchant's accounting computer system or "in-store processor" via a data communications network, to facilitate the merchant's business operations. In order to facilitate the automatic collection of transaction data, it would be desirable to provide a transaction data terminal that could be used in conjunction with existing electronic cash registers and POS terminals. Since mass merchandisers often have many point of sale terminals within one store, and only a limited amount of counter space is available for each terminal, it is desirable that any transaction data terminal be compact and inexpensive. In addition, it is necessary for these terminals to operate in an environment where the point of sale terminal is connected to the merchant's host computer.

Accordingly, there is a need for a compact and inexpensive combination check reader, a magnetic stripe reader, and an embossed character reader that can be connected to existing point of sale equipment and operated together with the merchant's existing in-store processor. Prior to the present invention, such terminals have not been known.

Therefore, there is a need for a multi-reader terminal that integrates a magnetic ink character recognition reader, an embossed character reader, and a magnetic stripe reader into a compact point-of-sale terminal. Furthermore, the multi-reader terminal should be able to be connected to existing point of sale terminals and provide the data in a format that is required by the terminal.

SUMMARY OF THE INVENTION

The present invention is a multi-reader terminal apparatus operative to gather credit card and/or check information necessary for customer transactions such as sales, refunds, etc. at the point of sale. In order to accomplish this, the preferred multi-reader terminal is particularly suitable for connection to a merchant's existing point of sale electronic cash register or terminal. The multireader terminal is equipped with a magnetic stripe reader, an embossed character reader, and a MICR check reader, and adds these functionalities at the point of sale. In addition, the preferred apparatus supports a signature capture pad, a PIN pad, and possibly other serial devices to be controlled through one of a plurality of serial interfaces. The preferred magnetic stripe reader and embossed character reader are combined into a single, compact card reader subassembly that is operative to attempt to read the magnetic stripe on an inserted credit card one or more times, and under certain conditions read the embossing on the card to obtain the account number on the card.

Utilizing these multiple readers, the multi-reader terminal is able to obtain all of the information necessary for the optional chargeback protection services offered by certain transaction guarantors. Most of the special logic required for chargeback protection is handled internally by the multireader, associated with the transaction data, and provided as a data output to a transaction processor or guarantor. As a result of the internal credit card validation routines built into the multi-reader, chargeback protection can be implemented with minimal programming changes to existing point of sale (POS) systems and in-store processors.

The majority of the commands and features of the multi-reader operate in a fashion consistent with most other computer peripherals, i.e. a controlling system such as a POS cash register or in-store processor issues a command, and the peripheral performs the required task. For example, the preferred multi-reader may be connected to an electronic cash register to operate in response to commands from the cash register, or the multi-reader may be connected in series between an in-store processor and a dumb POS terminal. The multi reader is operative to respond to commands directed to it, and if connected in between an in-store processor and a dumb terminal, it will recognize commands directed to it but will pass through commands and data intended as communications between the in-store processor and the POS terminal.

Under certain conditions, the multi-reader requests the use of a display and keyboard of the POS system for this task. When the multi-reader receives a command to get credit card data, it will attempt to gather all data required for credit approval from an inserted credit card (using the rules of chargeback protection if this feature is enabled for the card in question). If necessary, the multi-reader sends data packets to the POS system requesting that it display messages or obtain keyboard input from the user.

When the multi-reader is idle, it is waiting to receive commands from a connected POS system. Depending on the configuration, the magnetic stripe reader, the embossed character reader, and check MICR reader may be enabled while in this idle state. An enabled reader can be activated by inserting a card or check. When a command is received or a reader is activated, all unrelated input devices are disabled until the command or the data from the activated reader is processed. Activating a reader places the multireader in the relevant mode (i.e. inserting a card into the swipe reader is equivalent to the POS system sending the multi reader a command to get the credit card data and then the user inserting a card).

Briefly described, the multireader terminal of the present invention is able to perform the above-described functions by incorporating a magnetic ink character recognition reader, magnetic stripe reader, embossed character reader, and data ports into a single terminal. The data ports include a plurality of individually configurable serial communications ports that can be connected to a host computer system, cash register, and other serial data peripheral devices. To work effectively, the terminal is capable of intercepting and responding to serial data intended for the terminal, and to reroute serial data intended for one of the other serial devices.

More particularly described, a multireader terminal constructed according to the present invention includes a housing and card transport means. The housing defines a card passageway for receiving the card. The magnetic stripe reader and embossed character reader are positioned to engage the card as it is transported along the passageway.

The preferred housing includes a top portion and a bottom portion. The top and bottom portions together define the card passageway. The card transporting means includes a plurality of drive rollers, and a motor connected to the drive rollers. The drive rollers are partially disposed within the passageway and operative to engage the card. In order to reduce friction between a card and the top portion of the housing, the preferred housing top portion defines a plurality of card support ribs. The housing bottom portion includes biasing means for biasing the card against the embossed character reader during a read cycle.

According to another aspect of the present invention, the embossed character reader may be selectively positioned to engage the card, or retracted from the card passageway. The preferred multireader terminal includes a read head positioned to extend through an opening in the top housing into operative proximity to the embossed on a card as it is transported therethrough. The selective embossed character positioning means includes an electrical actuator operative to move the read head into the operative proximity with the card.

According to another aspect of the present invention, the multireader terminal is response to a programmable internal security indicator such as a "high risk" flag. If the security indicator is set, the preferred terminal reads card data from both first and second card identifying information readers, such as an embossed character reader and a magnetic stripe reader for a credit card, and compares the data received from each. If the card identifying data corresponds to each other, the terminal provides verified card identifying information via output means. If the security indicator is not set, the terminal provides card identifying data from either of the card identifying information readers. In the preferred terminal, the card identifying information is the account number, and the first and second card identifying information readers are the magnetic stripe reader and embossed character reader, respectively.

According to another aspect of the present invention, the multireader employs a method of obtaining and providing card identifying information from a data card presented in connection with a financial transaction where the data card has a magnetic stripe and an embossed region containing identifying information. The method includes the steps of reading the magnetic stripe to obtain magnetic stripe card identifying information, and determining whether the magnetic stripe card identifying information is valid. If the magnetic stripe card identifying information is invalid, the method reads an embossed region on the data card to obtain embossed card identifying information.

More particularly described, the preferred method, in response to the magnetic stripe card identifying information being invalid, restores the invalid magnetic stripe card identifying information with at least a portion of the embossed character card identifying information to obtain restored magnetic stripe card identifying information. The card identifying information including valid magnetic stripe card identifying information, restored magnetic stripe card identifying information, or embossed card identifying information is provided to a host computer. In the preferred terminal, the card identifying information includes the card account number. The preferred method is operative to restore magnetic stripe data from track 1 with data from track 2, or vice versa. In addition, it is possible to restore magnetic stripe data from either track with data from the embossed character reader.

According to another aspect of the present invention, there is provided a financial transaction processing system for acquiring transaction data associated with a financial transaction. The system of the present invention includes a host computer, at least one electronic cash register operative for acquiring predetermined transaction information and for communicating the transaction information to the host computer. The system also includes communication means for transferring transactional information between the host computer and the electronic cash register, and at least one multireader terminal independent of the electronic cash register. The multireader terminal is operative to acquire additional transaction information in connection with the financial transaction. The various means of obtaining transaction information include a keypad associated with the electronic cash register, an embossed character reader, a magnetic stripe reader, and a magnetic ink character recognition reader. The transaction data may include transaction amount, credit card account number, and checking account number.

More particularly described, the preferred system includes a serial data communications link between the host computer and the electronic cash register where the multireader terminal connected between the electronic cash register and the host computer by means of first and second communications links. The multireader terminal is operative to respond to a predetermined set of signals from the host computer on the first communications link, and to pass signals intended for the electronic cash register to the electronic cash register via the second communications link. The multireader terminal is also operative to pass signals from the electronic cash register on the second communications link to the host computer on the first communications link.

In the preferred system, the multireader terminal is selectively operative to: ignore all incoming data received on an incoming serial port; accept all incoming data received on an incoming serial port as intended for the second transaction terminal; redirect all incoming data received on an incoming serial port, except for data recognizable as intended for the second transaction terminal to an outgoing serial port; unconditionally redirect data received on an incoming serial port to a selected outgoing serial port with no regard to the format and substance of the data; or communicating with a peripheral device connected to a selected serial port.

According to another aspect of the present invention, there is provided a method of operating an adjunct transaction terminal in conjunction with a system having a host computer and an electronic cash register. The adjunct transaction terminal is connected for data communications between the host computer and the electronic cash register. The method includes the following steps: providing an adjunct terminal for acquiring adjunct transaction information independently of the electronic cash register; connecting the adjunct terminal for communications in series between the host computer and the electronic cash register; receiving signals between the host computer and the electronic cash register; determining the intended destination of the signals; responding to predetermined signals intended for the adjunct terminal by performing functions associated with the adjunct terminal; and forwarding remaining signals to their intended destination.

Accordingly, it is an object of the present invention to provide a combination magnetic ink character recognition reader for checks, embossed character reader for credit cards, and magnetic stripe reader for credit cards.

It is another object of the present invention to provide a combination check and credit card reader that is operative with existing POS equipment and in store processors.

It is another object of the present invention to provide a credit card and check data collection terminal that is usable in conjunction with existing data communications networks.

It is another object of the present invention to provide a combination check and credit card data collection terminal that has a plurality of data communications ports that facilitate connection between existing POS equipment and in-store processors, by providing capability of distinguishing commands and data intended as communications between the existing POS equipment and in-store processor and directing such communications properly.

It is another object of the present invention to provide a combination check and credit card data collection terminal for use in conjunction with existing POS equipment that only has a limited number of communications ports, with minimal software modifications to the in-store processor computer programs.

It is another object of the present invention to provide a combination magnetic stripe reader and embossed character reader for credit cards that is operative to read both the magnetic stripe and the embossing on a card in a single operation.

It is another object of the present invention to provide a combination magnetic stripe reader and embossed character reader for credit cards that is operative to read a credit card's account number from both the magnetic stripe and the embossing on a card and compare the numbers, to provide additional antifraud protection and transaction verification.

It is another object of the present invention to provide a combination credit card and check data collection terminal for use at the point of sale together with existing POS electronic cash registers and terminals that facilitates the provision of chargeback protection services by a transaction guarantor.

It is another object of the present invention to provide a combination credit card and check data collection terminal that automatically acquires data from a credit card or check, validates same, and associates the validated data with transaction data for purposes of facilitating the provision of chargeback protection services by a transaction guarantor.

It is another object of the present invention to provide a credit card and check data collection terminal that is compact and inexpensive to manufacture.

These and other objects, features, and advantages of the present invention may be more clearly understood and appreciated from a review of the following detailed description of the preferred embodiments and by reference to the appended drawings and claims.

BRIEF DESCRIPTION OF THE DRAWINGS

FIG. 5 is a left side view of the preferred multi-reader terminal showing the magnetic ink character recognition reader and credit card reader subassemblies.

FIG. 6 is a right side view of the preferred multi-reader terminal showing the magnetic ink character recognition reader and credit card reader subassemblies.

DETAILED DESCRIPTION OF THE PREFERRED EMBODIMENT

Figure 1:
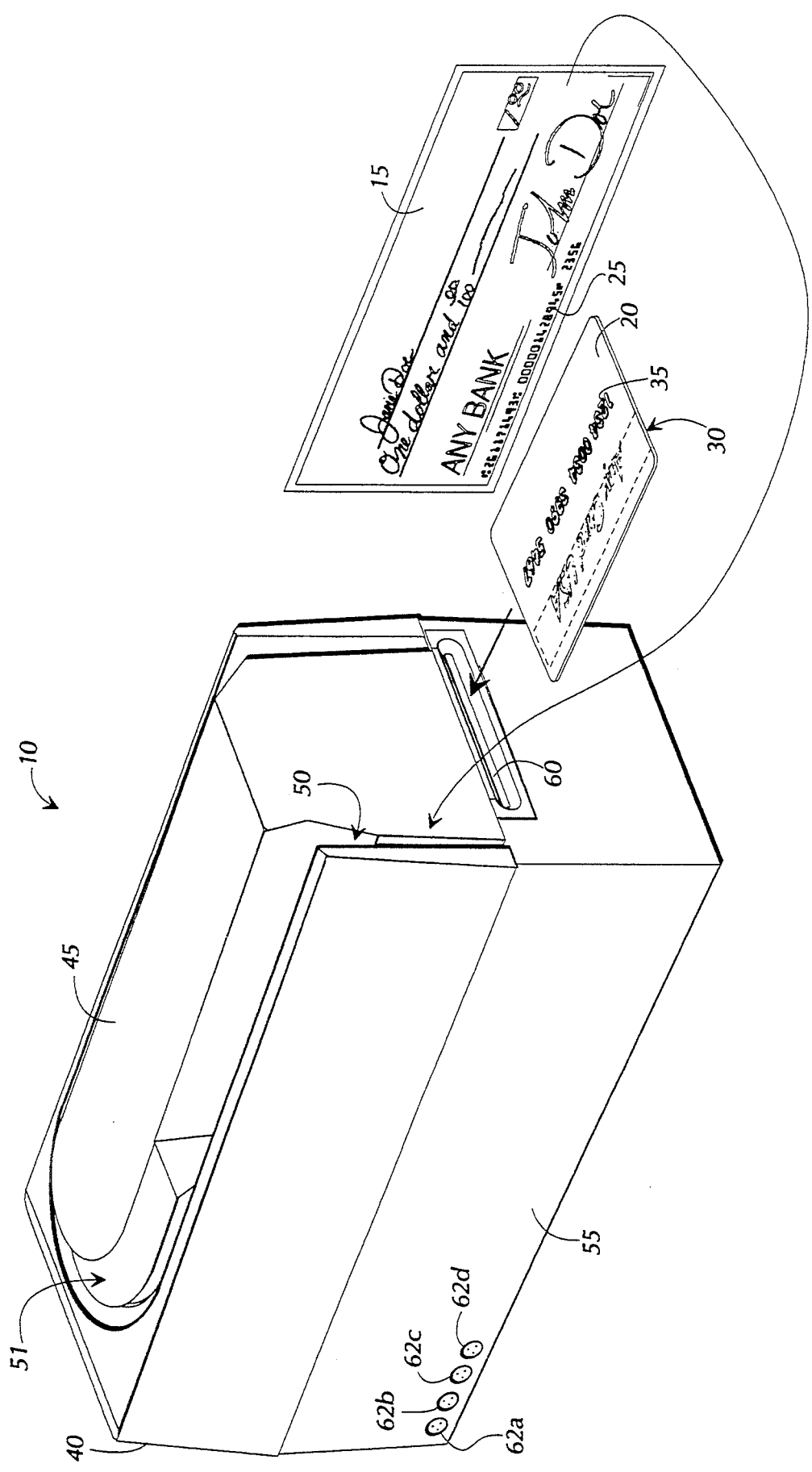
FIG. 1 is a perspective view of a multi-reader terminal constructed in accordance with the preferred embodiment of the present invention for reading transaction data from checks and credit cards.

Referring now to the drawings, in which like numerals represent like elements throughout the several figures, FIG. 1 shows a multi-reader terminal 10 constructed in accordance with the present invention. The preferred multi-reader terminal 10 is designed to gather all credit card or check information necessary for customer transactions such as sales and refunds. Therefore, the terminal 10 is operative to read account data from a check 15 or a credit card 20. When reading data from a check 15, the multi-reader terminal 10 reads account data from the magnetic ink characters 25 printed along the bottom edge of the check. When reading a credit card 20, the multi-reader terminal 10 reads account data from the magnetic stripe 30 on the back of the credit card, or from the embossed characters 35 on the front of the card.

The multi-reader terminal 10 includes a magnetic ink character recognition ("MICR") reader 51, positioned on the top of the terminal. The MICR reader 51 is concealed by a top outer cover 40 and a top center cover 45. Together, the outer cover 40 and center cover 45 form a MICR slot 50 that directs the check 15 into and through the MICR reader 51. When the check 15 is inserted into MICR slot 50, the check is driven past a read head in the MICR reader 51 that reads the account number from the magnetic ink characters 25 printed along the bottom edge of the check 15. The position of the characters 25 along the bottom edge of the check is governed by ANSI standard X9.13-1990, and the form or font of the characters is governed by ANSI standard X9.27-1988, which are published by the American National Standards Institute, Inc., 1430 Broadway, New York, N.Y., and are incorporated herein by reference. The operation of the MICR reader 51 is described more completely below.

The multi-reader terminal 10 also includes a card reader (not shown), positioned interiorly of a card slot 60, that is capable of reading both the magnetic stripe 30 and embossed characters 35 on credit card 20. The magnetic stripe 30 and embossed characters 35 are governed by ANSI standards X4.16-1983 and X4.13-1983, respectively, which are published by the American National Standards Institute, Inc., 1430 Broadway, New York, N.Y., and are incorporated herein by reference. The card reader is concealed by the bottom cover 55, and is accessed by means of the card slot 60. In the preferred terminal 10, the card slot 60 is located on the front panel immediately below the intersection of the top center cover 45 and the bottom cover 55. The operation of the card reader is described more completely below.

The terminal 10 provides, on its exterior housing 55, a plurality of serial data communications ports 62 for providing data communications between control circuitry contained within the terminals and external devices. In the preferred embodiment, four serial ports 62a–62d are provided. These serial ports are bidirectional and are operative in the manner described herein to allow connection in between existing POS terminals and/or electronic cash registers, and in-store processors.

System Configurations

Figure 2A:
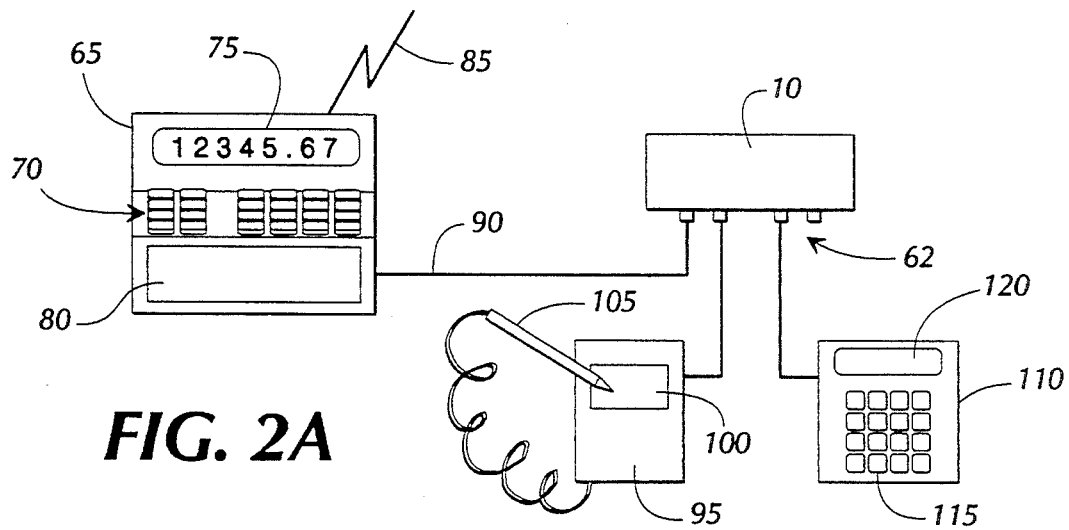
FIGS. 2A-2C are block diagrams illustrating a variety of system configurations in which the preferred multi-reader terminal of FIG. 1 may be used.
Figure 2B:
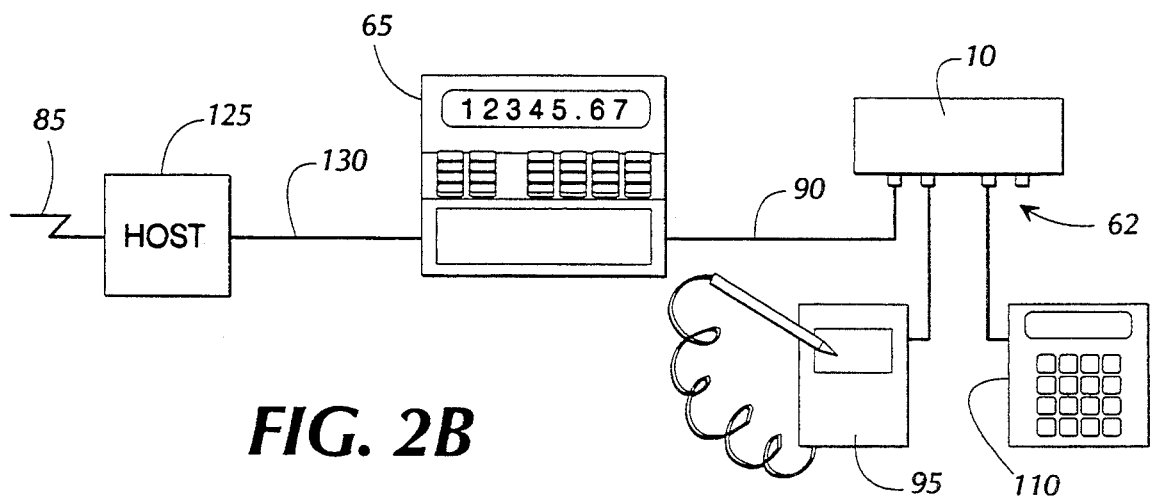
Figure 2C:
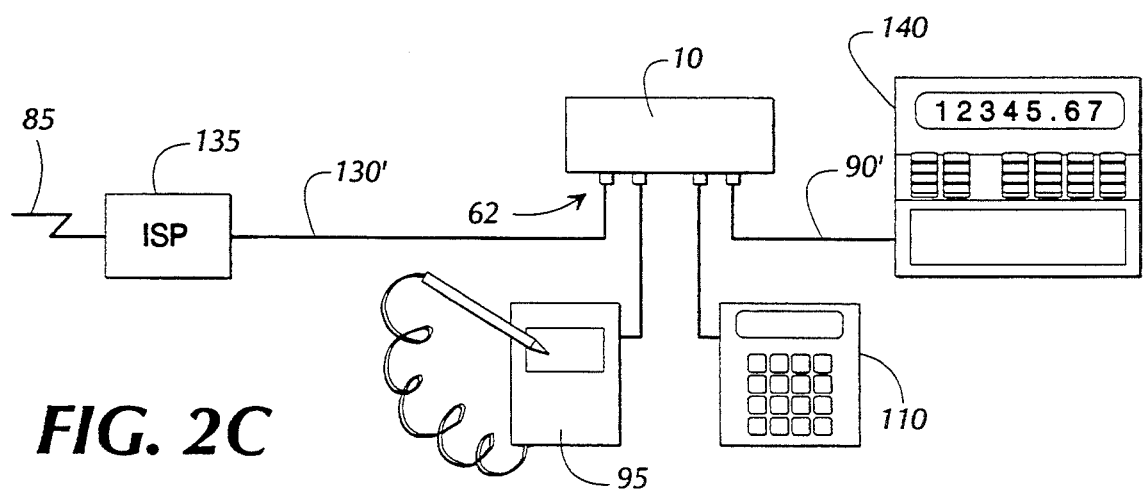

Using the serial ports 62 for data communications, the preferred multi-reader terminal 10 provides check and credit card reading capabilities that may be used in conjunction with a merchant's existing point-of-sale ("POS") system. FIGS. 2A–2C illustrate exemplary configurations in which the multi-reader terminal 10 may be used, with various peripheral devices connected to the terminal via the serial ports 62. Those skilled in the art will understand that the hardware configurations described in conjunction with FIGS. 2A–2C are provided for purposes of illustration only and are in no way intended to restrict the systems in which the preferred multi-reader terminal 10 may be used.

FIG. 2A illustrates the connection between a multi-reader terminal 10 and a single, stand-alone electronic cash register 65. The cash register 65 contemplated in FIG. 2A is capable of communicating with other peripherals (such as a receipt printer, not shown) and may be programmed to interface with multi-reader terminal 10. Typically, an electronic cash register 65 includes a keyboard 70, a display 75, and a cash drawer 80. Cash register 65 may also include a modem (not shown) and therefore be able to communicate electronically with remote facilities such as credit card and check authorization services via telephone line 85. The cash register 65 and multi-reader terminal 10 are connected to each other by means of a serial cable 90 connected to a serial port on the cash register and one of the serial port 62 on the terminal.

When used with the disclosed multi-reader terminal 10, the cash register 65 may effectively be connected to a variety of peripheral devices that facilitate the automatic collection of financial transaction data. For example, the multi-reader terminal 10 may be connected via one of the serial ports 62 to a signature capture pad 95, which is operative to digitize a customer's signature when collected in conjunction with a transaction such as a credit card purchase. Once the signature is digitized, the signature may be transmitted through the terminal 10, to the cash register 65, and then via data communications means associated with the cash register to a third-party credit card processor, along with other transaction data, where the data may be stored for future reference. The preferred signature capture pad includes a signature capture window 100 and an electronic stylus 105. A signature capture device operative as the signature capture pad 95 is described in the referenced Data Card Terminal Application.

The multi-reader terminal 10 may also be connected to a personal identification number ("PIN") pad 110 via one of the serial ports 62. A PIN pad typically includes a keypad 115 and a display 120, and is often used in conjunction with debit card transactions. The PIN pad allows the cardholder to secretly enter his or her PIN. In this manner, the cardholder's identity is verified and the transaction is completed. As used herein, the term "credit card" is also intended to include debit cards to the extent account data is provided in the form of a magnetic stripe and embossed characters.

FIG. 2B illustrates a second exemplary configuration in which the multi-reader terminal 10 may be used. As in FIG. 2A, a serial port 62 on the multi-reader terminal is connected to a serial port on electronic cash register 65 by means of a serial data cable 90. However, the electronic cash register 65 in FIG. 2B is connected to a host computer 125 via a data communications network cable 130. The host computer 125 provides means for communicating with remote facilities such as credit card and check authorization services via telephone line 85. As in FIG. 2A, the multi-reader terminal 10 may alternatively be connected to a signature capture pad 95 and a PIN pad 110, through other serial ports.

The types of electronic cash registers 65 shown in FIG. 2B as connected to a host computer 125 are often "smart" enough (that is, contain sufficient data processing power internally) to operate independently of the host computer. Such smart cash registers typically communicate transaction data between the cash register and the host computer, and are considered "stand alone". However, other types of cash registers are "dumb" terminals, that is, they require constant communication and control by an in-store processor ("ISP").

Some dumb POS terminals 140 are equipped with only one serial port, which is intended for direct connection to a controlling ISP. These dumb terminals (or for that matter, any terminals with only one or a few data communications ports) cannot normally be connected to other peripheral devices at the point of sale, because they only have a limited number of data communications ports. However, limited-port terminals, dumb or otherwise, can be connected to a number of peripheral devices at the point of sale with use of the present invention.

FIG. 2C illustrates a multi-reader terminal 10 connected in series between an ISP 135 and a dumb POS terminal 140. In this configuration, it is contemplated that the POS terminal 140 is not independently programmable and cannot operate on a stand-alone basis, but must be controlled by the ISP 135. In this series configuration, the multi-reader terminal 10 is connected to the ISP 135 by a cable 130 running between a serial port on the ISP 135 and one of the serial ports 62 on the multi-reader terminal. Another of the multi-reader terminal's serial ports 62 is used to connect the multi-reader terminal to the POS terminal 140 via cable 90'. The two remaining serial ports 62 may be connected to other peripheral devices, such as a signature capture pad 95 and/or a PIN pad 110.

As described in greater detail below, the serial ports 62 on the multi-reader terminal 10 may be individually configured. Therefore, it is possible to pass data from one serial port to another. In addition, the multi-reader terminal 10 may be programmed to monitor data from the ISP 135 and to distinguish data intended for the POS terminal 140 from that intended for the multi-reader terminal 10. The multi-reader terminal 10 responds to data intended for it, and passes other data on to the POS terminal. Likewise, data transmitted from the POS terminal 140 to the ISP 135 is passed through the multi-reader terminal 10 without interference. The operation of the multi-reader terminal 10 as it relates to its handling of serial data is described more completely below.

Multi-Reader Mechanical Structure

Figure 3:
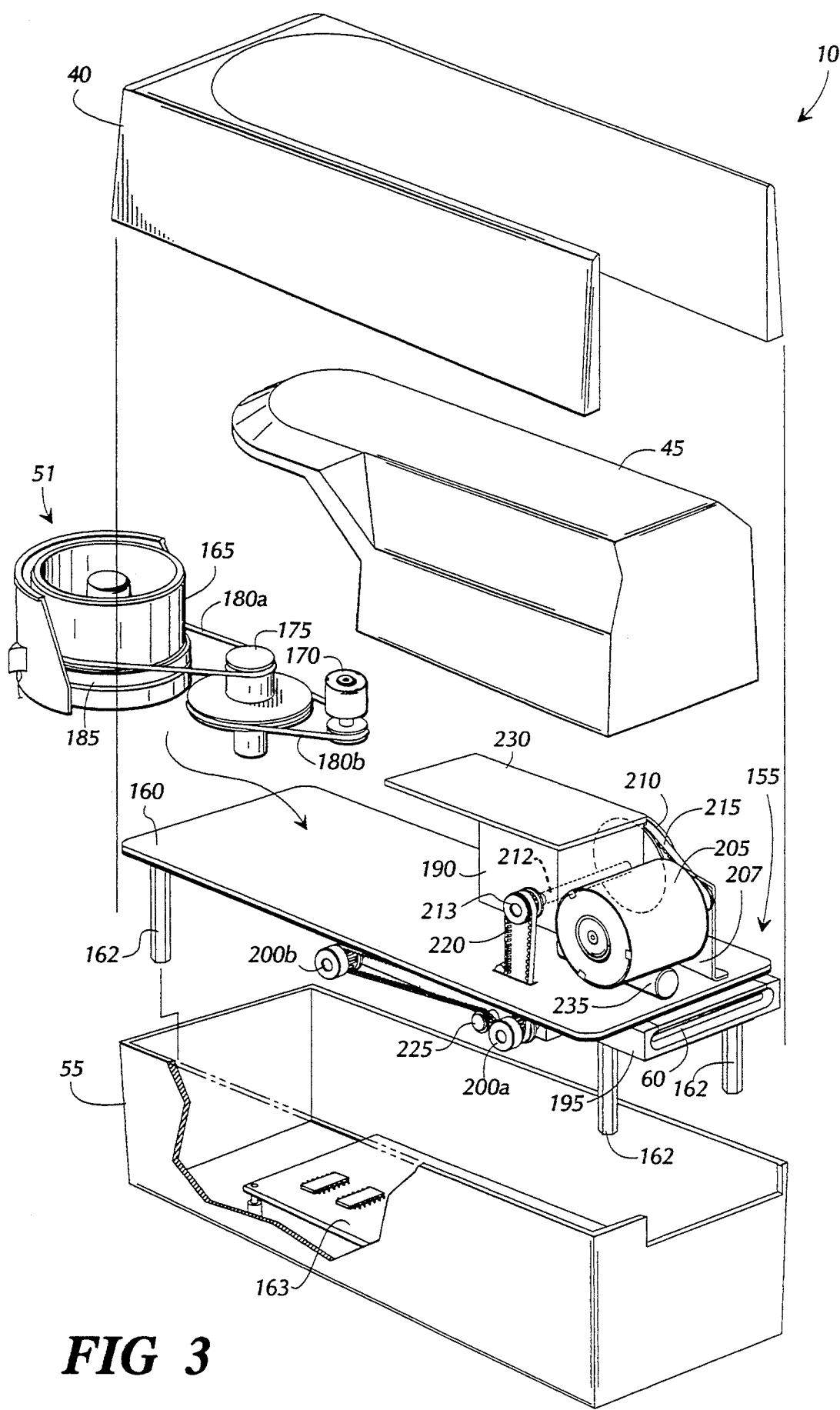
FIG. 3 is an exploded perspective of the multi-reader terminal of FIG. 1, showing the magnetic ink character recognition reader and credit card reader subassemblies.

Turning now to FIG. 3 for a discussion of an exploded perspective view of the major subassemblies that make up the preferred multi-reader terminal 10. The terminal 10 includes a magnetic ink character recognition ("MICR") reader 51 as one subassembly and a credit card reader 155 as another subassembly. Both are mounted to a base plate 160 and are concealed by the top outer cover 40, top center cover 45, and bottom cover 55. The top outer cover 40 and top center cover 45 together define the MICR slot 50, which forms a "U"-shaped path of travel for a check.

The base plate 160 is supported by legs 162 inside the bottom cover 55, providing space for various mechanical and electronic components. A printed circuit (PC) board 163 is mounted on the floor of the bottom cover 55, supported on standoffs beneath the base plate, and is connected by electrical cables to the various electrical components in the multi-reader. The PC board supports various circuitry components described herein.

The preferred credit card reader 155 is a dual function credit card reader, automatically operative to read the magnetic stripe on an inserted credit card, as well as the embossed characters on the credit card, and to provide data indicative of the credit card's account number and other information. This data is provided to a communications controller (described in greater detail below) that controls the transmission of data from the terminal 10 via the serial ports.

The preferred MICR reader 51 is a model 22032001, manufactured by Mag-Tek, Inc., Carson, Calif. Details of the construction and operation of the MICR reader are available in the literature provided by the manufacturer. The MICR reader also provides signals to the multi-reader's communications controller, as described below, indicative of the magnetic ink characters printed on a check or other article. The MICR reader is operative to read all magnetic ink characters encoded on the check or article in the proper position, typically including bank account, bank identity, and, if provided, a transaction amount. It will be understood that cash registers or other POS equipment with magnetic ink printers may imprint the transaction amount or other data on a check or article, and these the printed characters may be read by the MICR.

The MICR reader 51 is attached to the base plate 160 at the end adjacent the closed end of the outer top cover 40, and includes a flywheel 165 that is driven by MICR motor 170 and MICR pulley 175. The flywheel 165, pulley 175, and motor 170 are connected by drive belts 180a, b. The motor 170 is housed within a motor housing 190 that is also attached to base plate 160. The flywheel 165 includes a rubber band 185 about its circumference that engages a check and provides sufficient friction between the flywheel 165 and a check 15. When the control circuitry (not shown) receives signals from sensors (not shown) indicating that a check has been inserted into MICR slot 50 (see FIG. 1), the motor 170 is energized and the check is propelled through MICR slot 50 and past a MICR read head (not shown).

Data indicative of the characters printed in magnetic ink on a check are read by the circuitry of the MICR 51, and provided to a communications controller (described in greater detail below) that controls the transmission of data from the terminal 10 via the serial ports.

FIG. 3 also illustrates the mounting of the credit card reader 155. The card slot 60 is defined in a card reader housing 195 that is mounted beneath the base plate 160, at the end opposite the MICR flywheel 165. The card slot 60 extends into a passageway defined inside the card reader housing 195 forming a path of travel for the card. A credit card is propelled through the card slot by drive rollers 200a, b. Drive rollers 200a, b are driven by card reader motor 205 that is mounted on a motor mounting bracket 207. The motor 205 and motor mounting bracket 207 are mounted on the top side of base plate 160. Motor 205 drives a large pulley 210 mounted to a shaft 212 via a drive belt 215. The shaft 212 extends through, and is supported by, motor housing 190, and has a small pulley 213 mounted at the end opposite the large pulley. The pulley 210 turns shaft 212 and small pulley 213, which in turn, drives drive rollers 200a, b via drive belt 220. Tensioning pulley 225 is provided to adjust the tension of drive belt 220.

A motor filter printed circuit board 230 is attached to the top of motor housing 190 and provides circuitry to condition control signals to both motors 170, 205.

A tubular linear actuator or solenoid 235 is mounted beneath motor 205. The solenoid 235 is operative to lower an embossed character read head into engagement with a credit card, and to remove the read head from engagement, as is described below in greater detail.

Figure 4:
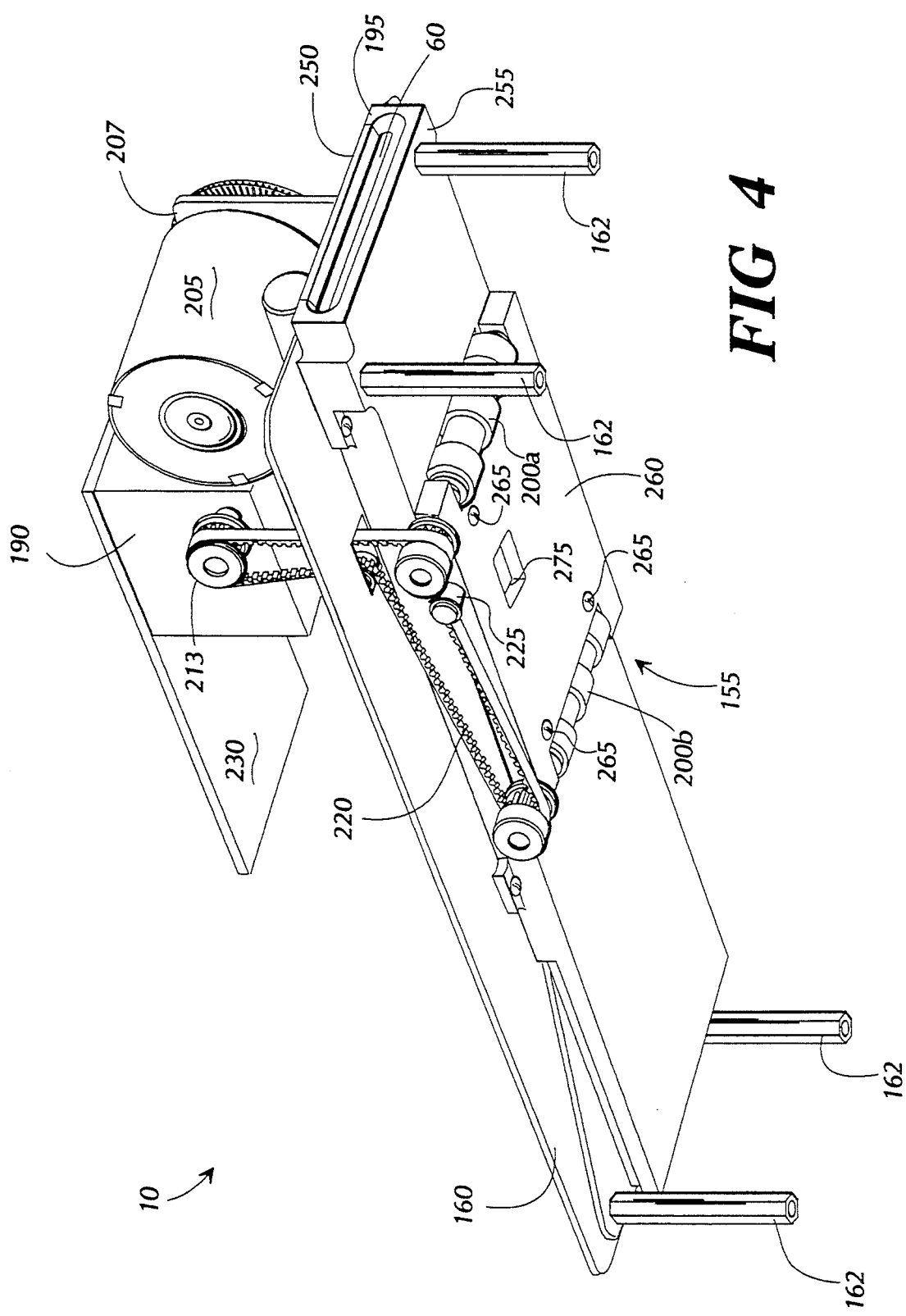
FIG. 4 is a bottom perspective or "worm's eye" view of the credit card reader subassembly in the preferred multi-reader terminal.

FIG. 4 is a bottom perspective, or "worm's eye" view of the preferred multi-reader terminal 10. FIG. 4 also illustrates the relation between the base plate 160 and the elements of the card reader mechanism. Card reader motor 205 and mounting bracket 207 are mounted on the top of the base plate 160. Motor 205 drives small pulley 213 via large pulley 210 (not shown) and shaft 212 (not shown). The shaft extends through motor housing 190. Motor filter printed circuit board 230 is mounted atop motor housing 190. Legs 162 are mounted on the bottom of base plate 160.

As best seen in FIG. 4, the preferred credit card reader 155 comprises a card reader housing 195 including a transport top portion 250, a transport bottom portion 255, and a roller retainer cover 260. The card slot 60 extends into the space defined by the transport top and bottom portions 250, 255.

The roller retainer cover 260 is fastened to the transport bottom portion 255 by screws 265 and retains the drive rollers 200a, b, for rotatable movement. The drive rollers 200 are driven by a drive belt 220 that is coupled to the motor 205. A tensioning idler pulley 225 is mounted adjacent the driver roller 200a to allow adjustment of the tension of drive belt 220.

The roller retainer cover 260 also retains and operatively supports a magnetic read head (not shown) adjacent the read head slot 275 so that the magnetic read head operatively engages with the magnetic stripe on a card through openings (not shown in FIG. 4) leading to the card slot.

Further details of the relationship between the transport top and bottom portions 250, 255 and the roller retainer cover 260 are described more completely below.

FIG. 5 is a left side view of the preferred multi-reader terminal 10, without the covers. This view illustrates the base plate 160 and certain components of the MICR reader 51. The MICR reader 51 includes flywheel 165, rubber band 185, MICR pulley 175, MICR motor 170, and drive belts 180a, b. The pulley 175 is mounted on a vertical shaft 270 that is mounted to the mounting plate 160. MICR motor 170 is housed within motor housing 190.

FIG. 5 also illustrates portions of the card reader subassembly described above in conjunction with FIGS. 3 and 4. These parts include the card reader motor 205, which is attached to motor mounting bracket 207. Motor filter printed circuit board 230 is mounted atop motor housing 190. The motor 205 indirectly drives small pulley 213 (see FIGS. 4 and 5). Small pulley 213, in turn, drives drive rollers 200a, b by means of drive belt 220. Tensioning pulley 225 is used to adjust the tension on drive belt 220. Direction pulley 280 is used to alter the direction of drive belt 220 from the vertical to the horizontal.

Drive rollers 200a, b are supported for rotatable movement by the roller retainer cover 260, which is attached to transport bottom portion 255 by screws 265. Transport top portion 250 fits partially within transport bottom portion 255, and both are attached to the bottom of base plate 160.

Still referring to FIG. 5, the solenoid 235 is a tubular linear actuator or solenoid configured to pull or retract upon actuation, to move an embossed character read head (not shown) into position inside the reader for reading embossed characters. When energized, a plunger 285 is pulled partially into the body of solenoid 235. The plunger 285 is connected to spring 290, which in turn is connected to a lever 295. The lever 295 is attached to a cam-type shaft (not shown) having a flat side, which is mounted in cam mounting blocks 305. The operation of the cam is discussed below in conjunction with the embossed character read head subassembly.

The spring 290, being connected between the plunger 285 and the lever 295 being acted upon, allows the plunger to seat or retract completely when the solenoid 235 is energized. If the plunger is seated completely, the solenoid is able to exert several pounds of force while drawing very little current. If the plunger does not seat complete, the solenoid will be able to exert only a few ounces of force and will draw more current. Thus, it is desirable to allow the solenoid to pull against the spring initially until the plunger is seated. The force of the spring 290 is then able to exert the necessary force on the lever 295 to cause the read head to move into position.

FIG. 6 is a right side view of the multi-reader terminal 10. In addition to the elements shown in FIG. 5, FIG. 6 shows a drive sprocket 310 attached to the shaft of the card reader motor 205. The drive sprocket 310 drives the large pulley 210 by means of a toothed drive belt 215. In addition to the drive sprocket 310, the motor shaft has a slotted disk 315 attached thereto. The slotted disk 315 has a plurality of equally-spaced narrow slits 320 formed about its circumference, and is mounted to rotate within the operative confines of an optical transmitter/receiver 325.

The slotted disk 315, together with the optical transmitter/receiver 325, comprise an optical encoder 330 that is used to measure the distance of travel of a credit card within the card slot. While an optical encoder is employed in the preferred embodiment to measure the movement of the card within the passageway, those skilled in the art will understand that other types of position sensors or encoders such as magnetic pickups, optical, or magnetic sensors may also be successfully employed.

The optical transmitter/receiver 325 incorporates a light emitting diode and a phototransistor that are aligned with each other. As the slotted disk 315 rotates, the light transmitted between the light emitting diode and the phototransistor is interrupted or pulsed. Electrical signals corresponding to the pulsed light are provided on wires (not shown) that are connected to the optical encoder 330. By knowing the relationship between the slit spacing and the rotation of the drive rollers, a microprocessor may calculate the distance of travel of the card.

Figure 7:
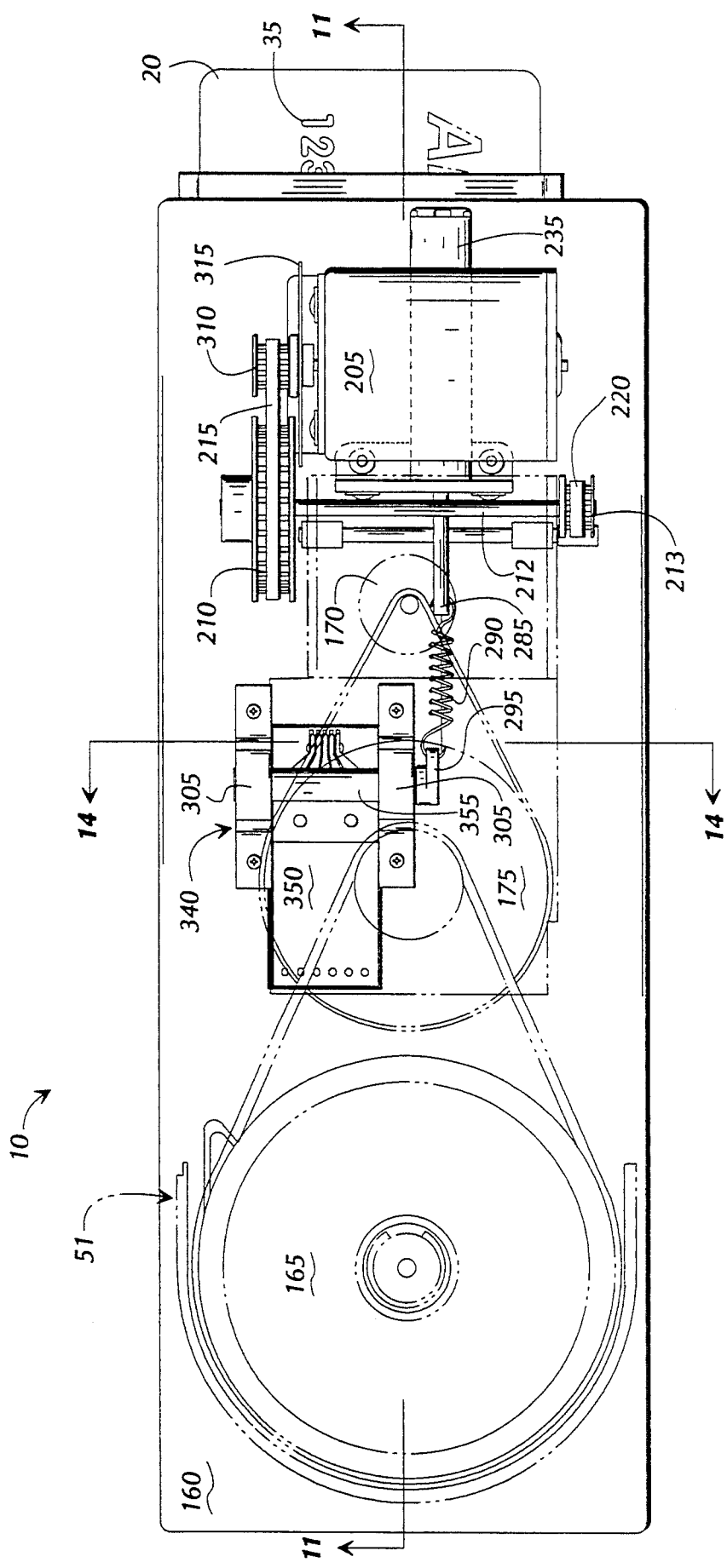
FIG. 7 is a top view of the preferred multi-reader terminal.

FIG. 7 is a top plan view of the preferred multi-reader terminal 10, and shows the relationship between a credit card 20, the embossed characters 35 thereon, the base plate 160, the MICR reader 51, and portions of the card reader subassembly 155. The components of the MICR reader are shown in phantom for clarity, and includes the flywheel 165, the MICR pulley 175, and the MICR motor 170.

FIG. 7 provides another view of the connections between the card reader motor 205 and drive sprocket 310. Belt 215 connects drive sprocket 310 to the large pulley 210 and provides means by which motor 205 drives shaft 212. The small pulley 213 is located on the opposite end of the shaft 212, and drives the drive belt 220. The slotted disk 315 is mounted adjacent to the drive sprocket 310.

Tubular pull solenoid 235 is mounted between the card reader motor 205 and base plate 160, underneath the motor. The solenoid plunger 285 extends from the solenoid and is attached to the spring 290. A read head subassembly 350 is provided for reading the embossing on a card 20. The solenoid is operative to cause the embossed character read head subassembly 350, which is normally maintained in a retracted position, to be lowered into the card slot so that it makes operative contact with the embossed characters 35 on the credit card.

Figure 10A:
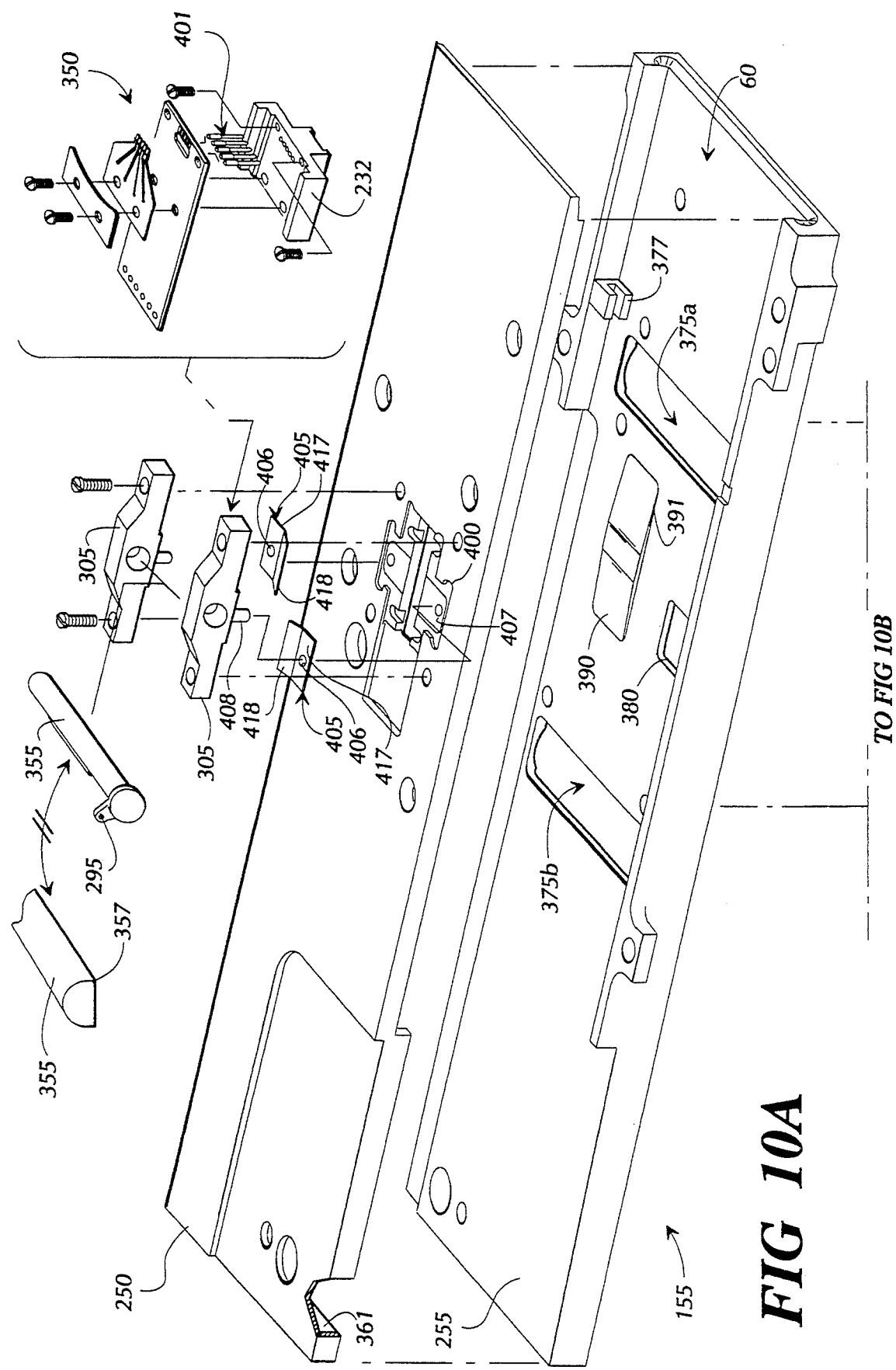
FIG. 10, consisting of FIGS. 10A and 10B, is an exploded perspective view of the credit card reader subassembly.
Figure 10B:
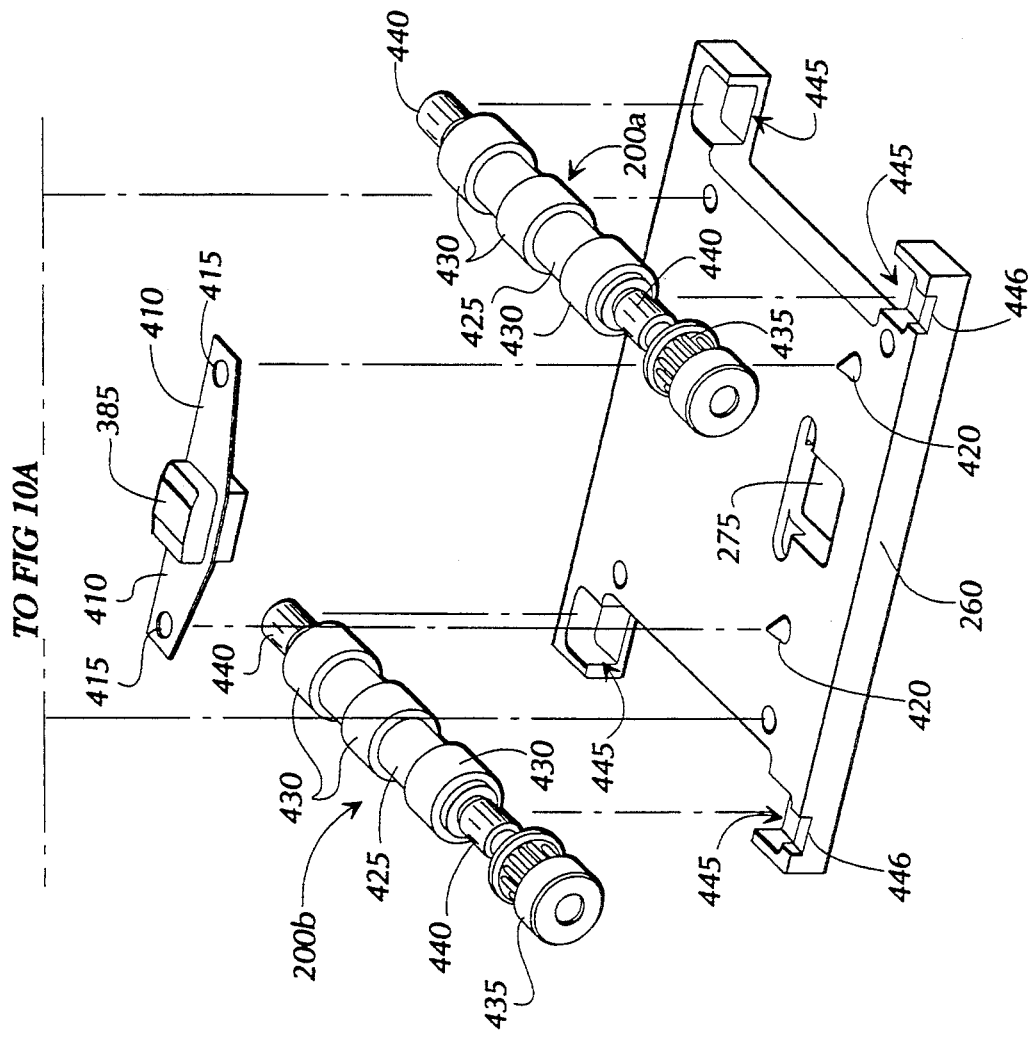

In order to lower the read head subassembly into operative position, means 340 are provided for engaging the embossed card reader subassembly 350 into operative position for reading the embossing on a card being transported inside the reader 155. The embossed card reader engaging means 340 comprises a cam shaft 355 and lever 295 are connected to the solenoid 235 via spring 290. As best seen in FIG. 10 and in FIGS. 11E and 11F, the cam 355 is mounted in cam mounting blocks 305, and has a flat side terminating in an engaging edge 357 that is positioned over the read head subassembly 350. The cam 355 rotates slightly when the solenoid 205 is energized (retracted). The edge 357 of the flat portion of the cam 355 engages with the read head subassembly 350 and depresses it into operative position to read the embossing, as shown in FIG. 11F.

The mounting and operation Of the embossed character read head subassembly will be described more completely below.

Figure 9:
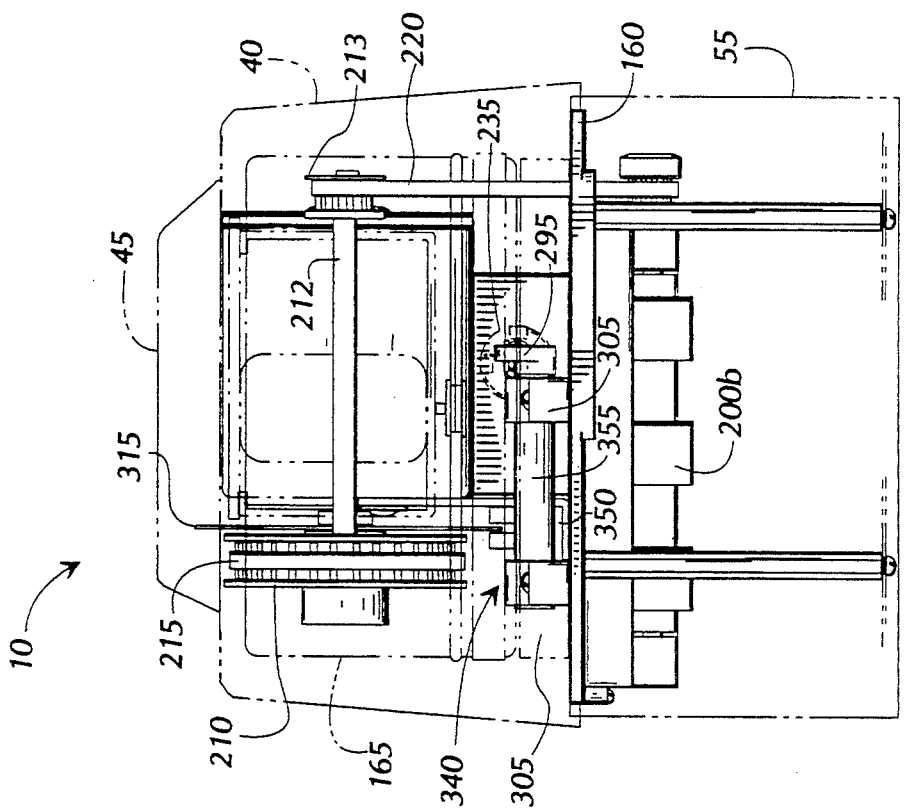
FIG. 9 is a rear view of the multi-reader terminal.
Figure 8:
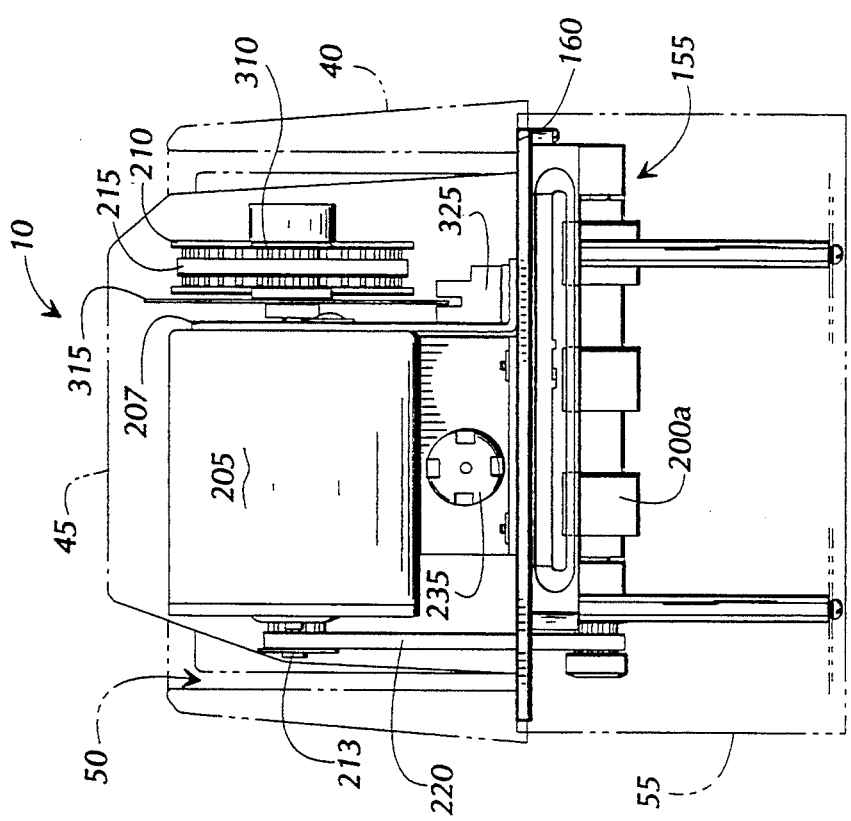
FIG. 8 is a front view of the multi-reader terminal.

FIGS. 8 and 9 are a front view and rear view, respectively, of the internal portions of the preferred multi-reader terminal 10. The top outer cover 40, top center cover 45, bottom cover 55, and MICR flywheel 165 are shown in phantom for reference. The top outer cover 40 and top center cover 45 define the MICR slot 50, into which a check is inserted.

As seen in FIG. 8, the card reader motor 205 is attached to an upright motor mounting bracket 207, which is mounted on the base plate 160. The slotted disk 315 and drive sprocket 310 are mounted on the shaft that extends from motor 205. A portion of the slotted disk 315 is extended into a void formed in the horseshoe-shaped optical transmitter/receiver 325. The motor 205 is operative to drive the large pulley 210 by means of the drive belt 215. The large pulley 210 is connected to the shaft 212; the small pulley 213 is mounted on the end of the shaft 212 opposite the large pulley 210. The drive belt 220 is in operative contact with small pulley 213, and is operative to drive the drive rollers 200a, b.

FIG. 9, in addition to the elements described in the preceding paragraph, illustrates the position of the solenoid 235 between the motor 205 and base plate 160, and shows that the solenoid is mounted approximately midway across the width of the base plate 160, with the embossed character reader engaging means 340 positioned offset to one side. The lever 295 is mounted on the interior side of the cam mounting blocks 305. The cam 355 is mounted between the cam mounting blocks 305, aligned with the actuator of the solenoid 235, immediately above the read head subassembly 350. The interaction between the cam 355 and read head subassembly 350 will be described more completely below.

FIG. 10 illustrates, in exploded form, a card reader housing comprising the transport top portion 250 and a transport bottom portion 255 of the credit card reader assembly 155. Together, the top portion 250 and bottom portion 255 define a path of travel for an inserted card, beginning at the card slot 60 and extending along the length of the card reader housing to a downwardly extending end portion 361 which forms barrier to stop inward movement of the credit card. The card reader housing is mounted to the bottom side of the base plate 160 (not shown).

The transport bottom portion 255 includes two transversely extending rectangular slots 375a, b, through which portions of the surface of the drive rollers 200a, b extend drive rollers 200 protrude into the slots 375 and make contact with a credit card once it is inserted into the slot 60. As the card is inserted into the slot, it passes through a horseshoe-shaped optical card insertion sensor 377, which is identical to the optical transmitter/receiver 325 that forms a part of the encoder 330. The optical sensor 377 provides a signal to the control circuitry (not shown) indicating that a card has been inserted into the slot.

After detection of insertion of a card, the control circuitry then activates the motor 205 to begin a card read cycle. When motor 205 is activated, the leading drive roller 200a "grabs" the card and pulls it completely into the slot 60. The spacing between slots 375a, b is slightly less then the length of a credit card so that the card is "handed off" from one roller 200a to the other or trailing roller 200b.

The transport bottom portion 255 also includes a magnetic read head slot 380, through which magnetic stripe read head 385 protrudes into operative contact with the magnetic stripe on a card being transported. The read head slot 380 is positioned so that the magnetic stripe on the back of a credit card passes directly over the read head as the card travels through the slot 60.

The transport bottom portion 255 further includes a biasing ramp 390 defined on its interior bottom wall. The biasing ramp 390 extends upwardly into the path of travel of a card, and is aligned with the path of the embossed characters on the card. The biasing ramp is operative to press or bias the embossed characters upward against the embossed character read head subassembly 350 when the read head is lowered to make contact with the credit card. This ensures that there is proper operative contact between the embossed characters 35 and the read head 350.

The preferred biasing ramp 390 comprises a flat rectangular metal spring that is confined within a rectangular depression 391 in the interior bottom surface or wall of the transport bottom portion 255. The elongate dimension of the metal of the spring is slightly larger than the elongate dimension of the rectangular depression 391, so that the spring must be slightly bent to fit into the depression and it bows upward slightly. Alternatively, the biasing ramp 390 may be formed as a molded feature of the transport bottom portion 255.

Still primarily referring to FIG. 10, the transport top portion 250 includes a read head mounting recess or slot 400. The slot 400 is positioned directly above the biasing ramp 390. An embossed character read head subassembly 350 is received within the slot 400 and is supported upon two flat springs 405. The read head subassembly 350 is operative to contact with the embossed characters on a card and provide electrical signals corresponding to the characters, which are decoded as described in the referenced Embossed Character Reader Application. The preferred read head subassembly 350 includes a plurality of elongate pins 401 that contact with the embossing on the card. In the preferred embodiment, the read head subassembly 350 is an embossed character reader constructed in accordance with the referenced Embossed Character Reader Application. Reference is made to this incorporated-by-reference application for a discussion on the operation of this subassembly.

The embossed character read head subassembly 350 is supported in the slot 400 upon two beryllium copper springs 405 beneath cam 355 and between cam mounting blocks 305. The copper springs 405 support the read head subassembly in a normally retracted or upward position, with the pins of the embossed character reader withdrawn from the path of the card. When the engaging edge 357 of the cam 355 is not in contact with the read head 350, the springs 405 exert upward pressure on the read head 350 and cause the read head to be retracted from the card slot. When the solenoid 235 (not shown) is energized, the cam rotates approximately 20°, and the edge 357 exerts downward pressure on the read head 350, causing the read head to be lowered to a second, operative position wherein the pins of the read head are disposed within the passageway 448 and contact with the embossed characters on a credit card. Once the solenoid 235 is de-energized, the springs 405 cause the read head 350 to return to its retracted position.

Figure 14:
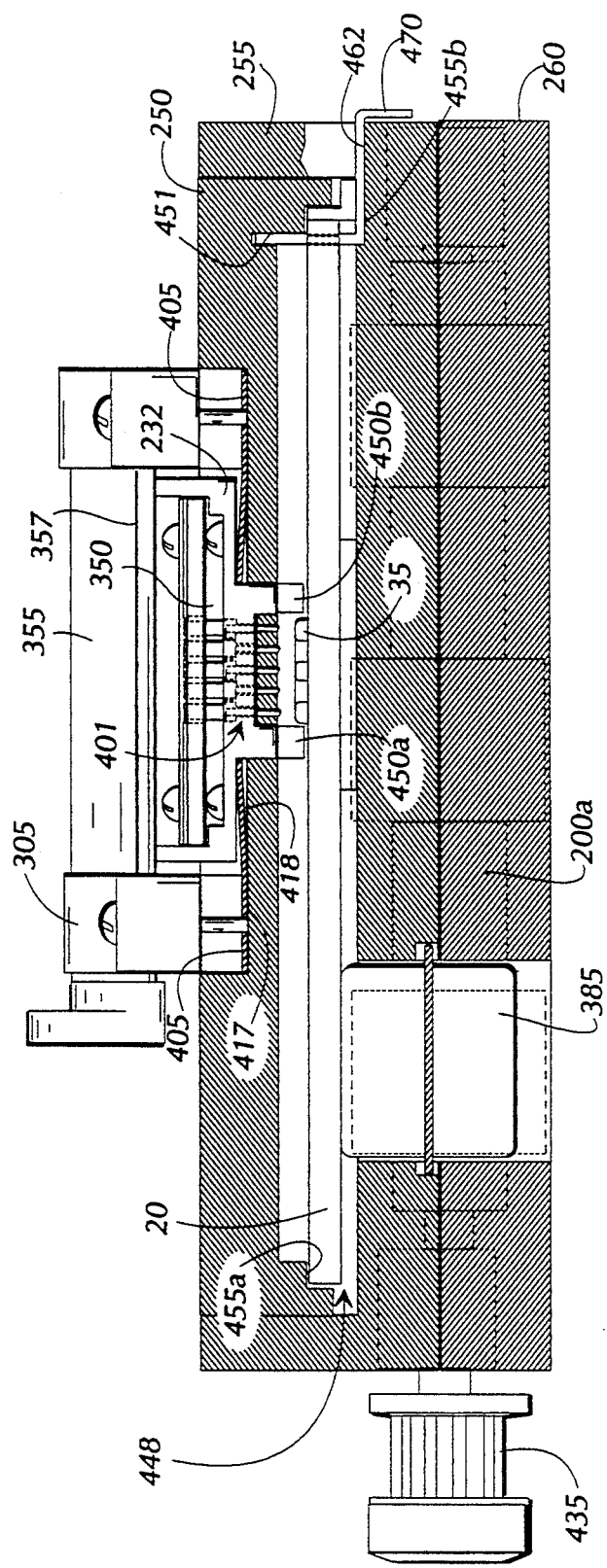
FIG. 14 is a cross-sectional view taken along the line 14—14 of FIG. 7.

The springs 405 include mounting holes 406 that engage with downwardly extending spring holding pins 408 on the bottom surface of the cam mounting blocks 305. These pins 408 hold the springs in position. Each spring is located in a shallow subrecess 407 that allows full compression or flattening when the read head is moved to its operative position. The springs are essentially flat beryllium copper having a first rectangular portion 417 including the mounting holes 406 and a second rectangular but angularly elevated portion 418. The second angularly elevated portion 418 sits beneath the wings 232 of the embossed read head subassembly 350 and springably supports the read head in a first, normally retracted position. FIG. 14 also illustrates this support.

Still referring to FIG. 10, the roller retainer cover 260 supports the magnetic read head 385 and drive rollers 200a, b. The magnetic read head 385 is mounted within an assembly that includes a generally rectangular leaf spring 410. The leaf spring 410 has mounting holes 415 at each end that rest on conical mounting studs 420 defined in the cover 260. The leaf spring 410 allows the magnetic read head 385 to float and biases the read head 385 upwardly through the read head slot 380 in the transport bottom portion 255 against the magnetic stripe on a credit card as the card moves within the slot 60. The read head slot 275 in the retainer cover 260 provides a passage for wires (not shown) that are connected to the read head and carry electrical signals corresponding to the account data stored on the magnetic stripe.

Each drive roller 200 is similarly constructed and comprises a generally cylindrical shaped shaft 25 having a plurality of resilient silicone rubber bushings 430 spaced apart along the shaft. The resilient bushings 430, three in the preferred embodiment on each roller, provide friction between the drive roller(s) and the credit card. One end of each drive roller shaft 425 includes a drive sprocket 435. The drive sprockets are engaged by the toothed drive belt 220 (not visible in FIG. 10), which causes the rotation of the drive rollers 200.

Each drive roller shaft 425 is supported for rotation via a pair of needle bearings 440 mounted at either end to reduce friction during rotation. One bearing is spaced slightly inwardly from the drive sprockets 435, while the other is located at the opposite end of the shaft. The needle bearings 440 are supported in notches 445 formed within the roller retainer cover 260. The drive sprockets 440 extend beyond the edges of the retainer cover 260, extending through an opening 446 extending into the notches 445 along one side of the retainer cover.

The magnetic read head 385 and drive rollers 200a, b are held in place without additional fasteners when the roller retainer cover is mounted to the bottom of the transport bottom portion 255.

FIG. 11 shows the movement of a credit card 20 through the card reader 155 during a mad cycle. Each of the several subfigures shows a credit card 20 having embossed characters 35 on its top surface and a magnetic stripe 30 on its bottom surface. The card 20 is inserted into the card slot 60. The top or operative surface of the magnetic stripe read head 385 extends into a passageway 448 defined between the housing portions 250, 255 forming the card's path of travel, and is held in place by mounting studs 420 and roller retainer cover 260. The biasing ramp 390 on the transport bottom portion 255 also extends into the passageway 448. The pins 401 of the embossed character read head subassembly 350 are withdrawn in the rest or retracted position until the embossing is to be mad.

In FIG. 11A, the credit card 20 has not yet been inserted into card slot 60 and the card reader is in its idle state. In this idle state, the cam 355 is positioned so that the embossed character read head 350 is retracted from the card slot 60 so as to avoid any contact with the card. Those skilled in the art will appreciate that any contact between the embossed character read head 350 and the card during a magnetic stripe read cycle is likely to cause instantaneous variations in the card's velocity and interfere with the accuracy of the magnetic stripe read. Therefore, the pins 401 of the embossed character read head 350 are engaged into the passageway 448 only during an embossed character read subcycle of a card read cycle.

In FIG. 11B, the card 20 has been inserted into the card slot 60 and is in contact with the leading drive roller 200a. Immediately prior to contacting the leading drive roller, the card encounters the card sensor 377 (not shown). The card sensor 377 sends a signal to control circuitry (not shown) indicating that a card 20 has been inserted into card slot 60. The control circuitry then sends signals to the motor 205 (not shown), and the motor causes drive rollers 200a, b to pull the card into the card passageway 448.

FIG. 11C illustrates the position of the card 20 after the card has been driven across magnetic read head 385 and into contact with drive roller 200b. The drive rollers 200a, b are spaced so that the card 20 never leaves contact with one of the rollers, but is passed or "handed off" from one drive roller to another. Thus, a card is "handed off" from drive roller 200a to drive roller 200b, which are rotated by a common drive belt, and its motion is not interrupted.

As the card passes over magnetic read head 385, the reader attempts to read the account data from the magnetic stripe 30 on the bottom surface of the card 20. If the magnetic stripe read is successful, the card is ejected as described below.

If the magnetic stripe read is not successful on the first attempt, in the preferred embodiment the card will not be ejected until a further reading attempt. Rather, the card direction is reversed, and the drive rollers move the card 20 back into the reader for a second magnetic stripe read attempt. As the card is transported across magnetic read head 285 for the second time, the read head attempts to read the account data from the magnetic stripe. Thus, in FIG. 11D the card will not be ejected but will be returned into the passageway 448.

It should be understood at this juncture that the control circuitry (not shown) is operative to determine the precise position of the card 20 within the passageway 448 by means of the optical encoder 330 described above. Thus, it is possible to stop the card in the position shown in FIG. 11D prior to its ejection, and move the card back into the passageway for another, second attempt at reading the magnetic stripe.

If the magnetic stripe reading is successful on the second (or any subsequent) attempt, the card 20 will be ejected from the card slot as described below. If the subsequent attempt at reading is not successful, the direction of the card will be reversed again, and the card will again be transported to the most inward position illustrated in FIG. 11E. As the card 20 passes over the magnetic read head 285, another attempt at reading the account data recorded on the magnetic stripe is made. If the magnetic strip read is successful on any attempt (unless multiple readings are required for additional security or verification), a card will be ejected as described below.

Figure 11D:
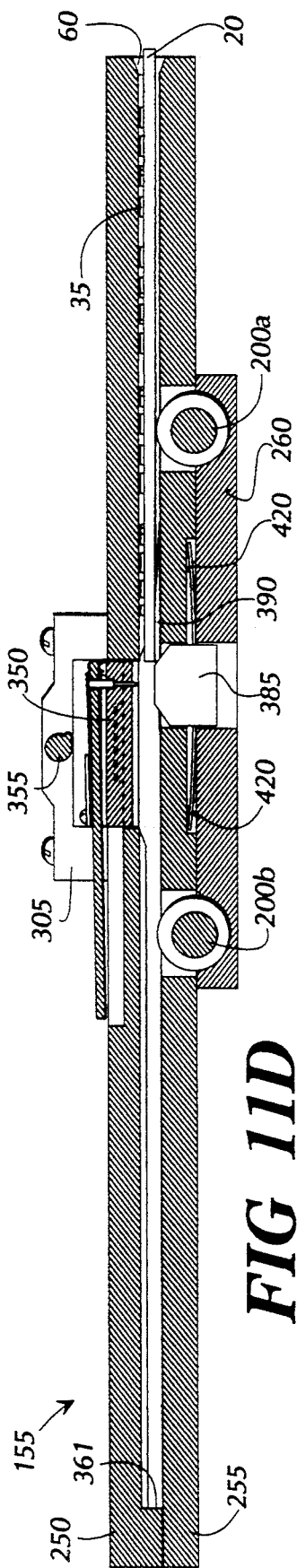
FIG. 11, consisting of FIGS. 11A-11H, is a cross-sectional view taken along the lines 11—11 of FIG. 7, showing the movement of a credit card through the reader during a read cycle.
Figure 11E:
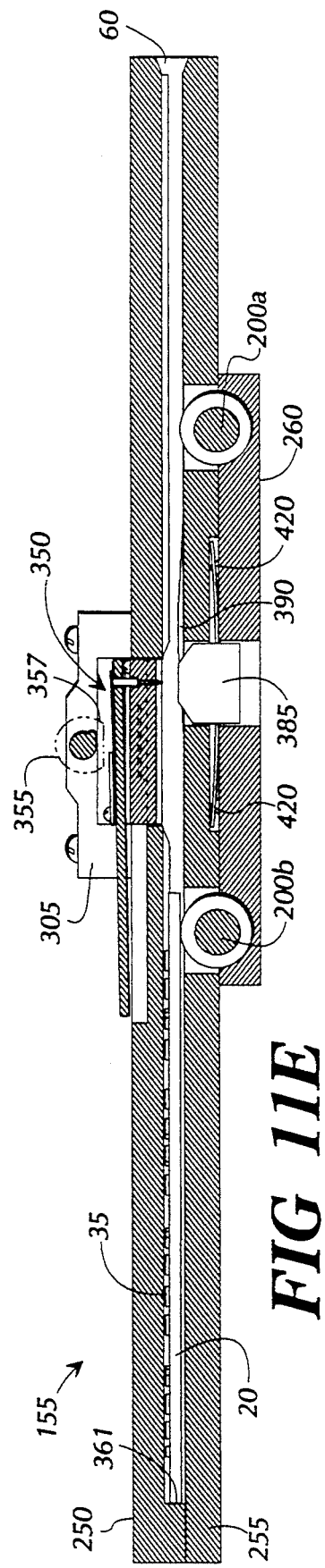
Figure 11F:
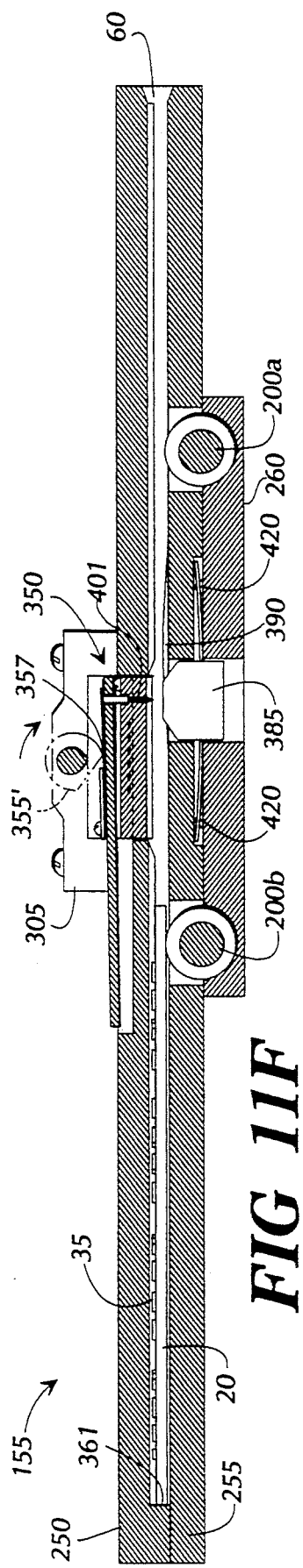

If unsuccessful at reading the magnetic stripe, the reader will keep the card in most inward position as in FIG. 11E, while the embossed character read head 350 is lowered into the passageway 448, as illustrated in FIG. 11F, so that the pins 401 protrude into operative position within the passageway. As described above, the embossed character read head 350 is lowered into the passageway when the solenoid 235 (not shown) is energized and the cam 355 rotates slightly to exert downward pressure on the read head 350 to move the read head into its second position.

Figure 11G:
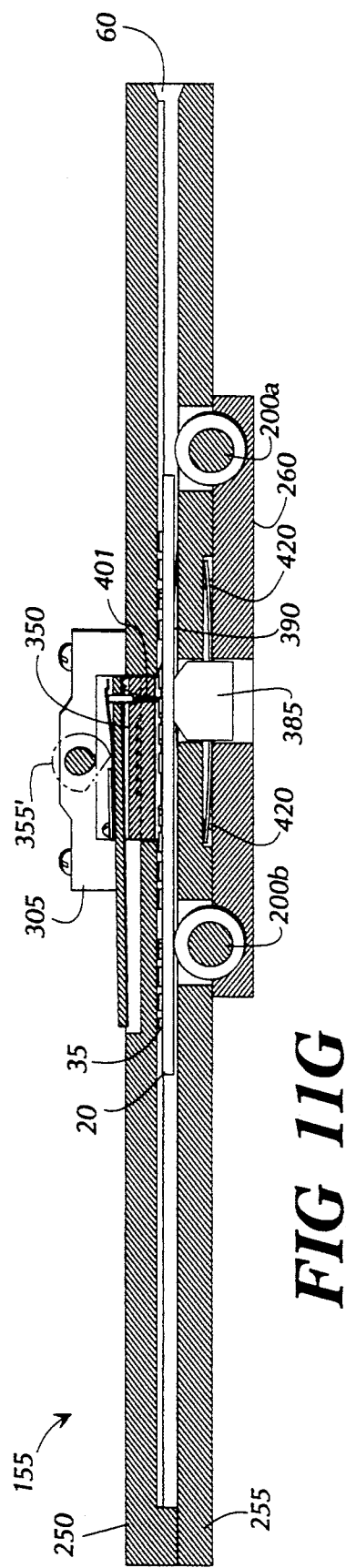
Figure 11H:
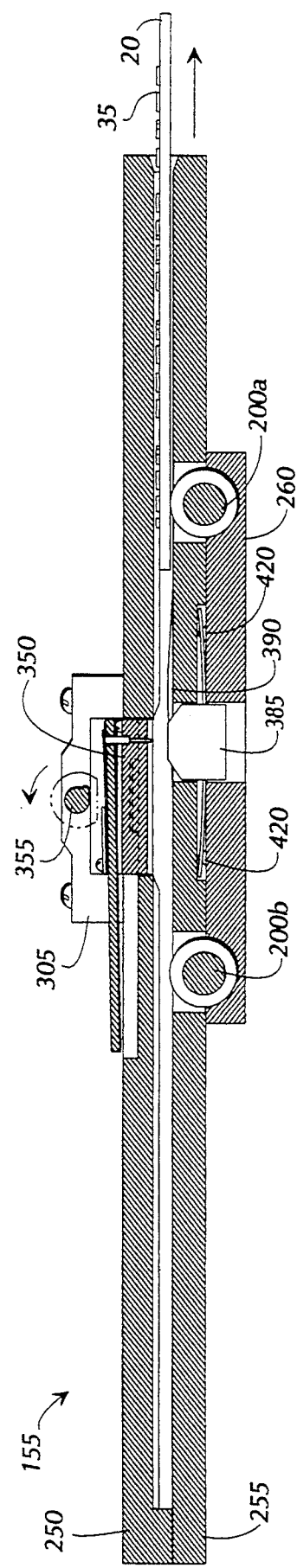

Once the embossed character read head 350 is positioned in the card slot, the drive rollers 200 move the card 20 back toward the opening of card slot 60. FIG. 11G illustrates the interaction between pins 401 and the embossed characters 35 as the card moves beneath the read head. The biasing ramp 390 ensures that the embossed characters are biased upwardly against the pins during an embossed read cycle. The read head 350 provides electrical signals corresponding to the embossed characters. These signals are decoded by control circuitry (not shown) as described in the referenced Embossed Character Reader Application.

After the embossed characters are detected by the read head 350, the card read cycle, comprising any magnetic stripe reading subcycle(s) and any embossed character reading subcycle(s), is complete. At this point, the drive roller 200a ejects the card by driving it partially out of the card slot 60, so that the operator may grasp and remove the card. As the card is ejected, the embossed character read head 350 is retracted from the passageway 448 so that the reader 155 returns to the idle state illustrated in FIG. 11A, and is again ready for another card to be inserted.

Figure 12:
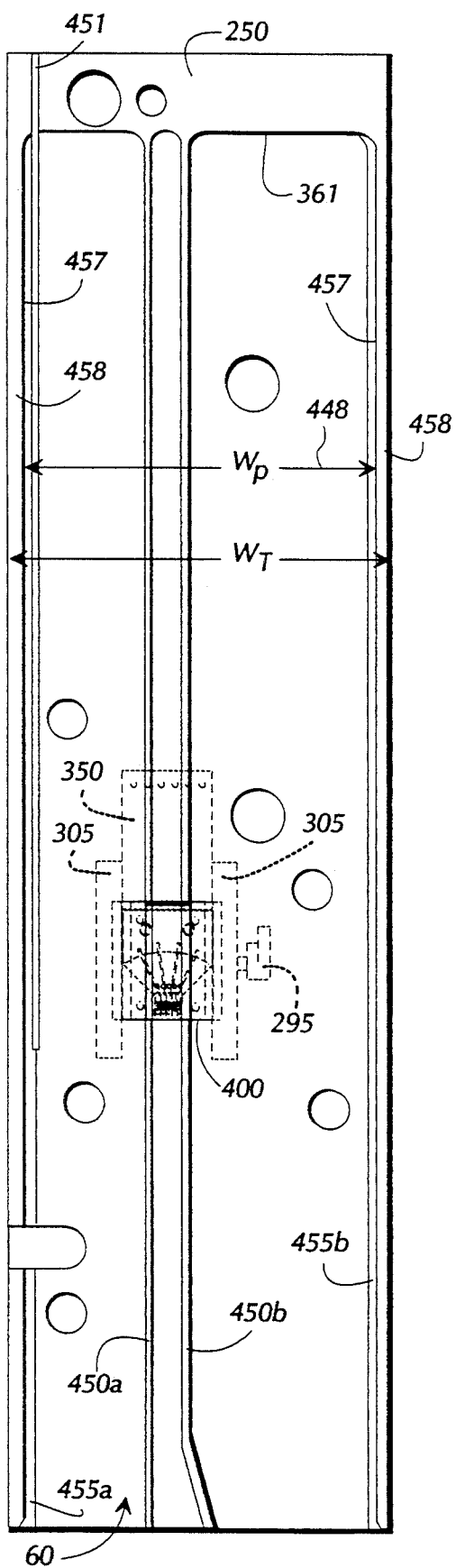
FIG. 12 is a bottom plan view of the top portion of the credit card reader housing.

FIG. 12 shows the inside portion of the transport top portion 250. The embossed character read head subassembly 350, cam mounting blocks 305, and lever 295 are shown in phantom for reference. When a credit card (not shown) is inserted in card slot 60, the embossed characters are guided by narrow parallel embossing guide ribs 450a, b in the passageway along a path adjacent the embossed character read head 350. The guide ribs 450 extend slightly from the surface of the top portion 250 and into the passageway. The guide ribs 450 also diverge slightly at the entrance of slot 60 in order to act as a funnel and direct the embossing into the slot 60. Inasmuch as the distance from the edge of a credit card to the characters embossed on the card may vary slightly from one card type to another, the guide ribs 450 help compensate for these variations and ensure that the embossing is always directed under the embossed character read head 350.

The width $W_P$ of the card passageway 448 is defined by the inner edges 457 of the transport top portion 250. The exterior width $W_T$ of the top portion is defined by outer walls 458.

An elongate ejector groove 451 is provided in the top portion 250, at the end opposite the insertion slot 60, for supporting and guiding an ejector bar 470 (FIG. 14) for extricating a stuck card. The ejector bar 470 works substantially as described in the referenced Embossed Card Reader Application, in that it includes a generally "L" shaped foot that normally lies at the barrier 361 of the slot and provides a means for ejecting a card that becomes jammed in the reader when the ejector bar is pulled outwardly along the groove 451.

In order to obtain an accurate magnetic stripe read, it is important to reduce or eliminate any feature of the transport top portion 250 that provides friction between the credit card and the top portion, or otherwise interferes with the travel of the credit card along the passageway. Those skilled in the art will understand that any abrupt changes in the velocity of a credit card due to friction or other causes may interfere with the magnetic read cycle. This is because the signals read from the magnetic stripe will temporally vary in response to velocity changes in the card as it encounters or leaves obstacles, or meets with more or less friction as the card moves. Temporally varying signals are more difficult to reliably decode since they can be misinterpreted.

In order to reduce friction, the transport top portion 250 employs integrated outer card support ribs 455a, 455b, which, like the guide ribs 450, extend slightly from the surface of the top portion 250. These card support ribs 455 are very narrow, machined (or molded) with a smooth surface, and are positioned toward the outer edges of the passageway so that only the outer edges of a card are in contact with the ribs. The ribs 455 are defined in the top portion immediately inside the inner edges 457.

When the card is moving within the card passageway, the outer card support ribs 455 and guide ribs 450 are the only surfaces that engage the top surface of the credit card. In this manner, the guide ribs 450 and outer ribs 455 present a minimized surface area to touch a credit card as it travels, and thus minimize the resistance (friction) to movement of the card.

In order to further reduce the friction between the credit card and the top portion 250, the top portion is preferably fabricated of injection molded plastic that has a low friction, low wear quality, such as acetyl polymer resins sold under the trademarks CELCON ™ manufactured by Celanese Corp. or DELRIN ™ manufactured by DuPont Co.

Figure 13:
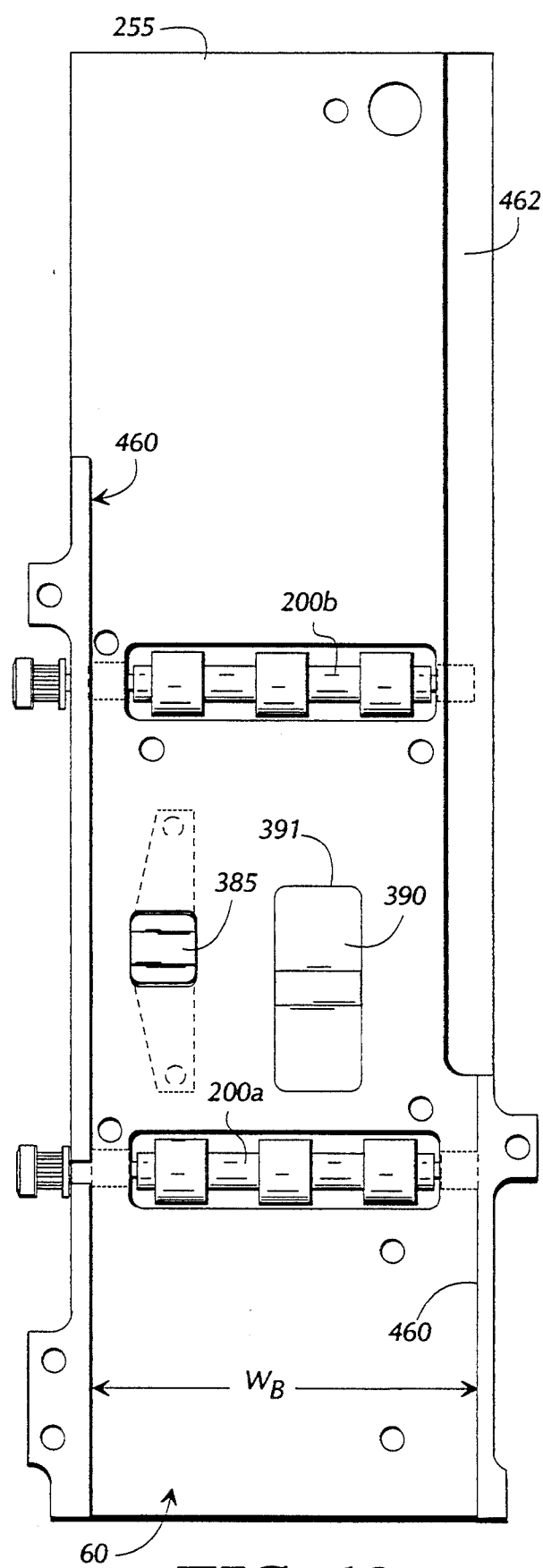
FIG. 13 top plan view of the bottom portion of the credit card reader housing.

FIG. 13 shows the inside portion of the transport bottom portion 255. This view also illustrates the positioning of the drive rollers 200a, b, magnetic stripe read head 385, and biasing ramp 390. It will be seen that the magnetic stripe read head 385 and the biasing ramp 390 are positioned between the two drive rollers 200.

The interior width $W_B$ of the bottom portion 255 is defined by the inner edges 460 that extend substantially the length of the bottom portion. The entire width WT of the transport top portion 250 fits in the width $W_B$ between the inner edges 460 of the bottom portion when the transport top and bottom portions 250, 255 are mated together and attached to the bottom of the base plate 160.

A recess 462 is defined in the bottom portion 255 along a portion of the right side, so as to provide clearance for the ejector bar (not shown) as it moves to eject a card.

FIG. 14 is a front cross-sectional view of the interior of the card passageway 448, illustrating the relationship between a credit card 20, the magnetic stripe read head 385, and the embossed character read head 350. Note that the slot 400 is preferably constructed such that the read head 350 is supported in the manner described in referenced Embossed Character Reader Application, with a lowered surface or recess for supporting the wings 232 of the read head. The embossing guide ribs 450 engage the embossed characters 35 and direct the card along a path adjacent the embossed character read head 350. Along with outer ribs 455, the guide ribs 450 engage the top surface of card 20 and provide a smooth, low friction interface between the transport top portion 250 and the card 20.

The ejector bar 470 is shown looking down the passageway 448 with an upright portion behind the card 20 that fits in the ejector groove 451 and engages with the card, a horizontal portion that slides along in the recess 462, and a downwardly extending portion that lies alongside the housing.

Drive roller 200a, which appears in the foreground in FIG. 14, is shown in phantom for reference. The drive roller and magnetic stripe read head 385 are held in place against the transport bottom portion 255 by roller retainer cover 260. Drive sprocket 435 is shown exterior to the transport bottom portion 255.

Control Circuitry

Figure 15:
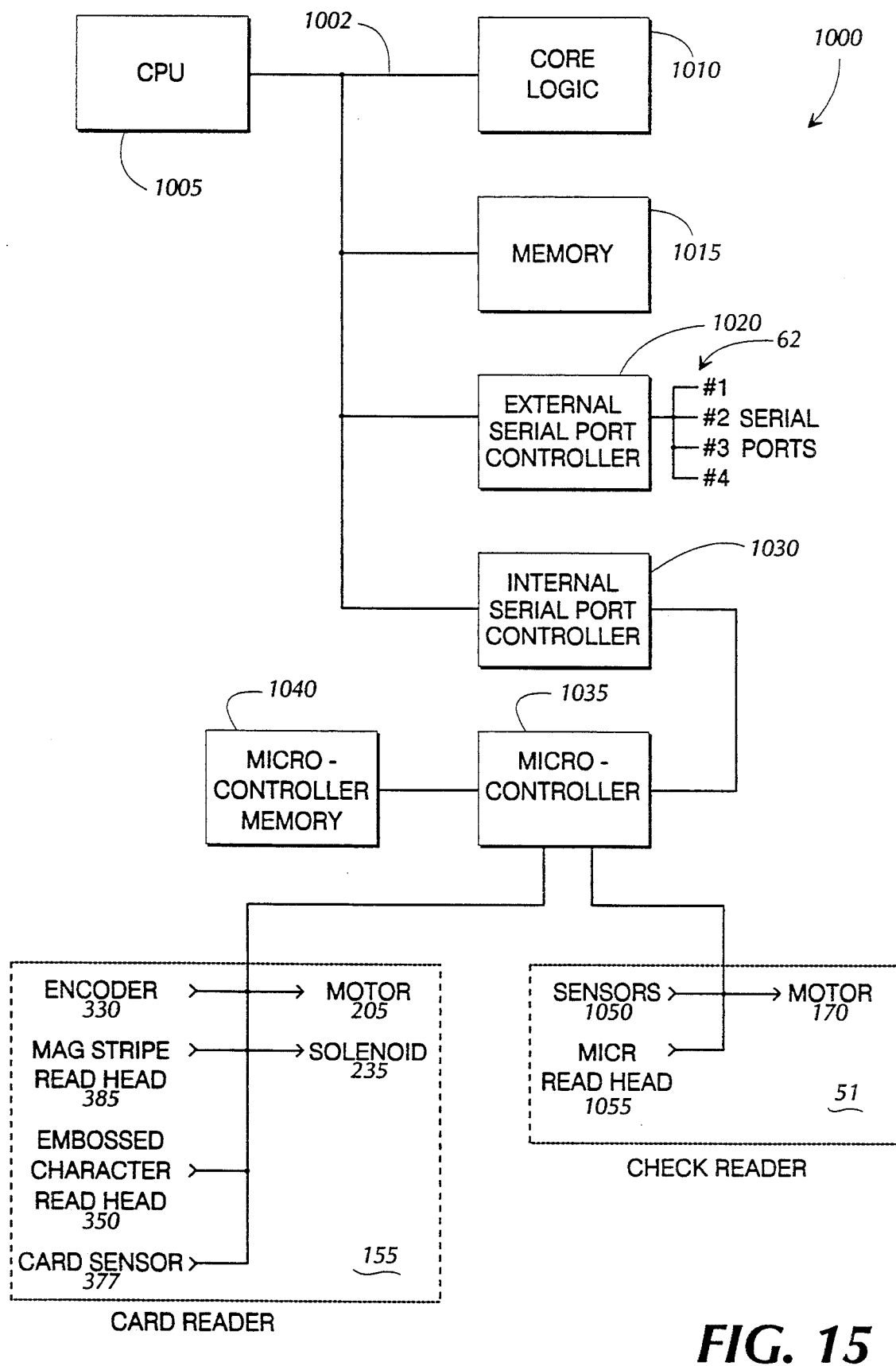
FIG. 15 is a block diagrammatic representation of the electronic circuitry employed in the preferred multi-reader terminal.

FIG. 15 is a block diagram of the electronic control circuitry 1000 employed in the preferred multi-reader terminal 10. The circuitry is designed so that it implements an MS-DOS-compatible computer system. Those skilled in the art will appreciate that this facilitates the programming of the multi-reader terminal 10 by allowing programmers to utilize a wide variety of compilers, debuggers, and other development tools designed for the MS-DOS programming environment.

The circuitry 1000 includes a central processing unit ("CPU") 1005. The preferred CPU 1005 is a V-20 microprocessor manufactured by NEC Electronics, Mountain View, Calif. The CPU is connected via a data bus 1002 to a PC core logic circuit 1010, which provides signals that enable the terminal 10 to operate as an MS-DOS-compatible computer system. The preferred core logic circuit 1010 is a type 82C100 manufactured by Chips and Technologies, San Jose, Calif. Details of the preferred microprocessor and core logic circuit are available in the literature supplied by the manufacturers.

The circuit 1000 includes memory 1015 that provides both volatile and non-volatile storage for the CPU 1005. The preferred memory includes 256K bytes of dynamic RAM, 128K bytes of battery backed up static RAM, and an EPROM. The software stored in the EPROM includes a basic input/output system (BIOS), an MS-DOS compatible disk operating system (ROM DOS), and a boot disk emulator (ROM DISK). The static RAM is used to store terminal application software and terminal parameters in what those skilled in the art have denominated a "RAMDISK".

The CPU 1005 is connected to external serial port controllers 1020. The preferred terminal 10 includes two type 82C452 serial communications controllers, manufactured by Startech Semiconductor, San Jose, Calif. Together, the external serial port controllers provide four individually programmable serial ports 62 that may used to communicate with a variety external devices in many different configurations.

It will be recalled from the previous discussion of the exemplary alternative configurations that the preferred terminal 10 includes a plurality of serial ports 62 that are used as communicating means comprising selectively configurable input and/or output terminals. These serial ports are used to receive data from various sources such as a connected electronic cash register, signature capture pad, PIN pad, or other peripheral devices, and either respond to the data (as when the data comprises a command to the terminal 10) or route the data to another serial port so that it may be re-transmitted to the data's proper destination.

While serial data ports are employed in the preferred embodiment as communication means, it should be understood that other types of data transmittingreceiving communication means may be employed as communications means, such as optically coupled interface adapters (OCIA), keyboard wedge data devices, and other data communications devices.

In order to provide versatile serial routing, the multi-reader terminal 10 is programmed to constantly monitor each of the serial ports 62 for incoming data. When data is received, the multi-reader terminal 10 responds appropriately, based upon the values of parameters that are available to customize the serial routing. These parameters are discussed in greater detail in connection with the software for the preferred embodiments. The flexibility provided by this parameter-driven serial routing will allow end users many options on how to cable and configure their POS systems and utilize the present invention. In the preferred terminal 10, serial parameters such as baud rate and flow control may be individually set for each of the serial ports 62. These parameters are set by downloading data from a host computer system via one of the serial ports.

The CPU 1005 is also connected via the bus 1002 to an internal serial port controller 1030, which is used to communicate with a microcontroller 1035. The preferred internal serial port controller 1030 is a type 16C450 manufactured by National Semiconductor Corp., Santa Clara, Calif.

Microcontroller 1035 is used to interface with, and decode signals received from, the card reader 155 and check reader 51. This data is then transmitted to the CPU 1005, via internal serial port controller 1030 and bus 1002. The preferred microcontroller 1035 is a type 80C31, manufactured by Signetics, Sunnyvale, Calif. The microcontroller 1035 is provided with memory 1040, comprising 32K bytes of static RAM and 32K bytes of ROM.

The microcontroller 1035 receives four different signals from the card reader 155—(1) the optical encoder 330, (2) the magnetic stripe read head 385, (3) the embossed character read head 350, and (4) the card sensor 377. The optical encoder 330 provides signals indicative of the position of the credit card within the card reader 155. The magnetic stripe head 385 provides signals indicative of the data read from the cards magnetic stripe. The embossed character read head 350 provides signals corresponding to the embossed characters on the card. The card sensor 377 provides a signal indicating that a credit card has been inserted into the card slot.

Once the card sensor signal has been received, the microcontroller 1035 provides signals that control the motor 205 throughout a credit card read cycle. The microcontroller 1035 also provides signals that control the solenoid 235, which determines whether the embossed character read head 350 is retracted or is in position to contact the embossed characters 35 on credit card 20.

The microcontroller 1035 also receives signals from the MICR check reader 51. Sensors 1050 associated with the preferred MICR reader subassembly 51 indicate the presence and approximate position of a check that is to be read. These signals are provided to the microcontroller 1035. In response to these signals, the microcontroller sends signals that control the MICR motor 170 and cause the check to be carried past the MICR read head. Signals from the magnetic ink on a check are picked up by a MICR read head 1055 associated with the preferred MICR reader 51. These signals, which are indicative of the account data recorded on the check, are provided to the microcontroller 1035, where the data is decoded. This data is then provided to CPU 1005 via internal serial port controller 1030. Suitable circuitry for controlling the MICR motor and receiving signals from the MICR read head may be obtained from Mag-Tek, Inc., Carson, Calif., the manufacturer of the preferred check reader 51.

Software for Control Circuitry

Figure 16:
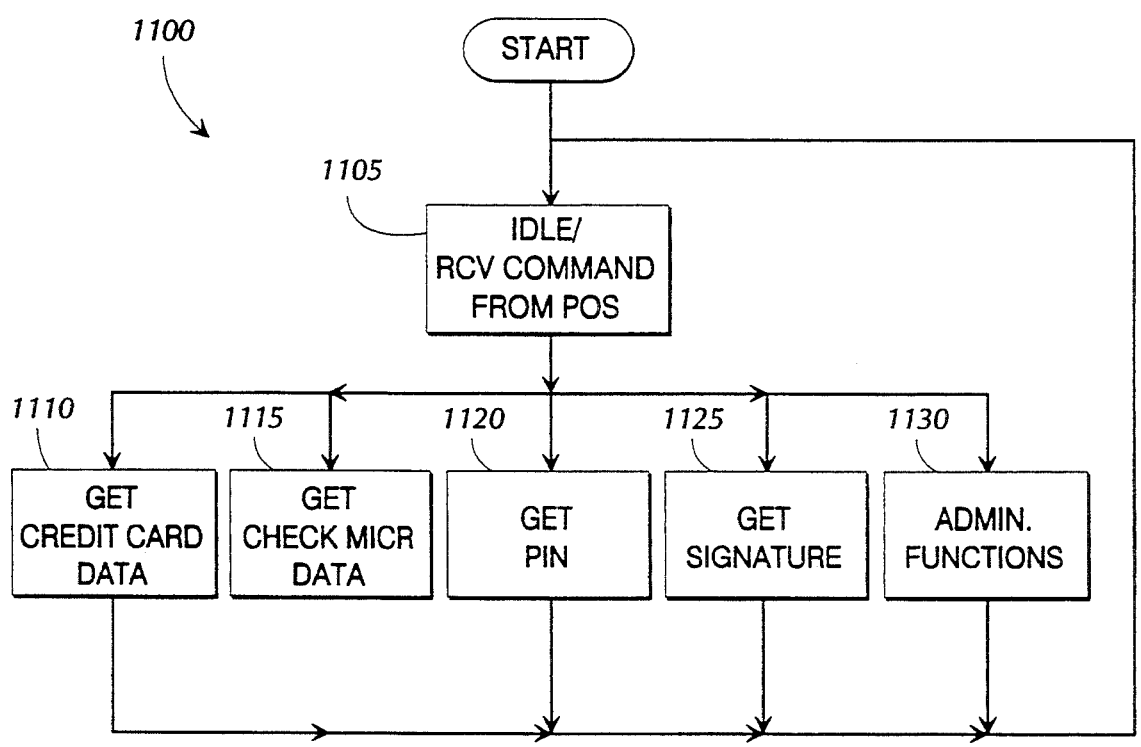
FIG. 16 is a flow diagram illustrating the main loop of the operation of a terminal constructed in accordance with the present invention, implemented as computer software.

Turning now to FIG. 16, the preferred method 1100 of operating the multi-reader terminal 10 will be described. This method is implemented as software for the terminal's CPU 1005; this software is stored in memory 1015, shown in FIG. 15. Generally, the method 1100 is operative to receive commands in the form of serial data from a POS system connected to one of the serial ports 62, and to execute various subroutines responsive to those commands. Inasmuch as the multi-reader terminal 10 is designed to gather transaction data, the subroutines are primarily directed to collecting data from the credit card reader 155 or MICR reader 51 that form a port of the multi-reader terminal, or from peripheral devices such as a signature capture pad 95 or a PIN pad 110.

Before discussing the specific software modules, some background is helpful to understand the overall operation of the terminal and the types of data parameters required to configure the terminal to provide certain features of operation. In order to allow maximum application flexibility, the preferred multi-reader terminal 10 maintains numerous parameters internally. These parameters enable the reconfiguration or expansion of many of the advanced features of the multi-reader terminal. These parameters are structured in a file and record format, and stored in the battery backed static RAM 1015.

Generally, it will be understood that the preferred terminal is programmed to (1) respond to certain stimuli such as insertion of a credit card or check, and (2) respond to the receipt of commands provided to it from an external source, typically one of the serial ports 62. The serial ports provide the general input and output communication means for the terminal.

Various parameters of configuration are required to enable the terminal to provide certain features. A STORE PARAMETER command is used to modify the current settings of these parameters without the need for a "full" or "partial" download. This command comprises sending the file and record number of the parameter to be modified, along with the new value of the parameter. The multi-reader terminal 10 will then acknowledge the receipt of the new value.

A RECALL PARAMETER command is used to retrieve the current value stored in any multi-reader terminal parameter. The operation of this command is similar to the STORE PARAMETER command.

The parameter storage area in memory is preferably controlled with security access. This access affects the STORE and RECALL functions. Individual records and/or entire files have one of three types of security available:

1) RW—Read/Write
2) RO—Read Only
3) N—No Access (cannot be stored or recalled)

Access to records of security types RO and N is permitted only with the use an encrypted password. This feature, if supported by the POS system, will allow a transaction guarantor to update parameters on an "as needed" basis. If the optional chargeback protection services are not in effect, then security may be disabled.

External software associated with a connected POS terminal, or a connected stand-alone personal computer used for configuration, not forming a part of the present invention, is employed to allow users to inspect and modify the values of the multi-reader terminal parameters. These functions may be supported by any computer complying with the multi-reader terminal communications standards.

The multi-reader terminal 10 is capable of receiving new downloads of software. A LOAD command will convey to the multi-reader terminal 10 the total number of files to be downloaded. When the multireader receives the command to enter LOAD mode, it will capture all incoming data received on an active serial port 62 until all of the downloaded files have been received.

When the LOAD command is received, the multi-reader terminal 10 stores all downloaded files in the appropriate directory in its internal memory (replacing older files with the same name and path). This download method allows "partial" downloads to take place simply by sending only some files. "Full" downloads can be accomplished by simply sending all of the files, but to be safe "full" downloads should be preceded by the ERASE RAM command, which clears certain areas of memory dedicated to application programs.

The LOAD and ERASE RAM commands are only executed by the multi-reader terminal 10 when a second consecutive command is received, confirming the command.

When a multi-reader terminal 10 does not contain an application, the unit will automatically attempt to obtain a download. In this case, upon power-up the multi-reader terminal 10 will transmit a REQUEST DOWNLOAD command via its serial ports 62. If another multireader unit (with an application loaded) is connected via a direct serial link, a download will occur.

Those skilled in the art will understand that a personal computer (PC) based utility program may be employed to effectuate downloads of software. Such a program should be made operative to provide "full" or "partial" downloads using files located on a local drive of the PC. This downloading program may be given the additional capability of communicating with other computers and receiving downloads from these computers. It would then be possible to download files received from other computers to multi-reader terminals 10. In any case, the above software downloading functionality can be ported to other computers (including POS systems) to allow for more convenient downloading of software into the multi-reader terminals units in the field. The preferred multireader is capable of receiving downloads over a direct serial link from any computer complying with an appropriate download communications protocol, the details of which are within the capabilities of the skilled artisan.

It will be recalled from the previous discussion of the exemplary alternative configurations that the plurality of serial ports 62 are used as selectively configurable input and/or output terminals. These serial ports are used to receive data from various sources such as electronic cash registers, signature capture pads, and other peripheral devices, and either respond to the data (as when the data comprises a command to the terminal 10) or route the data to another serial port so that it may be retransmitted to the data's proper destination. In order to provide versatile serial routing, the multi-reader terminal 10 is programmed to constantly monitor each of the serial ports 62 for incoming data. When data is received, the multi-reader terminal 10 responds appropriately, based upon the values of configuration parameters, described below, that are available to customize the serial routing. Each serial port 62 is configured to one of the following five states:

1. Ignore all incoming data—all data received is discarded with no regard to the format and substance of the data.
2. Accept all incoming data as intended for the multi-reader—data that conforms to valid multi-reader packet formats will be processed and acted upon accordingly. Data that does not fit into a recognized multi-reader format will be discarded.
3. Redirect all incoming data except for packets recognizable as intended for multi-reader—Data that conforms to valid multi-reader packet formats will be processed and acted upon accordingly. Data that does not fit into a recognized multi-reader format will be redirected to the designated serial port.
4. Unconditional redirection—Data will be redirected to the designated serial port with no regard to the format and substance of the data.
5. Multi-reader peripheral format—Data transmitted and received by this serial port will not pass through the serial routing portion of the multi-reader. Ports of this type will be used by the multi-reader to interface with external peripherals, such as the signature capture pad.

Turning now specifically to FIG. 16, the preferred method begins at step 1105 where the terminal 10 is in an idle state, waiting to receive a valid command from a connected POS system or other device connected to a serial port 62. Once a command is received, the terminal 10 decodes the command and executes a corresponding appropriate subroutine in order to provide the data requested by the POS system. Some of these subroutines might require prompting the merchant to perform certain actions, such as "INSERT CHECK IN READER", or "INSERT CREDIT CARD STRIPE DOWN", or "CARD READ FAILURE—ENTER ACCOUNT NO. ON KEYPAD." Since the multi-reader terminal 10 does not have any inputoutput means such as an alphanumeric display or keypad, the terminal 10 is operative to provide signals to the POS terminal to requesting that terminal to display an appropriate message on its display or request keypad input from the user. This would typically be accomplished by means of a display 75 or keyboard 70 located on an electronic cash register 65 (FIG. 1).

If the terminal 10 receives the an instruction to collect credit card data, the method 1100 proceeds to step 1110, where it executes a "GET CREDIT CARD DATA" subroutine. Generally described, this subroutine is operative to read the magnetic stripe and embossed characters of an inserted credit card in order to obtain the account number and expiration date associated with the credit card account. Once the data is collected, the method 1100 returns to the idle state at step 1105.

If, at step 1105, the terminal 10 receives an instruction to collect data from a check, the method 1100 proceeds to step 1115 and executes a "GET CHECK MICR DATA" subroutine. At this point, the terminal 10 attempts to collect the MICR data from the built-in MICR reader. Once the data is collected, the method returns to the idle state at step 1105.

In some cases, the terminal 10 may be instructed to get the user's personal identification number (PIN) in conjunction with a debit card transaction. If a PIN pad 110 (FIG. 2) is attached to one of the serial ports 62, the method 1100 proceeds to step 1120 and executes a "GET PIN" subroutine. After subroutine is completed, the method 1100 returns to step 1105.

If a signature capture pad 95 (FIG. 2) is attached, the terminal may be requested to collect the cardholder's signature in conjunction with a credit card transaction. The method then proceeds to step 1125 and executes a "GET SIGNATURE" subroutine. After the completion of the subroutine, the method returns to step 1105.

In addition to the data collecting functions described above, the terminal 10 may also be instructed to perform various administrative routines 1130. These include functions such as resetting the terminal, providing status flags, providing error counts, and providing other statistical information. Inasmuch as those skilled in the art will be familiar with these and other administrative functions, no further description will be provided herein.

The administrative routines 1130 also include serial port routing routines and downloading routines. The serial port routing routines are operative for responding to incoming communications on one of the serial ports 62, determining the present configuration of the serial port on which the data was received, and forwarding the data or acting upon the data, depending upon the serial port configuration. The various configurations for the serial ports in the preferred embodiment is described in greater detail below. The downloading routines are operative in response to a LOAD command to receive a new program to be loaded in RAM 1015.

The routines 1110, 1115, 1120, and 1125 are preferably stored in the RAM 1015, and are thus programs that are downloaded into the terminal via a serial port. Certain administrative routines 1130 are stored in RAM 1015, while other administrative routines such as downloading routines are preferably stored in the on-board ROM provided in the preferred CPU 1005. Thus, the terminal is operative to "boot" from ROM on power-up and be ready to load appropriate applications software upon receipt of appropriate commands on the serial port. After booting from ROM, the terminal is ready to receive communications and commands via the serial ports 62.

Figure 17:
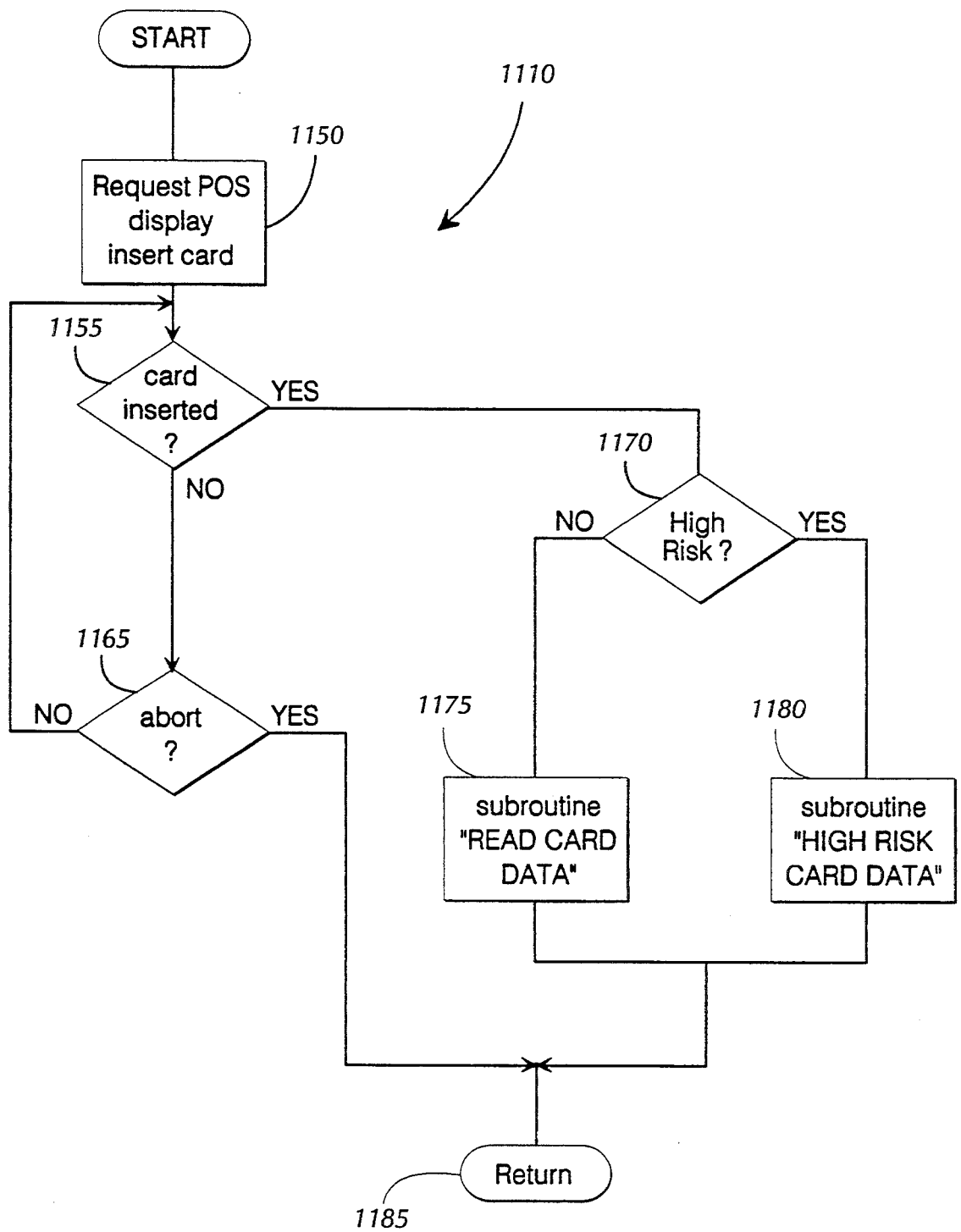
FIG. 17 is flow diagram illustrating the preferred GET CREDIT CARD DATA subroutine forming a part of the terminal software method of FIG. 16.

Turning now to FIG. 17, the preferred "GET CREDIT CARD DATA" subroutine 1110 will be described. The routine begins at step 1150, where the terminal 10 sends a signal to the POS system requesting that a message be displayed instructing the operator to insert the credit card 20 into the card slot 60. This message typically will be displayed on the display 75 of a POS electronic cash register 65 (FIG. 2).

Once the display request is sent at step 1150, the microcontroller enters a loop comprising steps 1155 and 1165. At step 1155, the terminals tests to see whether a credit card 20 has been inserted into card slot 60. This test is conducted by looking for a signal from the card sensor 377 (FIGS. 10, 15). If not, the method proceeds to step 1165, where the terminal determines whether the POS system has transmitted an "abort" command. If no abort command has been received, the method returns to step 1155 and re-enters the loop.

It should be understood that applications software running in a connected POS host computer or in-store processor may provide for timing routines awaiting insertion of a card, so that the terminal does not loop endlessly loop. If such timing routines are provided, upon expiration the POS system may send an abort command, which will have the effect of exiting the loop.

If the terminal determines that a card 20 has been inserted at step 1155, the method branches to step 1170, and determines whether the credit card transaction is to treated as a high risk transaction. This is determined by a flag set within terminal 10. One example of a high risk situation is when the terminal is to be used in a store having a history of fraudulent transactions. In such a case, all transactions may be treated as high risk, which enables special precautions for transactions discussed below. The "high risk" flag may be set during a program download which loads software into the memory 1015.

If the transaction is not designated high risk, the method 1110 goes to step 1175 and executes the "READ CARD DATA" subroutine. If the transaction is high risk, the method goes to step 1180 and executes the "HIGH RISK CARD DATA" subroutine. Both subroutines control the collection of the account data using the magnetic stripe reader and/or the embossed character reader, and are described more completely below. Once the account data is read, the method 1110 proceeds to step 1185, where method 1110 returns to the method 1100.

Returning now to step 1165 in FIG. 17, if the terminal determines that an abort command has been received, the method proceeds to step 1185, where it returns to method 1100.

It should be noted that the preferred terminal 10 contains a card range table stored in its memory that enables it to determine which card type has been read. If a card type validation parameter is enabled, this table is used to determine if the card is of an acceptable type. For example, some merchants may accept VISA but not AMERICAN EXPRESS. Track restoration also uses the card range table (see discussion below concerning the "repair" of track data read from a magnetic stripe with data read from the embossing). Restoration may be impaired or prohibited if the card range table is not kept current.

Note further that each card type may be individually flagged as to whether or not chargeback protection is enabled by a transaction guarantor. The allowed methods of entry are determined by a chargeback protection flag associated with each different card type in the card range table.

Figure 18:
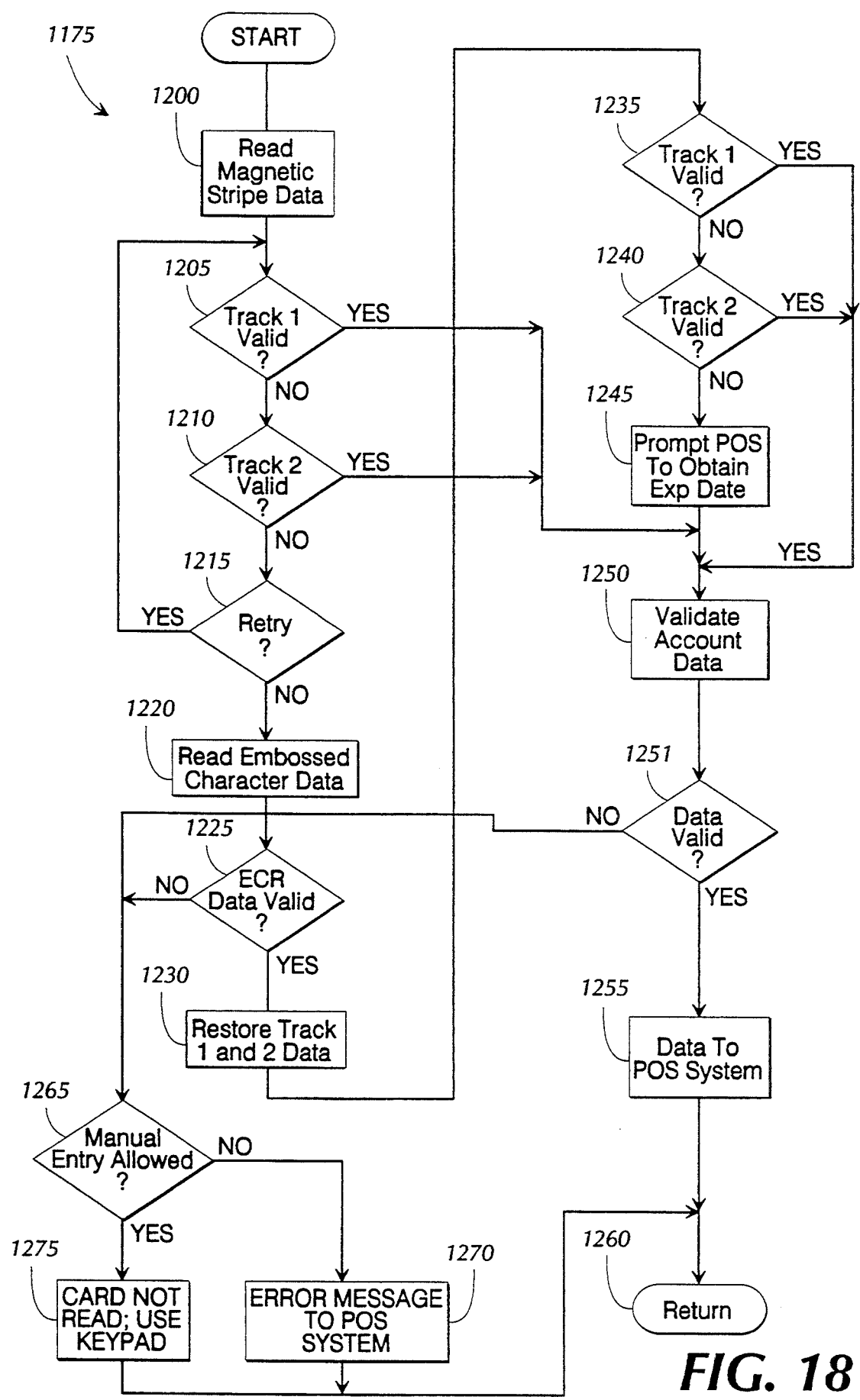
FIG. 18 is a flow diagram illustrating the preferred READ CARD DATA subroutine forming a part of the get credit card data subroutine of FIG. 17.

FIG. 18 is a flow diagram illustrating the preferred subroutine "READ CARD DATA" 1175. Generally described, this subroutine is operative to collect account data using the magnetic stripe reader and/or the embossed character reader, and to perform preliminary validity checks on the acquired account number and expiration date.

The subroutine 1175 begins at step 1200, where the terminal attempts to read data from the magnetic stripe 30 on the credit card 20. The motor 205 is actuated and the card is driven over the magnetic stripe read head 385, generating magnetic stripe signals which are conditioned by circuitry described in the referenced Data Card Terminal Application and provided to the microcontroller 1035. The manner in which the card 20 is driven over the magnetic stripe read head 385 is described above in conjunction with FIGS. 11A–11F. Once the card 20 passes over the read head 385, the subroutine proceeds to step 1205.

The preferred magnetic stripe read head 385 is able to read both tracks 1 and 2 of the magnetic stripe 30. Accordingly, at 1205 the terminal first determines whether track 1 data is valid. The validity of the track data is determined by verifying the longitudinal redundancy check (LRC). If track 1 data is not valid, the subroutine 1175 proceeds to step 1210 and determines whether track 2 data is valid. If not, the subroutine proceeds to step 1215, and determines whether the terminal should repeat its attempt to read data from the magnetic stripe. In the preferred subroutine 1175, the terminal will attempt to read the magnetic stripe three times before proceeding to step 1220. If data from either track is determined to be valid at steps 1205 or 1210, the subroutine proceeds to step 1250.

At step 1220, after attempts to read the magnetic stripe have failed, the terminal attempts to read the account number from the embossed characters 35 on the credit card 20. This is accomplished by energizing the solenoid 235, and causing the embossed character read head 350 to be lowered into the passageway 448 prior to driving the card 20 out of the card slot 60 (see FIGS. 11A–11H). The card is then driven by the pins 401 of the read head. Signals generated by the pins are provided to the microcontroller 1035 and decoded as described in the referenced Embossed Character Reader Application.

Once the embossed data is read, the subroutine 1175 proceeds to step 1225 and determines whether the data read from the embossed character reader (ECR) is valid. This is accomplished by performing a modulo 10 check on the account number, as described in the referenced Embossed Character Reader Application.

If, at step 1225, the data read from the embossed characters is found to be valid, the subroutine 1175 advances to step 1230 and attempts to restore or "repair" the track 1 and/or track 2 data read from the magnetic stripe (which, it will be recalled, was not valid) by substituting the account number read from the embossed characters for the account number read from the magnetic stripe. This is described more fully in the referenced Data Card Terminal Application.

At steps 1235 and 1240, the terminal determines whether the repaired track 1 or track 2 data, respectively, is valid. If the data is found to be valid at step 1235 or step 1240, the subroutine 1175 proceeds to step 1250. If the data is not valid at either of steps 1235 or 1240, the subroutine advances to step 1245 and instructs the POS system to generate a message on display 75 instructing the merchant to enter the expiration date via keyboard 70. This is necessary since in the disclosed embodiment, the embossed character reader 350 reads only those embossed characters 35 that are representative of the account number and is not operative to read the embossed expiration data. The expiration date is normally obtained automatically from the magnetic stripe, but if the stripe cannot be validly read, the expiration date will not be available. Thus, manual entry of the expiration date is required. Once the expiration date is received by the terminal 10, the subroutine advances to step 1250.

As described above, the subroutine arrives at step 1250 only when valid account data has been obtained from the magnetic stripe, the embossed character reader, or from a combination of both. At step 1250, the terminal attempts to validate the account data by performing a mod 10 check on the account number, determining whether the expiration date has passed, and determining whether the account number indicates that the credit card is of a type supported by the terminal. If track data is received, it will be checked with industry standards. If card type validation is enabled and the track data is valid, the card type will be checked against the cards accepted with the card range table. If chargeback protection is enabled for this card, chargeback logic is applied. If high risk is enabled, then the card information will be confirmed using data acquired through multiple entry methods.

The valid track and associated data will be passed back to the POS system if all requirements have been satisfied. If any errors occur, a code indicating the particular error is returned to the POS system. Thus, once the tests are performed at 1250 and the results examined for validity at 1251, the subroutine either advances to step 1255 and provides the appropriate data or branches to 1265. After the data is provided, the subroutine advances to step 1260 and returns to method 1110.

Returning to step 1225 in FIG. 18, the procedure for responding to invalid embossed data will be described. If the account number read from the embossed characters is invalid because of a faulty LRC, the subroutine 1175 goes to step 1265 and determines whether manual account number entry is allowed. This is determined by a flag set within the terminal during program download. If manual entry is not allowed, the subroutine goes to step 1270, where it provides an error message to the POS system, indicating that the credit card reading failed. A failed reading generally will not be chargeback protected by a transaction guarantor. The merchant may proceed with the transaction at his own risk, or request an alternative form of payment. At step 1260, the subroutine returns to method 1110.

If, at step 1265, the terminal determines that manual account number entry is permitted, the subroutine goes to step 1275, where it instructs the POS system to display a message on display 75 instructing the merchant to enter the account number and expiration date via keypad 70. Once the display instruction is sent to the POS system, the multi-reader 10 is no longer needed in connection with the transaction and the subroutine proceeds to step 1260, where it returns to method 1110.

Figure 19:
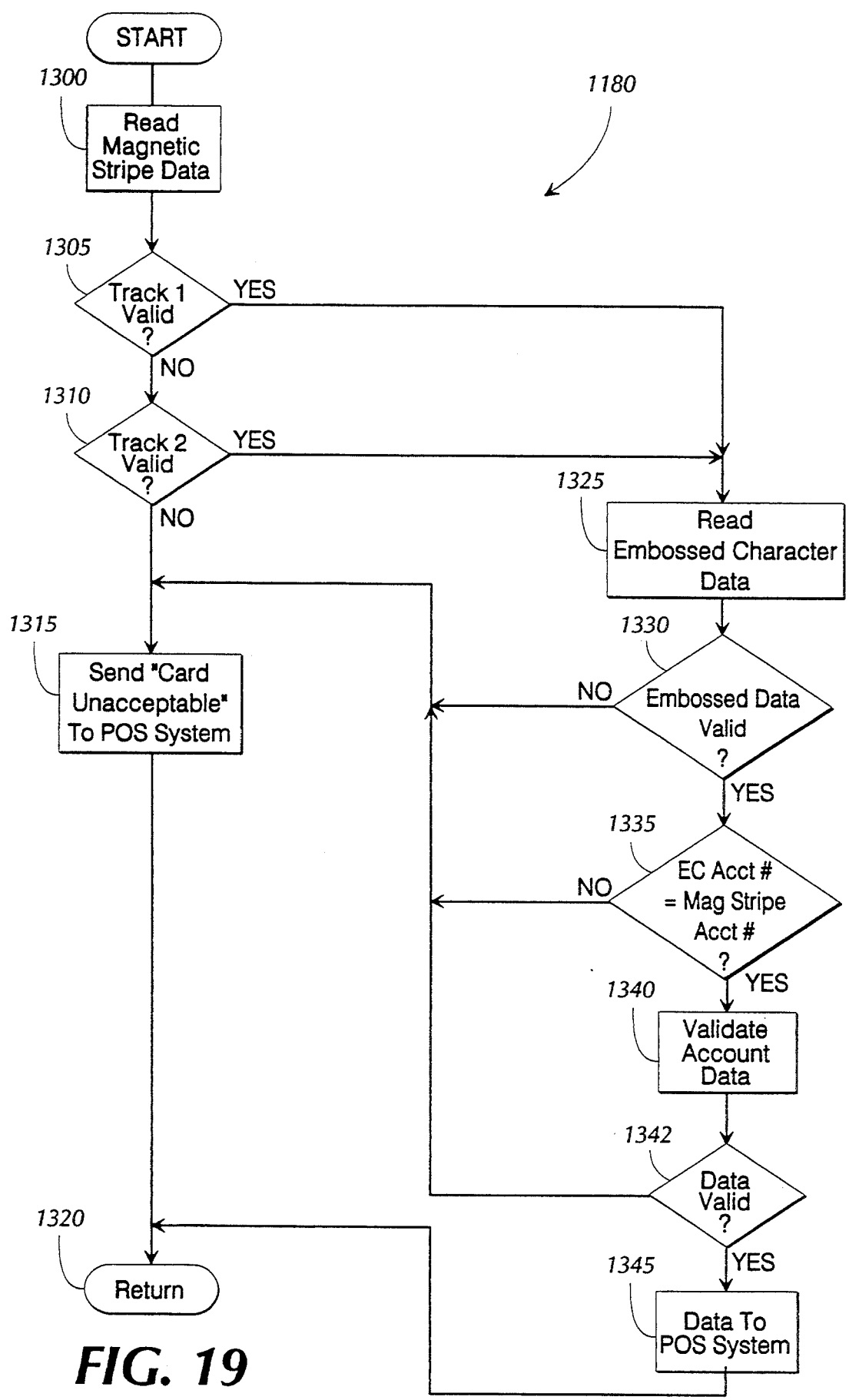
FIG. 19 is a flow diagram illustrating the preferred HIGH RISK CARD DATA subroutine forming a part of the terminal software method of FIG. 17.

FIG. 19 is a flow diagram illustrating the preferred "HIGH RISK CARD DATA" subroutine 1180. Like the subroutine "READ CARD DATA" 1175 described above, the subroutine 1180 is operative to collect account data using the magnetic stripe reader and the embossed character reader, and to perform preliminary validity checks on the account number and expiration date. However, the subroutine 1180 will return a message indicating the card is unacceptable unless the account number read from the magnetic stripe 30 matches the account number read from the embossed characters 35. By requiring that the account numbers read from these two separate sources on the card match, an additional degree of assurance is provided that the credit card is a valid, unaltered credit card.

Generally, "high risk" logic is only enabled if chargeback protection is enabled and a high risk parameter is active. This logic is only applicable to sale transactions. For relevant transactions, the following logic for entering the account number will be used:

1) When a card is inserted, the multi-reader 10 will read the track(s) that are present on the card (track 1 and/or track 2). The multi-reader will determine which track is valid and use that track.
2) If the track data was not successfully read, the multi-reader will return status information that the card is unacceptable and another form of payment must be used.
3) The multi-reader will read the embossing from the card. After the maximum number of unsuccessful attempts have been made at reading the embossing, the multi-reader will return status that the card is unacceptable and another form of payment must be used.
4) Once the magnetic stripe data and embossed data have been successfully read, the multi-reader will compare the account numbers in the mag stripe data and the embossed data. If they are different, the multi-reader will return status that the card is unacceptable and another form of payment must be used.

After the foregoing steps, the multi-reader will proceed with the transaction (check the expiration date, perform a MOD 10 check, etc.) and then return the collected data to the POS system.

Figure 22:
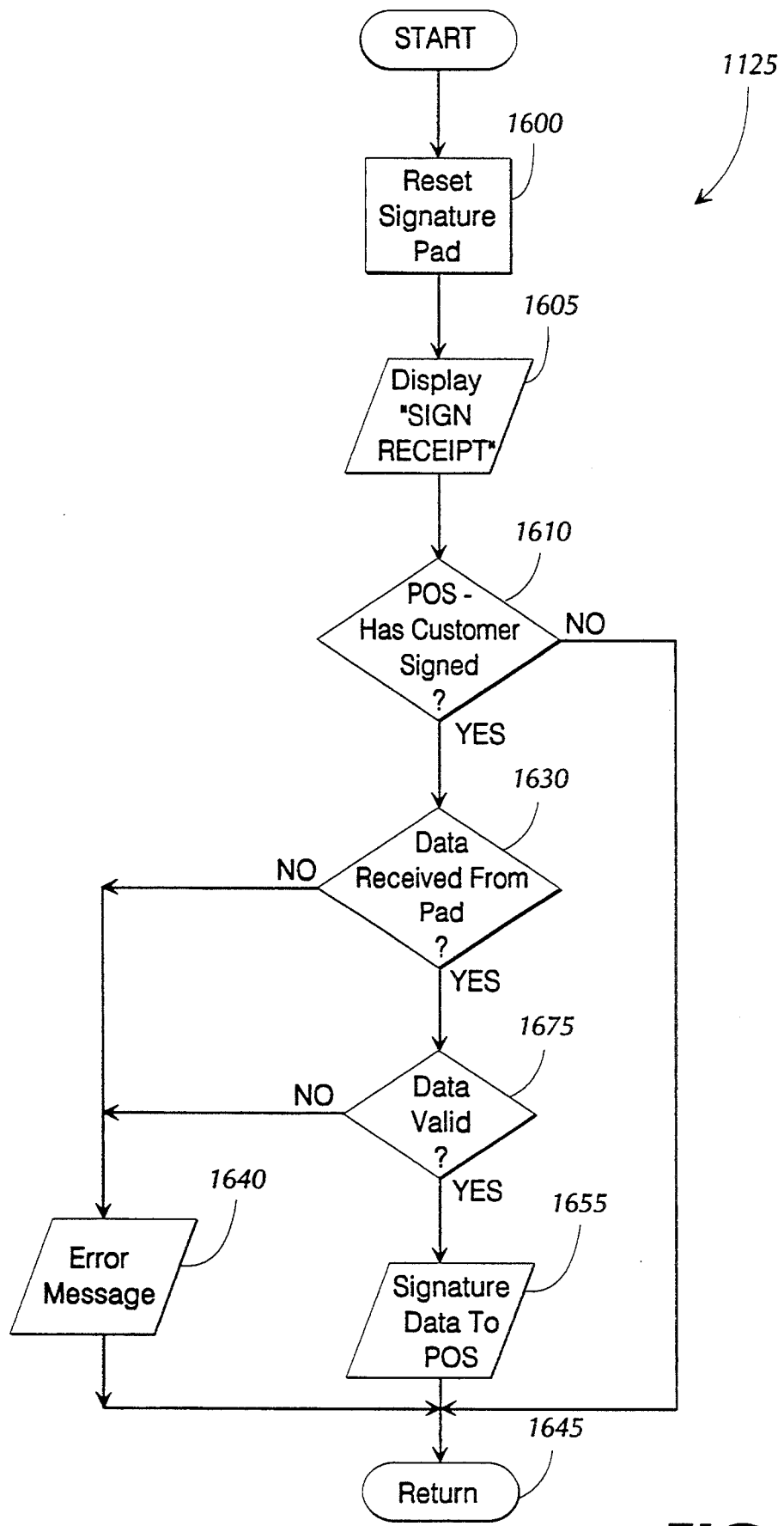
FIG. 22 is a flow diagram illustrating the preferred GET SIGNATURE subroutine forming a part of the terminal software method of FIG. 16.

In FIG. 22, the HIGH RISK CARD DATA subroutine 1180 begins at step 1300, where the terminal attempts to read data from the magnetic stripe 30 on the credit card 20. The manner in which the card 20 is driven over the magnetic stripe read head 385 is described above in conjunction with FIGS. 11A–11F. Once the card 20 passes over the read head 385, the subroutine proceeds to step 1305. Since the preferred read head 385 is able to read both tracks 1 and 2 of the magnetic stripe 30, the terminal first determines whether track 1 data is valid. The validity of the track data is determined by verifying the longitudinal redundancy check (LRC). If track 1 data is not valid, the subroutine 1180 proceeds to step 1310 and determines whether track 2 data is valid. If not, the subroutine proceeds to step 1315, and returns a message to the POS system indicating that the card 20 is unacceptable and another form of payment should be used. From step 1315, the subroutine goes to step 1320, where it returns to the method 1110.

Returning now to steps 1305 and 1310, if either track 1 or track 2 data is found to be valid, the subroutine 1180 advances to step 1325, where the terminal attempts to read the embossed characters 35. At step 1330, the subroutine determines whether the embossed data is valid by checking the modulo 10 of the read account number. These validations, the programming for which is within the skill of the art, are effected in accordance with ANSI Standard X4.13-1983, which include various checks such as the Luhn formula, longitudinal redundancy checks (LRC), modulo 10 checks, etc., as set forth in the ANSI standard. If the data is not valid, the subroutine proceeds to step 1315, and continues as described above. If the embossed data is valid, the subroutine goes to step 1335.

At step 1335, the subroutine determines whether the account number read from the embossed characters 35 is identical to the account number read from the magnetic stripe 30. If not, the subroutine proceeds to step 1315, and continues as described above. If so, the subroutine proceeds to step 1340, and attempts to validate the account data by performing a mod 10 check on the account number, prompting for manual entry of the expiration date, determining whether the expiration date has passed, and determining whether the account number indicates that the credit card is of a type supported by the terminal.

Once the data validation tests of step 1340 are performed, the subroutine advances to step 1342, where the inquiry is made whether the data is valid in accordance with the tests performed. If not, the routine branches to 1315 where the "CARD UNACCEPTABLE" message is sent. If the data is valid, the routine branches to step 1345 and provides the appropriate data message to the POS system. After the data is provided, the subroutine advances to step 1320 and returns to method 1110.

Figure 20:
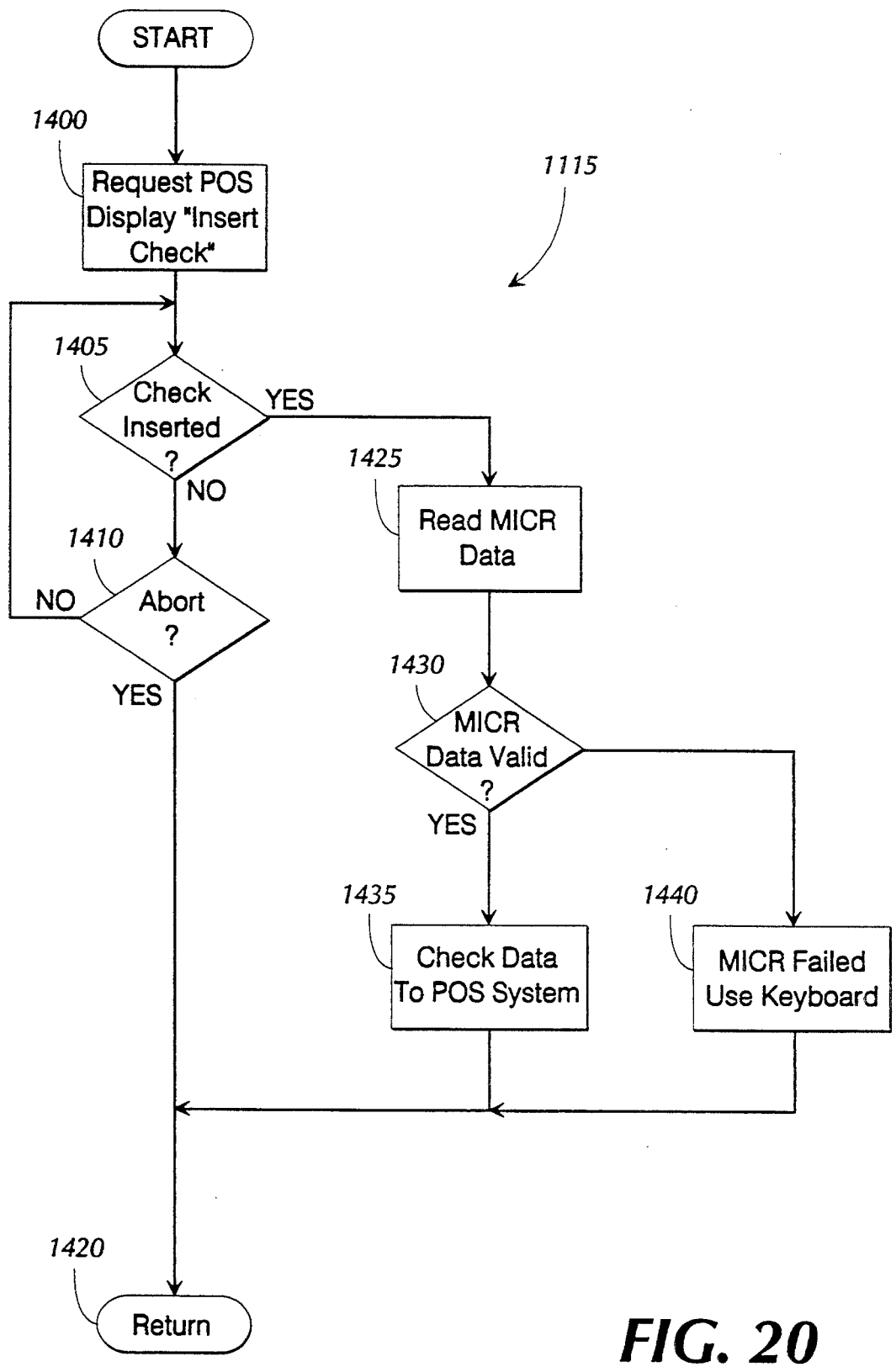
FIG. 20 is a flow diagram illustrating the preferred GET CHECK MICR DATA subroutine forming a part of the terminal software method of FIG. 16.

FIG. 20 is a flow diagram illustrating the preferred "GET CHECK MICR DATA" subroutine 1115. The subroutine begins at step 1400 by sending data to the POS system requesting that a message be displayed instructing the operator to insert a check 15 into MICR slot 50. After the instruction is transmitted to the POS system, the subroutine proceeds to step 1405 and determines whether the check has been inserted. Insertion of a check is detected by circuitry associated with the preferred MICR reader 51 that provides a signal to the microcontroller 1035 (FIG. 15). If not, the subroutine goes to step 1410 and determines whether the terminal has received an abort command.

If the terminal has received an abort message, the subroutine goes to step 1420 and returns to method 1100. If the terminal has not received an abort message, the subroutine loops back to step 1405 and retests for check insertion and abort. Again, it will be understood that the POS system may provide for timing routines and provision of an abort command upon expiration so that the microcontroller does not endlessly loop awaiting check insertion.

If, at step 1405, the terminal determines that a check has been inserted into MICR slot 50, the subroutine proceeds to step 1425 and roads the data from the magnetic ink characters 25 printed along the bottom edge of the check 20. At step 1430 the terminals determines whether the numerical data from the check is valid by calculating a checksum on the digits of the number and comparing the checksum to a verifier digit provided in the number, in the manner as will be known to those skilled in the art. If the check data is valid, the subroutine proceeds to step 1435 and transmits the check account number data to the POS system. Then the subroutine advances to step 1420 and returns to method 1100. At the POS system, the transaction data entered by the merchant is associated with the account number from the check. This data may also be electronically submitted for payment or for transaction guarantee if appropriate arrangements have been made with a check transaction processor or guarantor.

If the check data is found to be invalid at step 1430, the subroutine advances to step 1440, and sends a message to the POS system indicating the read failed. In the case of failure of the MICR reading, and if the merchant still wants to accept a check, the check data will need to be entered via the keyboard 70 on the electronic cash register 65. A message is thus sent to the POS terminal that the MICR reading failed, and requesting a prompt to enter the check account number manually or accept an alternative form of payment. After the message is sent to the POS terminal, the subroutine proceeds to step 1420, where it returns to method 1100.

Figure 21:
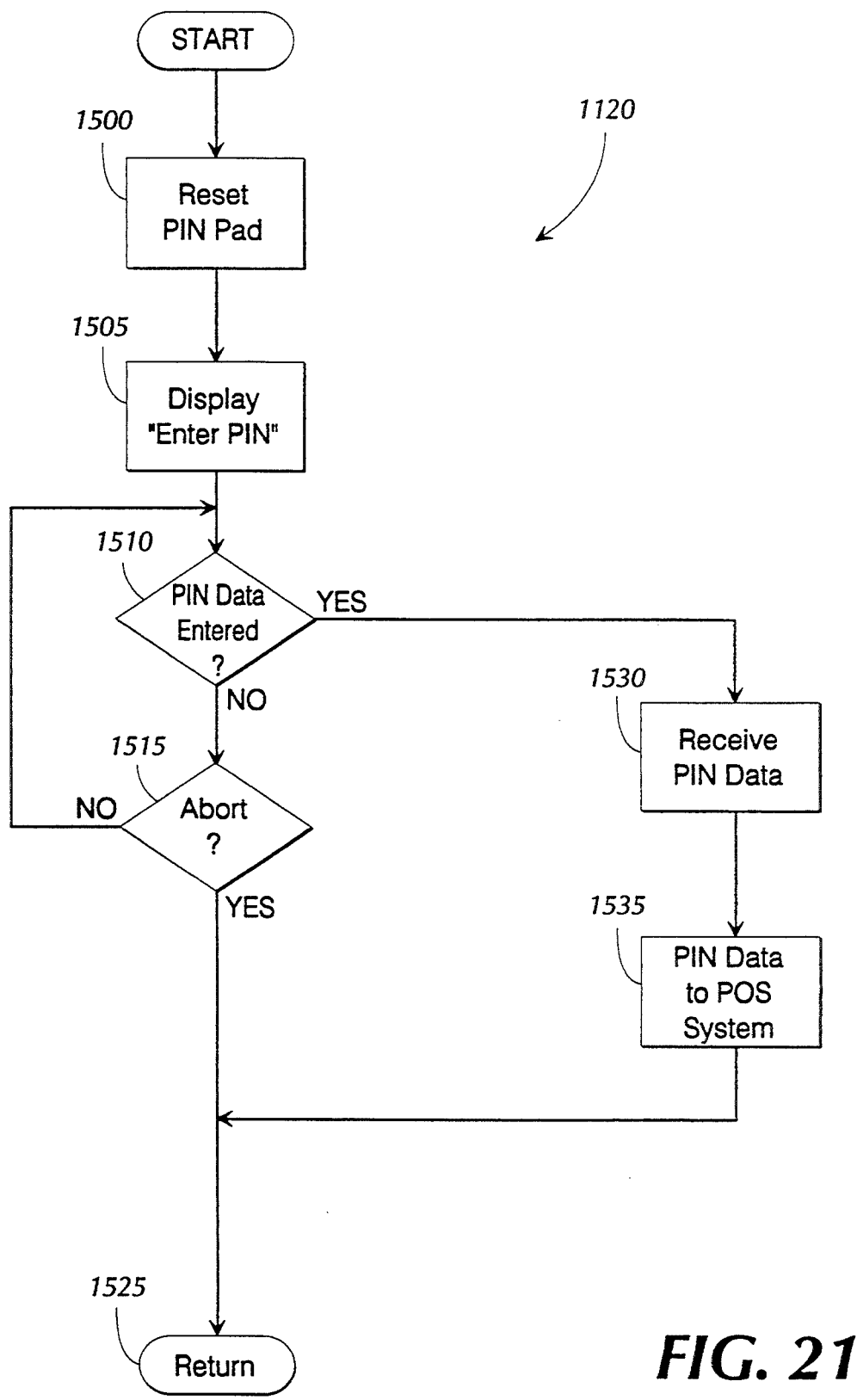
FIG. 21 is a flow diagram illustrating the preferred GET PIN subroutine forming a part of the terminal software method of FIG. 16.

FIG. 21 is a flow diagram illustrating the preferred "GET PIN" subroutine 1120. It is assumed that a PIN pad 110 (FIG. 2) is connected to one of the serial ports 62, and that this serial port has been identified to the software. The subroutine begins at step 1500 by resetting the PIN pad 110 with appropriate reset signals. At step 1505, the terminal causes the PIN pad 110 to display a message on display 120 instructing the cardholder to enter his or her PIN. Once the message has been displayed, the subroutine proceeds to step 1510.

At step 1510 the terminal determines whether the PIN data has been entered via keypad 115. If not, the subroutine goes to step 1515 and tests whether the terminal has received an abort command. If the abort command has not been received, the subroutine loops back to step 1510. If the abort has been received, the subroutine goes to step 1525 and returns to method 1100.

Returning to step 1510, if PIN data has been entered, the subroutine goes to step 1530 and stores the PIN data. From step 1530, the subroutine proceeds to step 1535, where the PIN data is provided to the POS system. Inasmuch as many data card magnetic stripes carry an encoded PIN number, the entered PIN data may be compared to a PIN acquired from the magnetic stripe in the terminal 10 to validate the transaction. After the PIN data is provided to the POS system, the subroutine goes to step 1525, and returns to method 1100.

FIG. 22 is a flow diagram illustrating the preferred "GET SIGNATURE" subroutine 1125. It is assumed that a signature capture pad 95 (FIG. 2) with digitizer and special pen is connected to one of the serial ports 62, and that this serial port has been identified to the software. The preferred signature capture pad, and the operation thereof, is described in the referenced Data Card Terminal Application.

Generally, a connected POS system will send a command to the multi-reader 10 to capture a signature. The POS system will then remain in a loop checking for response from the multi-reader. The POS system will be asked to display a message and/or give a user response from the keyboard to the multi-reader while in this loop. The loop is exited when a successful response is received, a failure response is received, or an abort process is initiated by the user.

When the multi-reader receives a GET SIGNATURE command, it will reset the signature pad and prompt the user (through the POS system) to place the receipt on the pad and have the customer sign it. The multi-reader will wait for signature data from the pad until data is received, or a timeout occurs. Generally, the timing routines are carried out in the POS system, and an abort command is sent to the terminal if the timers expire.

If valid data is received, it is sent back to the POS system with a success code. If invalid data is received, the multireader requests the signature pad to resend the data. If a timeout occurs or the signature is too big, the merchant will be polled as to whether or not the customer has attempted to sign. If the customer has not started a signature, the process will be repeated until the customer attempts a signature or an abort key on the POS terminal is pressed. If the customer has attempted to sign, the user will be prompted to have the customer sign again.

If the timer expires on the second attempt and the merchant answers that the customer has signed, the transaction will be processed without the signature. This constitutes a critical error condition with the signature pad. The multi-reader will return a critical error status and the POS system should alert the user until the condition is corrected.

If the signature was captured a second time but it is still too big, it will be truncated at the maximum allowable size.

Referring now specifically to FIG. 22, the GET SIGNATURE subroutine 1125 begins at step 1600 where the terminal 10 sends a reset signal to the signature capture pad 95, which causes the signature capture pad to reset itself and prepare to receive a signature. At step 1605, the terminal instructs the POS system to display a message or prompt directing the merchant to place a paper receipt on the signature capture pad 95 and have the cardholder sign the receipt on the pad. This message is displayed on the display 75 of the electronic cash register 65. The subroutine the proceeds to step 1610 and waits to receive signature data or an abort command.

At step 1610, the subroutine determines whether the customer has attempted a signature or whether an abort command has been received. If a signature has been attempted, signature signals will be provided from the signature pad as described in the referenced Data Card Terminal Application. Again, the POS system will preferably maintain a timer to await receipt of the signature signals, and send and abort command if no signature signals are received by the POS before the timer expires. If the abort command is received, the routine branches to 1645 and returns to the idle state.

If the customer has attempted a signature, the program branches from step 1610 to step 1630, where the inquiry is made whether data has been received from the signature pad. If not, the routine branches to step 1640, and provides an appropriate error message. If data has been received from the signature pad, the routine branches to step 1675, where the inquiry is made whether the data is valid. If not valid, the routine branches to step 1640. If the data is valid, the routine branches to step 1655.

At step 1655, the signature signals are compressed and provided as an output of compressed signature signals, in accordance with the description in the referenced Data Card Terminal Application. In the POS system, the signature data is associated with other transaction data and forwarded to a transaction processor or guarantor for payment or chargeback protection, as described in the referenced Data Card Terminal Application. The routine then returns to the idle state at step 1645 upon the completion of data transmission to the POS system.

It should be understood that various alterations of the operation of the signature pad are contemplated. The terminal may direct the POS system to display a message inquiring whether the cardholder has attempted to sign the receipt. If the response is no, the POS system may again display a message instructing the cardholder to sign the receipt.

Multi-Reader Communication Protocol

Next will be discussed the preferred command/response formats or communications protocols utilized in the present invention to provide commands to the terminal 10 via one of the serial ports 62.

First consider packets from a connected POS system to the multireader. There are two basic types of commands in the multi-reader command set. The first type is a simple isolated command that requires no further interaction such as RESET MULTIREADER and GET STATUS FLAGS. The other type of command places the multi-reader into one of several interactive modes and begin a session where the will drive the process.

Examples of commands that place the multi-reader into an interactive mode include GET CREDIT CARD DATA and GET SIGNATURE. After receiving a mode command, the multi-reader will command action through predefined response messages. Ultimate control, however, will reside with the parent device such as a PC or an intelligent electronic cash register.

Multi-reader commands are always preceded by an attention byte and ended with a terminator byte. These values are stored as parameters and may be changed using the STORE PARAMETER command. A command byte in the packet contains the command indicating the operation to be performed by the multi-reader. If the POS system is merely replying to a multi-reader request for data, the command will be a space (Hex 20). If the POS system is sending data to the multi-reader, the data will follow the command byte.

The preferred format for a command block is as follows, where F=flag ('0','1'), 9=a numeric field varying from ('0'... '9'), and X=an alphanumeric field. Field sizes are shown in parentheses:

| COMMAND BLOCK: | | |
|---|---|---|
| Multi-Reader Attention | X(1) | [DCl] |
| Multi-Reader Confirmation | X(1) | ['M'] |
| Command | X(1) | |
| Data from the POS system | X(nnn) | [optional] |
| Terminator | X(1) | [CR] |

Packets from the multi-reader 10 to a POS system, which are typically responses from the terminal 10, are always preceded by an attention byte and ended with a terminator byte. These values are also stored as parameters and may be changed using the STORE PARAMETER command. The mode byte is the current operation mode of the multi-reader. The return code indicates the purpose of this packet. The message number is a zero-filled indicator for which message (if any) should be displayed by the POS system. If the multi-reader is sending data to the POS system, the data follows the message bytes.

| RESPONSE BLOCK | | |
|---|---|---|
| Host Attention | X(1) | [DCl] |
| Host Confirmation | X(1) | ['H'] |
| Mode | 9(1) | |
| Return code | 9(1) | |
| Message number | 9(2) | |
| Data from the Multi-Reader | X(nnn) | [optional] |
| Terminator | X(1) | [CR] |

Valid modes for the preferred multi-reader are:

| 0 | IDLE state |
|---|---|
| 1 | GET CREDIT CARD DATA |
| 2 | GET CHECK MICR DATA |
| 3 | GET PIN |
| 4 | GET SIGNATURE |
| 5 | LOAD |
| 6 | DIAGNOSTICS |

Valid return codes for the preferred multi-reader are:

| 0 | No special action required |
|---|---|
| 1 | Get input from the POS system |
| 2 | Critical error has occurred |
| 3 | Data sent from multi-reader to the POS system |

Valid message number ranges for the preferred multi-reader are:

| 00 | No message to display |
|---|---|
| 01–49 | General messages |
| 50–89 | Error messages |
| 90–99 | Critical error messages |

Data designated above as "optional" is made up of zero or more data elements. This data is only present if the return code has a value of 3. The format of this data varies depending upon the command sent by the POS system to initiate the data exchange. The individual command descriptions provide detailed information on the specific data that can be returned when that command is sent to the multi-reader.

The preferred command set for a multi-reader terminal 10 constructed in accordance with the present invention is as follows, where "M" is a mode as described above, "R" is a response or return code as described above, "Msg" is a message number as described above, and "Opt" is the optional data described above:

ABORT PREVIOUS COMMAND
Command: 'A' (Hex 41)
Function: Aborts current mode and returns multi-reader to idle state.
Returns: M R Msg Opt
        0 0 00    //Idle reached RESET MULTIREADER
Command: 'R' (Hex 52)
Function: Reset the multi-reader to power-up state. (Reboots multi-reader).
Returns: M R Msg Opt
        0 0 00

ERASE RAM
Command: 'E' (Hex 45)
Function: Delete any existing programs and data from the multi-reader. The return value will be sent immediately before the erase occurs. After erasing the disk, the multi-reader will reboot and enter a wait loop where it is waiting for a L O A D command. This command must be confirmed before it will be executed.
Returns: M R Msg Opt
        0 0 00

GET ID
Command: 'I' (Hex 49)
Function: Requests the identification of the multi-reader.
Returns: M R Msg Opt
        0 3 00   00 ID GET STATUS FLAGS
Command: 'F' (Hex 53)
Function: Requests the current status of the multi-reader. Can be done at any time.
Returns: M R Msg Opt
        ? 3 00  01 Swipe Error, Emboss Error, MICR Error, Signature Error, Memory Error
        - X(1)X(1)X(1)X(1)

GET STAT COUNTS
Command: 'Q' (Hex 46)
Function: Requests the current status of the multi-reader status counts.
Returns: M R Msg Opt
        0 3 00 02 Stat Designator, Count -continued

CLEAR STAT COUNTS
Command: 'K' (Hex 4B)
Function: Clears the current multi-reader status counts.
Returns: M R Msg Opt
    0 0 00

STORE PARAMETER
Command: 'Y' (Hex 59)
Data: <FILE><FIELD><PASSWORD><DATA>
    9(2)9(2)X(8)X(Variable)
Function: Multi-reader will store the data value contained in the command packet in the indicated location.
Returns: M R Msg Opt
    0 0 00
    0 0 70  // File does not exist
    0 0 71  // Field does not exist
    0 0 72  // Access denied
    0 0 73  // Error opening file

RECALL PARAMETER
Command: 'X' (Hex 58)
Data: <FILE><FIELD><PASSWORD>
    - 9(2)9(2)X(8)
Function: multi-reader will return the data value contained in the indicated location.
Returns: M R Msg Opt
    0 3 00 03 Data From File:Field
    0 0 70  // File does not exist
    0 0 71  // Field does not exist
    0 0 72  // Access denied
    0 0 73  // Error opening file

GET CREDIT CARD DATA
Command: 'C' (Hex 43)
Data: <TRAN_TYPE>
Valid transaction types include:
    1 = Sale transaction
    2 = MOTO transaction
    0 = Any other transaction (Default)
Function: Puts the multi-reader into Get Credit Card Data mode. The multi-reader may transfer control to the POS system in order to obtain keyboard input.
Returns: M R Msg Opt
\* Return values \*
    0 3 00    10 Entry Mode, Guarantee, Account No., Exp. Date
             - X(1)X(1)X(19)MMYY
    0 3 00    11 Entry Mode, Guarantee, Track 1
             - X(1)X(1)X(80)
    0 3 00    12 Entry Mode, Guarantee, Track 2
             - X(1)X(1)X(40)
\* Display message and return to IDLE \*
    0 0 50  // Card type not accepted
    0 0 51  // Card unreadable
    0 0 52  // Card is expired
    0 0 53  // Card is not yet valid
    0 0 54  // Invalid Account Number
    0 0 55  // Card unacceptable (High Risk violation)
\* Display message and continue \*
    1 0 10  // Insert card into card reader
    1 0 11  // Remove card
\* Display message and accept data \*
    1 1 12  // Get expiration date
    1 1 13  // Get issue date
    1 1 14  // Get account number
\* Critical errors \*
    1 2 90  // Swipe reader malfunction
    1 2 91  // Emboss reader malfunction

GET CHECK MICR DATA
Command: 'M' (Hex 4D)
Function: Puts the multi-reader into the Get Check MICR Data mode. The multi-reader will stay in this mode until the MICR number has been read or an ABORT command is send from the POS system.
Returns: M R Msg Opt
    0 3 00  20  MICR Number data
    2 0 20  // Prompt user to insert check
    2 0 21  // Reinsert check
    2 0 22  // Remove check
    0 0 23  // Bad read
    0 2 92  // MICR reader malfunction

GET PIN
Command: 'P' (Hex 50)
Function: Places the multi-reader into PIN Entry mode. The customer will be allowed to enter a PIN on the PIN pad.
Returns: M R Msg Opt
    0 3 00  30    PIN data accepted by PIN reader
    3 0 30  // Prompt user to enter PIN
    0 2 93  // PIN pad not responding

GET SIGNATURE
Command: 'S' (Hex 53)
Function: Instructs the multi-reader to get a signature. Signature will be returned in a transmittable form.
Returns: M R Msg Opt
    0 3 00  40 Length, Signature, Checksum
             - 9(4)X(1-2000)X(1)
    4 0 40  // Have the customer sign.
    4 1 41  // Did the customer sign?
    4 0 42  // Signature pad not responding
    0 0 43  // Signature pad not attached
    0 2 94  // Signature pad malfunction

LOAD
Command: 'L' (Hex 4C)
Function: Places the multi-reader in LOAD mode. This command is used to load program data to the multi-reader. While in the LOAD mode, the multi-reader will use a communications protocol designed for high-speed error free transmission of large data files. Because the protocol will be different for this process, the multi-reader will not respond to normal commands that are received during the LOAD process. This command must be confirmed before it will be executed.
Returns: M R Msg Opt
    5 0 00    // Entering Load mode

REQUEST DOWNLOAD
Command: '+'
Function: Indicates a desire to receive a download from the device connected to the serial port.
Returns: None

DIAGNOSTICS
Command: 'D' (Hex 44)
Data: <MODE>
Function: Puts the multi-reader into diagnostics mode. The mode sent after the 'D' is the mode to test.
Returns: M R Msg Opt
    0 0 00
(Many of the return packets described above can be encountered when using various areas of diagnostics.)

RETRANSMIT LAST PACKET
Command: '=' (Hex 3D)
Function: Command used to request that the multi-reader resend the last packet transmitted to the POS system.
Returns: N/A

DATA COMMAND
Command: " (Hex 20)
Data: <various data>
Function: Command used to transmit data to the multi-reader after the multi-reader has -continued

```
            requested user input.
Returns:    M R Msg Opt
            0 0 00
```

It will be recalled from the discussion above that various messages codes ("Msg") are transmitted by the multi-reader terminal 10 under certain conditions, to convey various information. Exemplary multi-reader messages in the preferred embodiment include the following:

```
General Messages:
10 - Insert card into card reader
11 - Remove card
12 - Get expiration date
13 - Get issue date
14 - Get account number
20 - Insert check into MICR reader
21 - Reinsert check
22 - Remove check
23 - Bad read
30 - Have the customer enter their PIN (GET PIN)
40 - Have the customer sign (GET SIGNATURE)
41 - Did the customer sign?
42 - Signature pad not responding
43 - Signature pad not attached
Error Messages
50 - Card not allowed
51 - Card unreadable
52 - Card is expired
53 - Card is not yet valid
54 - Invalid account number
55 - Card unacceptable
70 - File does not exist
71 - Field does not exist
72 - Access denied
73 - Error opening file
74 - Invalid diagnostics command
Critical Error Messages:
90 - Magnetic Stripe Reader Malfunctioning
91 - Emboss Reader Malfunctioning
92 - MICR Reader Malfunctioning
93 - PIN Pad Not Responding
94 - Signature Pad Malfunctioning
```

Multi-Reader Parameters

The preferred terminal 10 is configurable in a number of respects. Various status and configuration information is stored in memory, and referred to by various software routines so that appropriate action is taken, appropriate responses are provided. Various status indicators or flags are utilized to store configuration or status information. Certain of these flags are accessible by an application program running on a connected POS system, while others are not. In the following discussion, security for various flags is indicated by N=NOT ACCESSIBLE, RO=READ ONLY, RW=READ/-WRITE. Formats are denoted as F=flag ('0','1'), 9=a numeric field varying from ('0'...'9'), and X=an alphanumeric field. Field sizes are shown in parentheses.

The status flags are stored in files in memory. The identity of various status and parameter files in the preferred embodiment are as follows. The Active Options file is used to store the status of various peripherals and other devices utilized in the present invention. Note that the High Risk flag referred to in FIG. 17 is stored here:

| Active Options - File 00 | | |
|---|---|---|
| 00 Embossed Data Reader Active | RW | F(1) 0=NO, 1=YES |
| 01 Magnetic Stripe Reader Active | RO | F(1) 0=NO, 1=YES |
| 02 PIN Pad Active | RW | F(1) 0=NO, 1=YES |
| 03 Signature Pad Active | RW | F(1) 0=NO, 1=YES |
| 04 MICR Reader Active | RO | F(1) 0=NO, 1=YES |
| 05 High Risk Active | RO | F(1) 0=NO, 1=YES |
| 06 MOTO Capability Active | RW | F(1) 0=NO, 1=YES |
| 07 Manual Entry Allowed | RO | F(1) 0=NO, 1=YES |
| 08 Entry Devices Active at Idle | RW | F(1) 0=NO, 1=YES |
| 09 Card Type Validation Active | RW | F(1) 0=NO, 1=YES |

A data file denominated Card Acceptance is employed to store information concerning particular types of credit card supported by the terminal. An exemplary file in the preferred embodiment is as follows:

| Card Acceptance - File 01 | | |
|---|---|---|
| 00 VISA Acceptance Flag | RW | F(1) 0=NO, 1=YES |
| 01 MasterCard Acceptance Flag | RW | F(1) 0=NO, 1=YES |
| 02 (other) Acceptance Flag | RW | F(1) 0=NO, 1=YES |
| 03 Discover Acceptance Flag | RW | F(1) 0=NO, 1=YES |
| 04 American Express Acceptance Flag | RW | F(1) 0=NO, 1=YES |
| 05 Carte Blanche Acceptance Flag | RW | F(1) 0=NO, 1=YES |
| 06 Diner's Club Acceptance Flag | RW | F(1) 0=NO, 1=YES |
| 07 (other) Acceptance Flag | RW | F(1) 0=NO, 1=YES |
| 08 ABA Standard Prop. Acc. Flag | RW | F(1) 0=NO, 1=YES |
| 09 Non ABA Standard Prop. Acc. Flag | RW | F(1) 0=NO, 1=YES |

As described in the referenced Data Card Terminal Application, certain types of transactions will be chargeback protected by a transaction guarantor, assuming that data concerning the form of payment is obtained by the terminal and properly associated with the transaction data acquired by a connected electronic cash register. For example, certain transactions involving particular credit cards can be chargeback protected. In the preferred embodiment, a data file is stored in memory to indicate which (if any) particular types of credit cards are chargeback protected to a merchant utilizing the system:

| Chargeback Protection - File 02 | | |
|---|---|---|
| 00 VISA Chargeback Flag | RO | F(1) 0=OFF, 1=ON |
| 01 MasterCard Chargeback Flag | RO | F(1) 0=OFF, 1=ON |
| 02 (other) Chargeback Flag | RO | F(1) 0=OFF, 1=ON |
| 03 Discover Chargeback Flag | RO | F(1) 0=OFF, 1=ON |
| 04 American Express Chargeback Flag | RO | F(1) 0=OFF, 1=ON |
| 05 Carte Blanche Chargeback Flag | RO | F(1) 0=OFF, 1=ON |
| 06 Diner's Club Chargeback Flag | RO | F(1) 0=OFF, 1=ON |
| 07 (other) Chargeback Flag | RO | F(1) 0=OFF, 1=ON |
| 08 ABA Standard Prop. CB Flag | RO | F(1) 0=OFF, 1=ON |
| 09 Non ABA Standard Prop. CB Flag | RO | F(1) 0=OFF, 1=ON |

A data file is employed in the preferred embodiment for storage of names associated with various credit cards:

| Card Names - File 03 | | |
|---|---|---|
| 00 VISA Card Name | RW | X(12) |
| 01 MasterCard Card Name | RW | X(12) |
| 02 (other) Card Name | RW | X(12) |
| 03 Discover Card Name | RW | X(12) |
| 04 American Express Card Name | RW | X(12) |
| 05 Carte Blanche Card Name | RW | X(12) |

-continued

| Card Names - File 03 | | |
|---|---|---|
| 06 Diner's Club Card Name | RW | X(12) |
| 07 (other) Card Name | RW | X(12) |
| 08 ABA Standard Prop. Card Name | RW | X(12) |
| 09 Non ABA Standard Prop. Card Name | RW | X(12) |

A file is preferably employed for storage of range information pertaining to certain types of credit cards, for example, ranges of the number of digits in a string comprising the account number and a range of valid (or expired) numbers. These ranges are employed to determine the validity of the credit card account numbers detected utilizing the magnetic stripe reader and embossed character reader:

| Card Ranges - File 04 | | |
|---|---|---|
| 00 VISA Range 1 Info | N | X(Variable) |
| 01 VISA Range 2 Info | N | X(Variable) |
| 02 MasterCard Range Info | N | X(Variable) |
| 03 (other) Range 1 Info | N | X(Variable) |
| 04 (other) Range 2 Info | N | X(Variable) |
| 05 (other) Range 3 Info | N | X(Variable) |
| 06 (other) Range 4 Info | N | X(Variable) |
| 07 (other) Range 5 Info | N | X(Variable) |
| 08 (other) Range 6 Info | N | X(Variable) |
| 09 Discover Range Info | N | X(Variable) |
| 10 American Express Range 1 Info | N | X(Variable) |
| 11 American Express Range 2 Info | N | X(Variable) |
| 12 Carte Blanche Range Info | N | X(Variable) |
| 13 Diner's Club Range 1 Info | N | X(Variable) |
| 14 Diner's Club Range 2 Info | N | X(Variable) |
| 15 Diner's Club Range 3 Info | N | X(Variable) |
| 16 (other) Range 1 Info | N | X(Variable) |
| 17 (other) Range 2 Info | N | X(Variable) |
| 18 ABA Standard Prop. Range Info | N | X(Variable) |
| 19 Non ABA Standard Prop. Range Info | N | X(Variable) |

| Card Range Info Format: | |
|---|---|
| Card Type | 9(1) |
| Separator | '/' |
| Beginning Range | 9(Variable) |
| Separator | '/' |
| Ending Range | 9(Variable) |
| Separator | '/' |
| Card Number Length | 9(2) |

A signature pad or PIN pad may be utilized in connection with the present invention.. A connected signature pad or PIN pad is controlled in accordance with various configuration parameters. Some of these parameters involve the format for the signature signals provided from the signature pad, as described in the referenced Data Card Terminal Application. Preferred parameters include the following:

| Signature Capture/PIN Pad Values - File 05 | | |
|---|---|---|
| 00 Signature Pad Port Number | RW | 9(1) |
| 01 "Wait For Signature" Timeout | RW | 9(3) |
| 02 "Lift Pen" Timeout | RW | 9(2) |
| 03 "Signature Completion" Timeout | RW | 9(2) |
| 04 Max Bytes For Signature | RW | 9(4) |
| 05 Signature Resolution | RW | 9(3) |
| 06 Eight to Seven Bit Flag | RW | 9(1) |
| 07 PIN Pad Port Number | RW | 9(1) |
| 08 "Wait for PIN" Timeout | RW | 9(3) |

Information for configuring the serial ports 62 is also stored in a data file, as follows:

| Serial Port Configurations - File 06 | | |
|---|---|---|
| 00 Master Control Port Number | RW | 9(1) |
| 01 Multi-Reader Attention Byte | RW | X(1) |
| 02 Multi-Reader Terminator Byte | RW | X(1) |
| 03 Host Attention Byte | RW | X(1) |
| 04 Host Terminator Byte | RW | X(1) |
| 05 Serial Port 1 Baud Rate | RW | 9(5) |
| 06 Serial Port 1 Data Bits | RW | 9(1) |
| 07 Serial Port 1 Parity | RW | X(1) |
| 08 Serial Port 1 Stop Bits | RW | 9(1) |
| 09 Serial Port 1 Flow Control | RW | F(1) 0=OFF, 1=ON |
| 10 Serial Port 1 Redirection Type | RW | 9(1) |
| 11 Serial Port 1 Destination Port | RW | 9(1) |
| 12 Serial Port 2 Baud Rate | RW | 9(5) |
| 13 Serial Port 2 Data Bits | RW | 9(1) |
| 14 Serial Port 2 Parity | RW | X(1) |
| 15 Serial Port 2 Stop Bits | RW | 9(1) |
| 16 Serial Port 2 Flow Control | RW | F(1) 0=OFF, 1=ON |
| 17 Serial Port 2 Redirection Type | RW | 9(1) |
| 18 Serial Port 2 Destination Port | RW | 9(1) |
| 19 Serial Port 3 Baud Rate | RW | 9(5) |
| 20 Serial Port 3 Data Bits | RW | 9(1) |
| 21 Serial Port 3 Parity | RW | X(1) |
| 22 Serial Port 3 Stop Bits | RW | 9(1) |
| 23 Serial Port 3 Flow Control | RW | F(1) 0=OFF, 1=ON |
| 24 Serial Port 3 Redirection Type | RW | 9(1) |
| 25 Serial Port 3 Destination Port | RW | 9(1) |
| 26 Serial Port 4 Baud Rate | RW | 9(5) |
| 27 Serial Port 4 Data Bits | RW | 9(1) |
| 28 Serial Port 4 Parity | RW | X(1) |
| 29 Serial Port 4 Stop Bits | RW | 9(1) |
| 30 Serial Port 4 Flow Control | RW | F(1) )=OFF, 1=ON |
| 31 Serial Port 4 Redirection Type | RW | 9(1) |
| 32 Serial Port 4 Destination Port | RW | 9(1) |

During operation, the preferred terminal accumulates statistics relating to the numbers of occurrences of various events. These statistical counts include the following, which are provided as an output in response to a GET STAT COUNTS command:

| Statistical Counts - File 07 | | |
|---|---|---|
| 23 "Attempted Card Reads" occurrence counter | RO | 9(2) |
| 24 "Failed Card Reads" threshold | RW | 9(2) |
| 25 "Failed Card Reads" occurrence counter | RO | 9(2) |
| 26 "Attempted Embossed Data Reads" counter | RO | 9(2) |
| 27 "Failed Embossed Reads" threshold | RW | 9(2) |
| 28 "Failed Embossed Reads" occurrence counter | RO | 9(2) |
| 39 "Chargeback Protection Inversion" threshold (occurs when the Chargeback Protection Flag is turned on and the Embossed Data Reader Activated Flag is turned off) | RW | 9(2) |
| 40 "Chargeback Protection Inversion" counter | RO | 9(2) |
| 43 "High Risk Violation" threshold | RW | 9(2) |
| 44 "High Risk Violation" occurrence counter | RO | 9(2) |
| 45 "Signature Not Captured" threshold | RW | 9(2) |
| 46 "Sign. Not Captured-No Sign Pad" counter | RO | 9(2) |
| 47 "Sign. Not Captured-Sign Pad Error" counter | RO | 9(2) |
| 48 "Sign. Not Captured-No Sign Received" counter | RO | 9(2) |
| 49 "Attempted Check Reads" occurrence counter | RO | 9(2) |
| 50 "Failed Check Reads" threshold | RW | 9(2) |
| 51 "Failed Check Reads" occurrence counter | RO | 9(2) |

Transaction Guarantor Host Communication Packets

Under circumstances wherein the terminal 10 is utilized in conjunction with a chargeback protection system provided by a transaction guarantor or processor, as described in the referenced Data Card Terminal Application, data packets comprising transaction data acquired by a POS electronic cash register and payment data acquired with the preferred terminal 10 will be transmitted to the transaction processor. Chargeback protection may be provided by the transaction guarantor under such conditions as it deems prudent. For example, the transaction guarantor may deem that a transaction will only be chargeback protected if the transaction includes a signature captured with an attached signature pad. Other combinations of conditions may be utilized, as deemed prudent. As a specific example, consider that chargeback protection is only allowed when a signature capture pad is attached. A typical communication packet from the POS computer system, after acquisition of the transaction data from an electronic cash register, the preferred terminal 10, and a connected signature pad, appears as follows:

| Field Name | Format | Remarks |
|---|---|---|
| Record Descriptor Word | X(4) | |
| Terminal Type Code | 9(2) | Always '77' |
| Field Separator | 9(1) | Hex 22 |
| Plan Number | 9(2) | |
| Merchant Number | 9(9) | |
| Terminal Serial Number | 9(2) | Unique for each register in any one register |
| Filler | 9(1) | Always '0' |
| Terminal Qual Code | 9(5) | |
| Transaction Code | X(2) | |
| Entry Mode | 9(1) | Transaction entry method |
| Transaction Amount | 9(8) | Implied Decimal Point |
| Transaction Number | 9(4) | Unique for each transaction in any one register |
| Guarantee Flag | 9(1) | Chargeback guarantee status |
| 0 = not guaranteed (no chargeback protection no signature pad, no multi-reader) 1 = guaranteed with signature 2 = guaranteed missing signature 3 = not guaranteed with signature 4 = not guaranteed missing signature | | |
| Receipt Header Option | 9(1) | For receipt reproduction (0, 1, 2, 3, or 4) |
| Store Policy Line Option | 9(1) | For receipt reproduction (0, 1, 2, or 3) |
| Greeting Message Line Option | 9(2) | For receipt reproduction (00 – 50) |
| Track 1 or 2 magnetic stripe data - OR - (for manual entry) | X(Variable) | |
| Card Account Number | 9(Variable) | |
| Account Separator | 9(1) | Always Hex 40 (space) |
| Card Expiration Date | 9(4) | MMYY |
| Field Separators | 9(1) | Always Hex 22 |
| Digitized Signature | X(Variable) | passed from multi-reader |
| Field Separator | 9(1) | Always Hex 22 |
| Authorization Code | X(8) | |
| Field Separator | 9(1) | Always Hex 22 |
| Transaction Date | 9(4) | MMDD |

From the foregoing, it will be understood that there has been described apparatus and methods of operating an adjunct transaction terminal in conjunction with a system having a host computer (such as an in-store processor) and an electronic cash register at the point of sale. The adjunct transaction terminal 10 is connected for data communications between the host computer and the electronic cash register. The terminal is operative for acquiring adjunct transaction information independently of the electronic cash register, the adjunct transaction information being related to a transaction being handled at the cash register.

In particular, the present invention is particularly suitable for connection for communications in series between the host computer and the electronic cash register, especially where the cash register only has a limited number (perhaps only one) data communications port, which port is designed to be connected only to the in-store or host computer system. With the present invention, the single communications cable or wire provided from the host to the cash register at the POS may advantageously be utilized to connected the adjunct terminal 10, with the cash register connected to one of the available serial ports 62, obviating the need to run additional communications cables or network adapters to the POS cash register and cluttering the workspace at the point of sale.

As thus connected, the terminal 10 is operative to for receiving signals between the host computer and the electronic cash register, determining the intended destination of the signals, responding to predetermined signals intended for the adjunct terminal by performing functions associated with the adjunct terminal, and forwarding remaining signals to their intended destination. Only fairly minor programming changes are required for the host computer system the accomodate the present invention, and no programing changes at all may be required at the POS electronic cash register. In some cases, however, where the electronic cash register includes a displaying means for displaying information, the terminal may, indirectly via the host, request the electronic cash register to display a message on the displaying means associated with an action to be take at the adjunct transaction terminal, such as "INSERT CREDIT CARD", or "INSERT CHECK", or "SIGN RECEIPT."

The preferred terminal, being adjunct to the POS cash register, collects adjunct transaction data via a data collection means associated with the adjunct terminal, and provides the collected transaction data to the host computer. In cases where the electronic cash register includes a manual data entry means such as a keyboard for receiving manually entered data associated with a transaction, the terminal is operative for receiving manually entered transaction data from the electronic cash register, obtaining the adjunct transaction information from a data collection means associated with the adjunct transaction terminal, combining the manually entered transaction data with the adjunct transaction information, and transmitting the combined manually entered transaction data and the adjunct transaction information to the host computer.

The present invention has been described in relation to particular embodiments which am intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A multireader terminal for reading financial transaction data, comprising:
   a magnetic ink character recognition reader for reading check account data from checks;
   a magnetic stripe reader for reading card identifying information from a magnetic stripe on a card;

an embossed character reader for reading card identifying information from characters embossed on said card;

in integrated controller in communication with said magnetic ink character recognition reader, said magnetic stripe reader, and said embossed character reader, said controller operative for receiving data signals from said magnetic ink character recognition reader, said magnetic stripe reader and said embossed character reader and for providing decoded data signals; and data port means for providing check account data and card identifying information corresponding to said decoded data signals as an output.

2. A multireader terminal as recited in claim 1, wherein said data port means comprises a plurality of selectively configurable serial data communications ports.

3. A multireader terminal as recited in claim 2 wherein one of said data communications ports is connected to a host computer system, and wherein another of said data communication ports is connected to an electronic cash register, and further comprising:

means operative for determining whether signals from said host computer system are intended as communications between said host computer system and said electronic cash register or between said host computer system and said multireader terminal; and means responsive to signals intended for communications between said electronic cash register and said host computer system for routing said signals between said electronic cash register and said host computer system.

4. A multireader terminal as recited in claim 1, further comprising:

a housing defining a card passageway for receiving said card, said magnetic stripe reader and said embossed character reader both being operatively positioned to engage with a card transported along said passageway; and card transporting means for transporting said card within said passageway and in operative contact with said magnetic stripe reader and said embossed character reader.

5. A multireader terminal as recited in claim 4, further comprising:

a housing having a top portion and a bottom portion, said top and bottom portions together defining said card passageway, and wherein said card transporting means comprises:

a plurality of drive rollers partially disposed within said passageway and operative to engage said card;

a motor operatively connected to said drive rollers;

said housing top portion further defining a plurality of card support ribs operative to reduce friction between a card transported along said passageway and said housing top portion.

6. A multireader terminal as recited in claim 5, further comprising card biasing means associated with said housing bottom portion for biasing said embossed characters against said embossed character reader.

7. A multireader terminal as recited in claim 6, wherein said card biasing means comprises a ramp located on said housing bottom portion opposite said embossed character reader.

8. A multireader terminal as recited in claim 4, further comprising means for selectively positioning said embossed character reader into operative position to engage with a card.

9. A multireader terminal as recited in claim 8, wherein said embossed character reader comprises a read head positioned to extend through an opening in a top portion of said housing into operative proximity to the embossed characters on a card being transported therethrough, and wherein said embossed character reader positioning means comprises an electrical actuator operative to move said read head into said operative proximity with the card.

10. A multireader terminal as recited in claim 9, wherein said embossed character reader positioning means comprises:

a spring for biasing said embossed character read head in a normally retracted position;

a cam shaft operative to engage with said read head upon rotation; and a pull solenoid operatively connected to rotate said cam shaft, whereby the actuation of said solenoid causes the rotation of said cam shaft and movement of said read head into operative engagement with a card.

11. A data card transaction terminal for providing card identifying information from a data card, said data card having a first source of card identifying information and a second source of card identifying information, comprising:

means for storing a security indicator indicative that said card identifying information should be verified;

a first card identifying information reader for reading card identifying information from said first source;

a second card identifying information reader for reading card identifying information from said second source;

means responsive to said security indicator being in a first state for comparing said card identifying information from said first source to card identifying information from said second source; and output means for providing verified card identifying information in response to detection that said card identifying information from said first source corresponds to said card identifying information from said second source, said output means being responsive to said security indicator being in a second state for providing card identifying information from said first source or said second source.

12. The data card terminal of claim 11, wherein said security indicator comprises a high risk flag that is software reconfigurable, and further comprising means for setting or clearing said high risk flag for said terminal.

13. The data card terminal of claim 11, wherein said first card identifying information reader for reading card identifying information from said first source comprises a magnetic stripe reader.

14. The data card terminal of claim 11, wherein said second card identifying information reader for reading card identifying information from said second source comprises an embossed character reader.

15. The data card terminal of claim 11, wherein said card identifying information comprises an account number associated with the data card.

16. The data card terminal of claim 11, further comprising means for validating said card identifying information, and wherein said validating means is operative to validate said card identifying information obtained from said first source, and wherein said output means is responsive to provide said card identifying information from said second source in response to failure of said validating means to validate said card identifying information from said first source.

17. The data card terminal of claim 11, wherein said output means is operative to provide said card identifying information obtained from portions of card identifying information obtained from said first source restored with portions of card identifying information obtained from said second source.

18. Apparatus for obtaining card identifying information from a data card, comprising:
  a housing;
  means for moving a data card along a path in the housing;
  a magnetic stripe reader for reading card identifying information stored on a magnetic stripe associated with the data card as the card is moved along said path by said moving means;
  said magnetic stripe reader being operative to read the data card as the card moves in a first direction and in a second direction;
  an embossed card reader for reading card identifying information from an embossed character region of the data card as the card is moved along said path by said moving means;
  said embossed card reader being operative to read the data card as the card moves in said first direction and in said second direction:
  means for verifying said card identifying information; and
  means for providing as an output verified card identifying information obtained from said magnetic stripe reader, verified card identifying information obtained from said magnetic stripe reader supplemented with information from said embossed card reader, or verified card identifying information obtained from said embossed card reader.

19. The apparatus of claim 18, wherein said path in said housing comprises a linear path beginning at an insertion slot and terminating at an endpoint, and wherein said moving means is operative to move a data card inserted into said insertion slot along said path in said first direction to said endpoint and is thereafter operative to move the data card from said endpoint in said second direction back to said insertion slot.

20. The apparatus of claim 18, wherein the magnetic stripe is on one side of the data card and the embossed character region is on the opposite side of the data card, and wherein said magnetic stripe reader is disposed in said housing to read the magnetic stripe and said embossed card reader is disposed to read the embossed character regions of the data card.

21. The apparatus of claim 20, wherein the embossed card reader is operative to read the data card during movement of the card along the path in a first direction, and wherein the magnetic stripe reader is operative to read the magnetic stripe on the card during movement of the card along the path in a second direction.

22. The apparatus of claim 21, wherein said housing includes an insertion slot, an elongate card track, and an endpoint, and wherein said embossed card reader and said magnetic stripe reader are positioned along said elongate card track such that a card inserted into said insertion slot is read as it is moved by said moving means along said card track to said endpoint in a first direction, and a card is read as it is returned by said moving means from said endpoint along said card track back to said insertion slot in a second direction.

23. A card reader for reading magnetically recorded data from a magnetic stripe on a data card and for reading embossed data from an embossed region on the card, comprising:
  a housing;
  a drive roller mounted on said housing and rotatable in a forward direction to draw the card along a path in a first direction and rotatable in a reverse direction to expel the card in a second direction, said drive roller having resilient surfaces carried thereon at positions axially spaced on said drive roller for engaging with the card;
  drive means for rotating said drive roller in the forward and reverse directions;
  a movable magnetic read head positioned in the same plane as said drive roller, said magnetic read head being biased against a card by a biasing spring;
  floating head support means mounting said magnetic read head to said housing for permitting deflection of said head towards and away from the card to accommodate variations in thickness of the card as the card is moved along said path;
  an embossed character read head mounted in said housing in a plane opposite said drive roller and said magnetic read head;
  means for selectively moving said embossed character read head into position to contact with embossing on the card as the card is moved along said path to read the embossing, and for retracting said embossed character read head during reading by said magnetic read head; and
  circuit means for receiving the recorded data from said magnetic read head and for receiving embossed card data from said embossed read head.

24. The card reader of claim 23, further comprising a removable support housing affixed to said housing for supporting said drive rollers.

25. The card reader of claim 24, wherein said floating head support means comprises a pair of conical posts mounted in said removable support housing, and wherein said magnetic read head is mounted to a leaf spring having openings at opposite ends thereof that are placed over said conical posts.

26. The card reader of claim 23, further comprising a pair of spaced apart narrow card support ribs in said housing positioned opposite said drive roller for supporting the card as the card travels along said path, to minimize friction between said housing and the card.

27. The card reader of claim 23, further comprising a pair of spaced apart narrow embossing guide ribs in said housing positioned opposite said drive roller for guiding and confining the embossing on a card as it travels along said path.

28. The card reader of claim 23, wherein said embossed character read head moving means comprises an electrical actuator operative to move said embossed character read head into said operative proximity with the card.

29. The card reader of claim 28, wherein said embossed character mad head moving means comprises:
  a spring for biasing said embossed character read head in a normally retracted position;
  a cam shaft operative to engage with said read head upon rotation; and
  a pull solenoid operatively connected to rotate said cam shaft, whereby the actuation of said solenoid causes the rotation of said cam shaft and movement of said read head into operative engagement with a card.

30. The card reader of claim 23, further comprising card biasing means mounted in said housing opposite said embossed character read head for biasing said embossed characters against said embossed character read head.

31. The card reader of claim 30, wherein said card biasing means comprises a ramp located on said housing bottom portion opposite said embossed character reader, said ramp being operative to confine the thickness of said path as the card passes said embossed character read head.

32. A multi-reader apparatus for reading data encoded in magnetic ink on a check and for reading information encoded on a data card, comprising:
 (a) a magnetic ink character recognition (MICR) reader for reading a series of characters printed in magnetic ink on a check and for providing MICR signals corresponding thereto;
 (b) a card reader including an embossed character reader for providing signals corresponding to characters embossed on a card and a magnetic stripe reader for providing magnetic stripe signals corresponding to data recorded on a magnetic stripe on the card, said card reader comprising:
  a housing including a top portion and a bottom portion, said top and bottom portions together defining an insertion slot for accepting the card and a channel extending therefrom, the card moving in said channel in a direction aligned with said embossed characters, said housing top portion defining an embossed read head slot adjacent said embossed characters, and said housing top portion further defining a pair of guide ribs, said guide ribs being operative to guide said embossed characters along a path adjacent said embossed read head slot;
  a retractable embossed character read head selectively positionable in a reading position and in a normally retracted position, said read head subassembly comprising a plurality of pins slidably mounted in a pin support block, said pins extending through said embossed read head slot when said embossed character read head is positioned in said reading position to contact with embossing on the card,
  a leaf spring for biasing said retractable embossed character read head in said normally retracted position,
  embossed read head moving means for moving said embossed character read head into said reading position,
  a removable support housing affixed to said housing bottom portion and including recesses for supporting drive rollers and a magnetic read head,
  a magnetic stripe read head mounted in said removable support housing and extending into operative reading position relative to the magnetic stripe on a card moving along said channel,
  a motor,
  first and second drive rollers each having a resilient outer covering for engaging with the card and urging the card along said channel, said drive rollers being rotatably housed in said removable support housing,
  a drive belt for coupling said motor to said first and said second drive rollers,
  a card position detector for providing signals indicative of the position of a card within said channel,
  a card insertion detector for providing a signal indicative of the insertion of a card, and
  an ejector for manually removing a card from said channel;
 (c) a microprocessor for receiving and processing signals from said card insertion detector to cause said motor to move a card inserted into said insertion slot along said channel past said embossed character read head and said magnetic read head and then back to said insertion slot to expel the card, from said card position detector to determine the position of the card in the channel, from said MICR reader to obtain a check account number, from said magnetic stripe read head and said embossed character read head to form an account number on a credit card obtained from said magnetic stripe reader or said embossed card reader; and
 (d) a plurality of input/output serial communication ports for communicating said account number to an external location.

33. The apparatus of claim 32, wherein said ejector comprises a generally "L" shaped bar, with the foot of the "L" engaging with a card at the card's most inward position in said channel, said bar being positioned adjacent said channel and making contact with an edge of said card.

34. The apparatus of claim 32, wherein said card position detector comprises an optical position encoder coupled to one of said drive rollers.

35. (5+4+1) A multireader terminal for reading financial transaction data, comprising:
 a magnetic ink character recognition reader for reading check account data from checks;
 a magnetic stripe reader for reading card identifying information from a magnetic stripe on a card;
 an embossed character reader for reading card identifying information from characters embossed on said card;
 data port means for providing check account data and card identifying information as an output;
 a housing defining a card passageway for receiving said card, said magnetic stripe reader and said embossed character reader both being operatively positioned to engage with a card transported along said passageway;
 said housing having a top portion and a bottom portion, said top and bottom portions together defining said card passageway;
 said housing top portion further defining a plurality of card support ribs operative to reduce friction between said card transported along said passageway and said housing top portion;
 card transporting means for transporting said card within said passageway and in operative contact with said magnetic stripe reader and said embossed character reader, said card transporting means comprising:
 a plurality of drive rollers partially disposed within said passageway and operative to engage said card; and
 a motor operatively connected to said drive rollers.

36. A multireader terminal as recited in claim 35 wherein said data port means comprises a plurality of selectively configurable serial data communications ports.

37. A multireader terminal as recited in claim 36 wherein one of said data communications ports is connected to a host computer system, and wherein another of said data communication ports is connected to an electronic cash register, and further comprising:
  means operative for determining whether signals from said host computer system are intended as communications between said host computer system and said electronic cash register or between said host computer system and said multireader terminal; and
  means responsive to signals intended for communications between said electronic cash register and said host computer system for routing said signals between said electronic cash register and said host computer system.

38. A multireader terminal as recited in claim 35, further comprising card biasing means associated with said housing bottom portion for biasing said embossed characters against said embossed character reader.

39. A multireader terminal as recited in claim 38, wherein said card biasing means comprises a ramp located on said housing bottom portion opposite said embossed character reader.

40. A multireader terminal as recited in claim 35, further comprising means for selectively positioning said embossed character reader into operative position to engage with a card.

41. A multireader terminal as recited in claim 40, wherein said embossed character reader comprises a read head positioned to extend through an opening in said housing top portion into operative proximity to the embossed characters on a card being transported therethrough, and wherein said embossed character reader positioning means comprises an electrical actuator operative to move said read head into said operative proximity with the card.

42. A multireader terminal as recited in claim 41, wherein said embossed character reader positioning means comprises:
  a spring for biasing said embossed character read head in a normally retracted position;
  a cam shaft operative to engage with said read head upon rotation; and
  a pull solenoid operatively connected to rotate said cam shaft;
  whereby the actuation of said solenoid causes the rotation of said cam shaft and movement of said read head into operative engagement with a card.

43. (9+8+4+1) A multireader terminal for reading financial transaction data, comprising:
  a magnetic ink character recognition reader for reading check account data from checks;
  a magnetic stripe reader for reading card identifying information from a magnetic stripe on a card;
  an embossed character reader for reading card identifying information from characters embossed on said card;
  data port means for providing check account data and card identifying information as an output;
  a housing defining a card passageway for receiving said card, said magnetic stripe reader and said embossed character reader both being operatively positioned to engage with a card transported along said passageway;
  card transporting means for transporting said card within said passageway and in operative contact with said magnetic stripe reader and said embossed character reader; and
  means for selectively positioning said embossed character reader into operative position to engage with a card;
  said embossed character reader comprising a read head positioned to extend through an opening in said housing into operative proximity to the embossed characters on a card being transported therethrough, said embossed character reader positioning means comprising an electrical actuator operative to move said read head into said operative proximity with the card.

44. A multireader terminal as recited in claim 43, wherein said data port means comprises a plurality of selectively configurable serial data communications ports.

45. A multireader terminal as recited in claim 2 wherein one of said data communications ports is connected to a host computer system, and wherein another of said data communication ports is connected to an electronic cash register, and further comprising:
  means operative for determining whether signals from said host computer system are intended as communications between said host computer system and said electronic cash register or between said host computer system and said multireader terminal; and
  means responsive to signals intended for communications between said electronic cash register and said host computer system for routing said signals between said electronic cash register and said host computer system.

46. A multireader terminal as recited in claim 43, wherein said housing comprises a top portion and a bottom portion, said top and bottom portions together defining said card passageway, and wherein said card transporting means comprises:
  a plurality of drive rollers partially disposed within said passageway and operative to engage said card; and
  a motor operatively connected to said drive rollers;
  said housing top portion further defining a plurality of card support ribs operative to reduce friction between a card transported along said passageway and said housing top portion.

47. A multireader terminal as recited in claim 46, further comprising card biasing means associated with said housing bottom portion for biasing said embossed characters against said embossed character reader.

48. A multireader terminal as recited in claim 47, wherein said card biasing means comprises a ramp located on said housing bottom portion opposite said embossed character reader.

49. A multireader terminal as recited in claim 43, wherein said embossed character reader positioning means comprises:
  a spring for biasing said embossed character read head in a normally retracted position;
  a cam shaft operative to engage with said read head upon rotation; and
  a pull solenoid operatively connected to rotate said cam shaft;

whereby the actuation of said solenoid causes the rotation of said cam shaft and movement of said read head into operative engagement with a card.

50. A multi-reader terminal for reading financial transaction data, comprising:
   a magnetic ink character recognition reader for reading check account data from checks;
   a magnetic stripe reader for reading card identifying information from a magnetic stripe on a card;
   an embossed character reader for reading card identifying information from characters embossed on said card;
   a plurality of selectively configurable serial data communications ports for providing check account data and card identifying information as an output,
   one of said data communications ports being connected to a host computer system and another of said data communications ports being connected to an electronic cash register;
   means operative for determining whether signals from said host computer system are intended as communications between said host computer system and said electronic cash register or between said host computer system and said multi-reader terminal; and
   means responsive to signals intended for communications between said electronic cash register and said host computer system for routing said signals between said electronic cash register and said host computer system.

51. A multireader terminal as recited in claim 50, further comprising:
   a housing defining a card passageway for receiving said card, said magnetic stripe reader and said embossed character reader both being operatively positioned to engage with a card transported along said passageway; and
   card transporting means for transporting said card within said passageway and in operative contact with said magnetic stripe reader and said embossed character reader.

52. A multireader terminal as recited in claim 51, wherein said housing comprises a top portion and a bottom portion, said top and bottom portions together defining said card passageway, and wherein said card transporting means comprises:
   a plurality of drive rollers partially disposed within said passageway and operative to engage said card; and
   a motor operatively connected to said drive rollers;
   said housing top portion further defining a plurality of card support ribs operative to reduce friction between a card transported along said passageway and said housing top portion.

53. A multireader terminal as recited in claim 52, further comprising card biasing means associated with said housing bottom portion for biasing said embossed characters against said embossed character reader.

54. A multireader terminal as recited in claim 53, wherein said card biasing means comprises a ramp located on said housing bottom portion opposite said embossed character reader.

55. A multireader terminal as recited in claim 51, further comprising means for selectively positioning said embossed character reader into operative position to engage with a card.

56. A multireader terminal as recited in claim 55, wherein said embossed character reader comprises a read head positioned to extend through an opening in said housing top portion into operative proximity to the embossed characters on a card being transported therethrough, and wherein said embossed character reader positioning means comprises an electrical actuator operative to move said read head into said operative proximity with the card.

57. A multireader terminal as recited in claim 56, wherein said embossed character reader positioning means comprises:
   a spring for biasing said embossed character read head in a normally retracted position;
   a cam shaft operative to engage with said read head upon rotation; and
   a pull solenoid operatively connected to rotate said cam shaft;
   whereby the actuation of said solenoid causes the rotation of said cam shaft and movement of said read head into operative engagement with a card.

58. A multireader terminal as recited in claim 50, wherein said determining means comprises a serial data communications controller for controlling said serial data communications ports, said serial data communications controller being selectively operative to:
   1. Ignore all incoming data received on an incoming serial port;
   2. Accept all incoming data received on an incoming serial port as intended for said second transaction terminal;
   3. Redirect all incoming data received on an incoming serial port, except for data recognizable as intended for said second transaction terminal, to an outgoing serial port;
   4. Unconditionally redirect data received on an incoming serial port to a selected outgoing serial port with no regard to the format and substance of the data; or
   5. Communicate with a peripheral device connected to a selected serial port.

59. A multireader terminal as recited in claim 58, wherein said peripheral device comprises a signature capture pad.

60. A multi-reader terminal for reading financial transaction data, comprising:
   a first data record reader for reading data from a first data record source;
   a second data record reader for reading data from a second data record source;
   a plurality of selectively configurable serial data communications ports for providing data read by said data record readers as an output,
   one of said data communications ports being connected to a host computer system and another of said data communications ports being connected to an electronic cash register; and
   control circuitry operative for determining whether signals from said host computer system are intended as communications between said host computer system and said electronic cash register or between said host computer system and said multi-reader terminal;
   said control circuitry responsive to signals intended for communications between said electronic cash register and said host computer system for routing said signals between said electronic cash register and said host computer system.

61. A multireader terminal as recited in claim 60, wherein said first data record source comprises a check, and said first data record reader comprises a magnetic ink character recognition reader for reading check account data from said check.

62. A multireader terminal as recited in claim 60, wherein said second data record source comprises a magnetic stripe on a data card, and said second data record reader comprises a magnetic stripe reader for reading card identifying information from said magnetic stripe on said data card.

63. A multireader terminal as recited in claim 60, further comprising a third data record reader for reading data from a third data record source.

64. A multireader terminal as recited in claim 63, wherein said third data record source comprises characters embossed on a data card, and said third data record reader comprises an embossed character reader for reading card identifying information from said characters embossed on said data card.

65. A multireader terminal as recited in claim 60, wherein said first and second data record readers are selected from the group consisting of: a magnetic ink character recognition reader, a magnetic stripe reader, and an embossed character reader.

66. A multireader terminal as recited in claim 60, wherein said control circuitry comprises a serial data communications controller for controlling said serial ports, said serial data communications controller being selectively operative to:
1. Ignore all incoming data received on an incoming serial port;
2. Accept all incoming data received on an incoming serial port as intended for said second transaction terminal;
3. Redirect all incoming data received on an incoming serial port, except for data recognizable as intended for said second transaction terminal, to an outgoing serial port;
4. Unconditionally redirect data received on an incoming serial port to a selected outgoing serial port with no regard to the format and substance of the data; or
5. Communicate with a peripheral device connected to a selected serial port.

67. A multireader terminal as recited in claim 66, wherein said peripheral device comprises a signature capture pad.

* * * * *